US010801998B2

(12) United States Patent
Giurgiutiu et al.

(10) Patent No.: US 10,801,998 B2
(45) Date of Patent: Oct. 13, 2020

(54) IDENTIFYING STRUCTURAL DEFECT GEOMETRIC FEATURES FROM ACOUSTIC EMISSION WAVEFORMS

(71) Applicant: University of South Carolina, Columbia, SC (US)

(72) Inventors: Victor Giurgiutiu, Columbia, SC (US); Jingjing Bao, West Columbia, SC (US); Banibrata Poddar, Germantown, MD (US); Md Yeasin Bhuiyan, West Columbia, SC (US)

(73) Assignee: University of South Carolina, Columbia, SC (US)

( * ) Notice: Subject to any disclaimer, the term of this patent is extended or adjusted under 35 U.S.C. 154(b) by 113 days.

(21) Appl. No.: 15/919,300

(22) Filed: Mar. 13, 2018

(65) Prior Publication Data
US 2019/0033263 A1   Jan. 31, 2019

Related U.S. Application Data

(60) Provisional application No. 62/470,553, filed on Mar. 13, 2017, provisional application No. 62/531,387, filed on Jul. 12, 2017.

(51) Int. Cl.
*G01N 29/44* (2006.01)
*G01N 29/24* (2006.01)
*G01N 29/46* (2006.01)
*G01N 29/14* (2006.01)

(52) U.S. Cl.
CPC ......... *G01N 29/14* (2013.01); *G01N 29/2437* (2013.01); *G01N 29/4454* (2013.01); *G01N 29/46* (2013.01); *G01N 2291/0231* (2013.01); *G01N 2291/0232* (2013.01); *G01N 2291/0258* (2013.01); *G01N 2291/0289* (2013.01); *G01N 2291/2634* (2013.01); *G01N 2291/2693* (2013.01)

(58) Field of Classification Search
CPC ............... G01N 29/14; G01N 29/4454; G01N 29/2437; G01N 29/46; G01N 2291/0289; G01N 2291/2693; G01N 2291/0231; G01N 2291/0232; G01N 2291/0258; G01N 2291/2634
USPC .......................................................... 73/577
See application file for complete search history.

(56) References Cited

U.S. PATENT DOCUMENTS

| 4,164,149 A * | 8/1979 | Okubo ................. G01M 7/08 73/583 |
| 4,956,999 A * | 9/1990 | Bohannan ............. G01H 1/00 73/587 |
| 5,714,687 A * | 2/1998 | Dunegan ............... G01H 1/00 73/587 |
| 9,791,416 B2 * | 10/2017 | Gebski ............. G01N 29/4427 |
| 2007/0095138 A1 * | 5/2007 | El-Bakry ............ G01H 1/00 73/583 |
| 2009/0070048 A1 * | 3/2009 | Stothers ............... G01N 29/045 702/39 |

(Continued)

*Primary Examiner* — Jacques M Saint Surin
(74) *Attorney, Agent, or Firm* — Burr & Forman LLP; Douglas L. Lineberry

(57) ABSTRACT

The current disclosure determines if structural faults exist and extracts geometric features of the structural faults from acoustic emission waveforms, such as crack length and orientation, and can evaluate the structural faults online, during normal operation conditions.

13 Claims, 54 Drawing Sheets

(56) References Cited

U.S. PATENT DOCUMENTS

2016/0091388 A1* 3/2016 De Baere ............ G01M 5/0033
73/40

* cited by examiner (a)

(b)

Table 1. Summary statistics of the 427 AE hits over the 50 fatigue cycles with 300 μm crack growth.

| Waveform type | Number of hits | Load level (%$F_{\max}$) | Mean hit amplitude (dB) | SD amplitude (dB) | Major freq. bands/ peaks (kHz) |
|---|---|---|---|---|---|
| A | 53 | 84 | 72.5 | 0.64 | 40, 100, 350 |
| B | 50 | 78 | 95.8 | 0.51 | 30, 50, 100, 230, 450 |
| C | 89 | 81 | 70.9 | 5.42 | 30, 100 |
| D | 8 | 78 | 73.4 | 1.3 | 30, 70, 100, 230, 450, 550 |
| E | 154 | 51–58 | 64.6 | 6.63 | 30, 60, 200 |
| F | 43 | 57 | 57.6 | 1.50 | 30, 60, 200, 450 |
| G | 15 | 78–81 | 61.5 | 3.25 | 40, 100 |
| H | 6 | 23 | 57.2 | 0.75 | 40, 70, 100, 200 |
| Sharp | 9 | 23–94 | 66.6 | 14.46 | 350–1000 |
| Total= | 427 | | | | |

IDENTIFYING STRUCTURAL DEFECT GEOMETRIC FEATURES FROM ACOUSTIC EMISSION WAVEFORMS

This invention was made with government support under N00014-14-1-0655 awarded by the Office of Naval Research. The government has certain rights in the invention.

FIELD OF THE INVENTION

The present invention relates to using acoustic emissions to identify and quantitatively define the extent of faults in structures.

DESCRIPTION OF RELATED ART

Structural integrity and failure is an aspect of engineering which deals with the ability of a structure to support a designed load (weight, force, etc.) without breaking, tearing apart, or collapsing, and includes the study of breakage that has previously occurred in order to prevent failures in future designs.

Structural integrity is the term used for the performance characteristic applied to a component, a single structure, or a structure consisting of different components. Structural integrity is the ability of an item to hold together under a load, including its own weight, resisting breakage or bending. It assures that the construction will perform its designed function, during reasonable use, for as long as the designed life of the structure. Items are constructed with structural integrity to ensure that catastrophic failure does not occur, which can result in injuries, severe damage, death, and/or monetary losses.

Structural failure refers to the loss of structural integrity, which is the loss of the load-carrying capacity of a component or member within a structure, or of the structure itself. Structural failure is initiated when the material is stressed beyond its strength limit, thus causing fracture or excessive deformations. In a well-designed system, a localized failure should not cause immediate or even progressive collapse of the entire structure. Ultimate failure strength is one of the limit states that must be accounted for in structural engineering and structural design.

Across the globe, various structures fail, possibly leading to loss of life and economic damages. Failure of a structure can occur from many types of problems. Most of these problems are unique to the type of structure or to the various industries using the structures.

Most structural failures can be traced to one of five main causes. The first, whether due to size, shape, or the choice of material, is that the structure is not strong and tough enough to support the load. If the structure or component is not strong enough, catastrophic failure can occur when the overstressed construction reaches a critical stress level.

The second reason for failure is instability, whether due to geometry, design or material choice, causing the structure to fail from fatigue or corrosion. These types of failure often occur at stress points, such as squared corners or from bolt holes being too close to the material's edge, causing cracks to slowly form and then progress through cyclic loading. Failure generally occurs when the cracks reach a critical length, causing breakage to happen suddenly under normal loading conditions.

The third type of failure is caused by manufacturing errors. This may be due to improper selection of materials, incorrect sizing, improper heat treating, failing to adhere to the design, or shoddy workmanship. These types of failure can occur at any time, and are usually unpredictable.

The fourth reason for failure is also unpredictable. It arises from the use of defective materials. The material may have been improperly manufactured, or may have been damaged from prior use.

The fifth cause of failure is from lack of consideration of unexpected problems. Vandalism, sabotage, and natural disasters can all overstress a structure to the point of failure. Improper training of those who use and maintain the construction can also overstress it, leading to potential failures.

In order to warn against failures, it is necessary to understand building defects. This includes: determining the causes of building defects; identifying appropriate methods and techniques of remediation for defects; and providing reference materials to clients, consultants and project contractors. Further, understanding and discovering building defects, such as damage detection and characterization of the damage, should be done unobtrusively and without damaging the structure being investigated, such as through non-destructive testing methods.

What is needed in the industry is acoustic emission and ultrasonic testing to determine if structures possess faults and to gauge the extent of such faults, such as evaluation of the crack geometric features.

SUMMARY OF THE INVENTION

The above objectives are accomplished according to the present invention by providing in a first embodiment a method for identifying features of a fatigue crack. The method includes analyzing emission waves from a fatigue crack, applying external excitation to the fatigue crack, capturing at least one echo emanating from the fatigue crack caused by the external excitation, generating at least one secondary emission wave that emanates from the fatigue crack, and analyzing amplitude and frequency of the at least one secondary emission wave.

Further, the method may comprise identifying at least one geometric feature of the fatigue crack from analysis of the at least one secondary emission wave. Still further, the method may include identifying fatigue crack length and crack tip locations as part of the at least one geometric feature. Further yet, the method may include using frequency dependent patterns in polar plots to identify geometric features of the fatigue crack. Even further, the method may include establishing a library of signal signatures paired with fatigue crack geometries. Still yet further, the method may include modeling and scanning laser vibrometry used in association with time signal analysis to establish the library of signal signatures.

In an another embodiment, the current disclosure provides for creating a library of acoustic emission waveforms linked to crack geometric features. The method may include generating structural vibrations in a test material, generating excitation signals and applying these to the test material, collecting first acoustic emission signals generated by the test material, measuring surface vibration and displacement in the test material, obtaining a frequency response of the test material to the excitation signals, extracting surface relative displacement to determine multiple candidate frequencies for acoustic wave detection, exciting the test material with at least one candidate frequency and collecting at least one second acoustic emission signals from the test material, analyzing the at least one second acoustic emission signal to extract at least one signal signature associated with fatigue crack geometric features, and forming a library of features wherein the at least one signal signature is associated with fatigue crack geometric features.

Yet further, the method may include generating structural vibrations by internal and external excitation sources. Further still, the method may provide that internal excitation is provided by piezoelectric wafer active sensors. Further yet, external excitation may be created by a mechanical shaker. Further yet still, at least one geometric feature of a fatigue crack may be identified from analysis of the at least one second acoustic emission. Even further, fatigue crack length and fatigue crack tip locations may be identified as part of the at least one geometric feature of the fatigue crack. Even further yet, frequency dependent patterns in polar plots may identify geometric features of the fatigue crack.

In a still further embodiment, a method is provided for ensuring structural integrity. The method includes receiving acoustic emissions from a structure and analyzing the acoustic emissions to determine if structural faults exist in the structure. Still further, the method may include analyzing the acoustic emissions and comparing structural vibration resonance frequencies and mode shapes. Further, the method may, for structural faults found within the structure, create a stress field. Yet further, the structural fault may be a fatigue crack. Furthermore, the method may include analyzing the stress field around a fatigue crack tip to calculate resonance frequencies related to fatigue crack opening. Even further still, the method may reveal at least one geometric feature of the fatigue crack located within the structure by the analysis of the stress field.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 23 shows Table 1, which provides summary statistics of AE hits over fatigue cycles.

Figure 1:
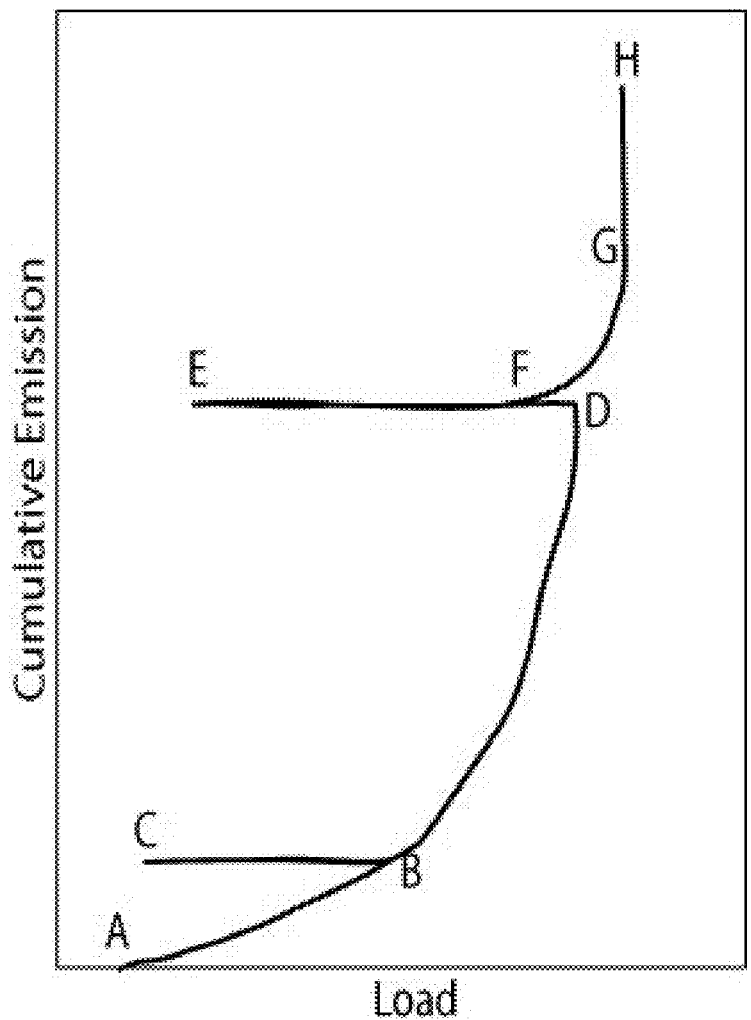
FIG. 1 shows a basic AE history plot showing Kaiser effect (BCB), Felicity effect (DEF), and emission during hold (GH).

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The process of implementing a damage detection and characterization strategy for engineering structures is referred to as Structural Health Monitoring (SHM). Damage is defined as changes to the material and/or geometric properties of a structural system, including changes to the boundary conditions and system connectivity, which adversely affect the system's performance.

The SHM process involves the observation of a system over time using periodically sampled dynamic response measurements from an array of sensors, the extraction of damage-sensitive features from these measurements, and the statistical analysis of these features to determine the current state of system health. For long term SHM, the output of this process is periodically updated information regarding the ability of the structure to perform its intended function in light of the inevitable aging and degradation resulting from operational environments. After extreme events, such as earthquakes or blast loading, SHM is used for rapid condition screening and aims to provide, in near real time, reliable information regarding the integrity of the structure.

One non-obtrusive way to determine structural integrity and conduct SHM is via Acoustic Emission (AE) testing. AE refers to the generation of transient elastic waves produced by a sudden redistribution of stress in a material. When a structure is subjected to an external stimulus (change in pressure, load, or temperature), localized sources trigger the release of energy, in the form of stress waves, which propagate to the surface and are recorded by sensors. With the right equipment and setup, motions on the order of picometers can be identified. Sources of AE vary from natural events like earthquakes and rock bursts to the initiation and growth of cracks, slip and dislocation movements, melting, twinning, and phase transformations in metals. In composites, matrix cracking and fiber breakage and debonding contribute to acoustic emissions. AE's have also been measured and recorded in polymers, wood, and concrete, among other materials.

Detection and analysis of AE signals can supply valuable information regarding the origin and importance of a discontinuity in a material. Because of the versatility of Acoustic Emission Testing (AET), it has many industrial applications (e.g. assessing structural integrity, detecting flaws, testing for leaks, or monitoring weld quality) and is used extensively as a research tool.

AE is unlike most other nondestructive testing (NDT) techniques in two regards. The first difference pertains to the origin of the signal. Instead of supplying energy to the object under examination, AET simply listens for the energy released by the object. AE tests are often performed on structures while in operation, as this provides adequate loading for propagating defects and triggering acoustic emissions.

The second difference is that AET deals with dynamic processes, or changes, in a material. This is particularly meaningful because only active features (e.g. crack growth) are highlighted. The ability to discern between developing and stagnant defects is significant. However, it is possible for flaws to go undetected altogether if the loading is not high enough to cause an acoustic event. Furthermore, AE testing usually provides an immediate indication relating to the strength or risk of failure of a component. Other advantages of AET include fast and complete volumetric inspection using multiple sensors, permanent sensor mounting for process control, and no need to disassemble and clean a specimen.

AE signals generated under different loading patterns can provide valuable information concerning the structural integrity of a material. Load levels that have been previously exerted on a material do not produce AE activity. In other words, discontinuities created in a material do not expand or move until that former stress is exceeded. This phenomenon is known as the Kaiser Effect, can be seen in the load versus AE plot, see FIG. 1, which shows Basic AE history plot showing Kaiser effect (BCB), Felicity effect (DEF), and emission during hold (GH). As the object is loaded, acoustic emission events accumulate (segment AB). When the load is removed and reapplied (segment BCB), AE events do not occur again until the load at point B is exceeded. As the load exerted on the material is increased again (BD), AE's are generated and stop when the load is removed. However, at point F, the applied load is high enough to cause significant emissions even though the previous maximum load (D) was not reached. This phenomenon is known as the Felicity Effect. This effect can be quantified using the Felicity Ratio, which is the load where considerable AE resumes, divided by the maximum applied load (F/D).

Knowledge of the Kaiser Effect and Felicity Effect can be used to determine if major structural defects are present. This can be achieved by applying constant loads (relative to the design loads exerted on the material) and "listening" to see if emissions continue to occur while the load is held. As shown in the figure, if AE signals continue to be detected during the holding of these loads (GH), it is likely that substantial structural defects are present. In addition, a material may contain critical defects if an identical load is reapplied and AE signals continue to be detected. Another guideline governing AE's is the Dunegan corollary, which states that if acoustic emissions are observed prior to a previous maximum load, some type of new damage must have occurred. However, time dependent processes like corrosion and hydrogen embrittlement, the process by which metals, such as steel, become brittle and fracture due to the introduction and subsequent diffusion of hydrogen into the metal, tend to render the Kaiser Effect useless.

Acoustic emission testing can be performed in the field with portable instruments or in a stationary laboratory setting. Typically, systems contain a sensor, preamplifier, filter, and amplifier, along with measurement, display, and storage equipment (e.g. oscilloscopes, voltmeters, and personal computers). Acoustic emission sensors respond to dynamic motion that is caused by an AE event. This is achieved through transducers which convert mechanical movement into an electrical voltage signal. The transducer element in an AE sensor is almost always a piezoelectric crystal, which is commonly made from a ceramic such as lead zirconate titanate (PZT). Transducers are selected based on operating frequency, sensitivity and environmental characteristics, and are grouped into two classes: resonant and broadband. The majority of AE equipment is responsive to movement in its typical operating frequency range of 30 kHz to 1 MHz. For materials with high attenuation (e.g. plastic composites), lower frequencies may be used to better distinguish AE signals. The opposite holds true as well.

Ideally, the AE signal that reaches the mainframe will be free of background noise and electromagnetic interference. Sensors and preamplifiers are designed to help eliminate unwanted signals. First, the preamplifier boosts the voltage to provide gain and cable drive capability. To minimize interference, a preamplifier is placed close to the transducer; in fact, many transducers today are equipped with integrated preamplifiers. Next, the signal is relayed to a bandpass filter for elimination of low frequencies (common to background noise) and high frequencies. Following completion of this process, the signal travels to the acoustic system mainframe and eventually to a computer or similar device for analysis and storage. Depending on noise conditions, further filtering or amplification at the mainframe may still be necessary.

AE is a very versatile, non-invasive way to gather information about a material or structure. AET is applied to inspect and monitor pipelines, pressure vessels, storage tanks, bridges, aircraft, and bucket trucks, and a variety of composite and ceramic components. It is also used in process control applications such as monitoring welding processes. Unfortunately, AE systems can only qualitatively gauge how much damage is contained in a structure. In order to obtain quantitative results about size, depth, and overall acceptability of a part, other NDT methods (often ultrasonic testing) are necessary.

Fatigue crack generated acoustic emission waves are characterized by analytical simulation, numerical simulation, and experiments. Acoustic emission waves are created by internal and external excitation sources. A library of features in the acoustic emission waveforms is identified to be linked to crack geometric features. The acoustic emission signals received from a growing crack are processed pursuant to the current disclosure to yield information about the crack length and other geometric properties. One phenomenon is acoustic emission waves can be generated by the relative movement of fatigue crack faying surfaces when the structure is under vibration. Structural vibration resonance frequency and mode shapes are affected by the presence of damage, such as fatigue cracks. The area in the vicinity of the damage also has its own local resonance frequencies and mode shapes. The damage geometric features, such as the crack length, modify the damage local frequency and mode shapes. At some local resonance frequencies, the movements of the faying surfaces achieve larger relative amplitude, and generate stronger acoustic emission waves. Analytical and numeric simulations are used to predict these optimum frequencies for acoustic wave generation and detection. For simple geometric features, such as rectangular and round shaped plate structures, analytical models are used. For more complicated geometric features and assemblies, numerical simulation is utilized to find the global and local resonance frequencies and mode shapes.

Another phenomenon is that local vibration and/or standing waves can be generated at the tips of the crack by the energy released during crack advancement. The sudden change in the stress field around the crack tip due to the crack advancement causes elastic waves which propagate along the crack and upon interacting with the other end of the crack causes standing wave field and/or local vibration. This standing wave field is dictated by the crack geometry. Numerical simulations were performed to verify this phenomenon. In numerical model harmonic loading was applied at the tip of cracks of different lengths to calculate resonance frequencies related to the crack opening vibration. Then in the same numerical models broadband transient waves were excited at the tip of these cracks and the resulting acoustic emission was measured close to the crack. The measured acoustic emission signal showed clear resonance phenomenon at the same frequencies as the ones predicted by the harmonic analysis.

Fatigue loading of several thousands of cycles was applied on test coupons to grow fatigue cracks. Acoustic emissions were generated by the crack growth and these acoustic emissions were recorded using PWAS sensors and acoustic emission sensors. The acoustic emission signals received from a growing crack are processed pursuant to the current disclosure to yield information about the crack length and other geometric properties.

Specialized experiments were performed for simulation results validation and verification. Vibration experiments were performed on fatigue test coupons in (a) pristine status, and in (b) damaged status after several thousands of fatigue loading cycles. Structural vibrations are generated by internal and external excitation sources. The internal excitation source is created by a pair of piezoelectric wafer active sensors (PWAS) mounted on both sides of the specimen, directly on the fatigue crack tip. The PWAS transducers are energized by tone-burst signals and chirp signals to excite Lamb waves in the test coupons. By using a pair of PWAS as transducers, the excitation Lamb waves modes can be selected by energizing the two PWAS transducers with in-phase or out-of-phase signals. The external excitation source is created by a mechanical shaker.

The test coupon is mounted on the mounting shaft of the mechanical shaker. Tone-burst and chirp excitation signals are sent to the mechanical shaker, and excite the test coupon. Acoustic emission sensors are mounted on the test coupons to collect acoustic emission signals during the experiment. A laser Doppler vibrometer (LDV) is used to measure and record the test coupon surface vibration velocity and displacement pattern. By applying Fourier transform, the frequency response of the test coupon to the applied excitation signal are obtained. The LDV measured vibration patterns are then compared with the simulation results. The fatigue crack surface relative displacement is extracted from the LDV measurement, to determine multiple candidate frequencies for acoustic emission wave detection. The specimens are then excited at these candidate frequencies and the acoustic emission sensors are used to collect acoustic emission signals. The acoustic emission signals are then analyzed by frequency analysis and time-frequency analysis to extract signal signatures that are associated with the fatigue crack geometric features. A library of features in the acoustic emission waveforms is identified to be linked to crack geometric features.

The acoustic emission signals received from a growing crack are processed with our methodology to yield information about the crack length and other geometric properties. Fatigue experiments are performed on test coupons with same dimension of these used in the above described vibration resonance experiments. Acoustic emission sensors are mounted on the test coupons to collect acoustic emission signals during the fatigue experiments. Frequency and time-frequency analysis are applied to the extract the frequency response and the propagation wave components of the acoustic emission signals. By using the results obtained in the above described vibration resonance experiments, signal signatures that are associated with the fatigue crack resonance modes are extracted. Fatigue crack generated acoustic emission waves were studied with analytical simulation, numerical simulation, and experiments. Using the analytical and numerical simulation models validated by the above described study, the structural geometric features related signal signatures are predicted. A library of features in the acoustic emission waveforms can be used to identify fatigue crack geometric features.

The acoustic emission signals received from a growing crack are processed with our methodology to yield information about the crack length and other geometric properties. Fatigue crack generated acoustic emission waves were studied with analytical simulation, numerical simulation, and experiments. Acoustic emission waves were generated with internal and external excitation sources. A library of features in the acoustic emission waveforms can be used to identify fatigue crack geometric features.

The current disclosure may: (1) be used to identify the geometric features of a fatigue crack such as crack length, and crack tip locations by "listening" to the crack-generated acoustic emission waves; (2) use external excitation to identify the geometric features of the crack such as fatigue crack length, and crack tip locations by "listening" to the echoes from a fatigue crack; (3) identify small fatigue cracks in the tens of micro-meter range width and millimeter length interacting with incident guided waves generate detectable secondary waves that can be used to determine their geometric features; (4) use the amplitude and frequency contents of the secondary wave emitting from fatigue crack to determine their geometric properties; (5) use the structural vibration modes that are changed by fatigue cracks in the tens of micro-meter range width and millimeter length to determine the geometric features of the crack; (6) use resonance frequency of the fatigue crack local vibration modes to determine crack geometric features, such as crack length and crack orientation; (7) use a pair of vibration sources mounted adjacent to the fatigue crack tip can selectively excite the fatigue crack in symmetric and anti-symmetric local vibration modes; (8) use frequency dependent patterns in the polar plots to identify the size and nature of fatigue cracks; and (9) establish a library of signal signatures paired with specific crack lengths and shapes through modeling and scanning laser vibrometry (SLDV) measurements in coordination with time signal analysis.

The current disclosure may be used in acoustic emission (AE) for nondestructive evaluation (NDE), and structural health monitoring (SHM) applications. This invention provides a novel methodology to indicate early signs of fatigue cracks.

The current disclosure is founded on the science and understanding of how AE wave signals are generated by crack growth and their interaction with the crack. The signal processing method developed in this methodology extracts crack geometric features from the received AE waveforms, such as crack length and orientation. The crack can be evaluated online, during normal operation conditions.

In contrast, conventional AE signal analysis methods are based on the statistical characteristics of AE hit event parameters, and can only provide qualitative estimation of the crack severity. Evaluation of the crack geometric features needs to be performed offline, during maintenance period. The current disclosure may improve the safety and the availability of critical vehicles and infrastructures, as well as reduce maintenance costs.

Structural health monitoring (SHM) and nondestructive evaluation (NDE) methods rely on the interpretation of ultrasonic signals. These ultrasonic signals may result from the passive capture of the acoustic emission (AE) waves emitted by a crack or from the waves scattered by the crack during an active interrogation of the structure. Current AE signal interpretation methods can identify AE events, count their rate of appearance, and even locate their location using multiple sensors and a triangulation method. For the current disclosure, to evaluate the crack size, an active SHM method is employed to relate the scatter signals with the crack size. No method to extract geometric features of a fatigue crack, such as crack size, crack length, crack orientation, etc., from the AE signals collected during passive SHM exists at the moment.

The current disclosure provides a novel approach aimed at connecting the crack length to certain signature features that may be identified in the AE signal. One of the main challenges of this approach is to develop a physics of materials based understanding of the generation and propagation of acoustic emissions during the growth of a fatigue crack. As the geometry changes due to the crack growth, so does the local vibration modes around the crack. The current disclosure seeks to provide understanding of these changing local vibration modes and may disclose possible relations between the AE signal features and the geometric features of the crack.

Finite element (FE) analysis was used to model AE events due to fatigue crack growth. This was done using dipole excitation at the crack tips. Harmonic analysis was also performed on these FE models to understand the local vibration modes. Experimental studies were performed on a specimen with a slit excited by a piezoelectric wafer active sensor (PWAS) and measured with a scanning Doppler laser vibrometry. Preliminary results show that the AE signals may carry the information related to the crack size and even geometry.

Acoustic emission (AE) is well established as a nondestructive evaluation for monitoring the structural health by listening to the "pops" generated by the energy released during incremental crack growth. Passive detection of fatigue crack by AE sensing has attracted attention of many researchers for decades.

Figure 2:
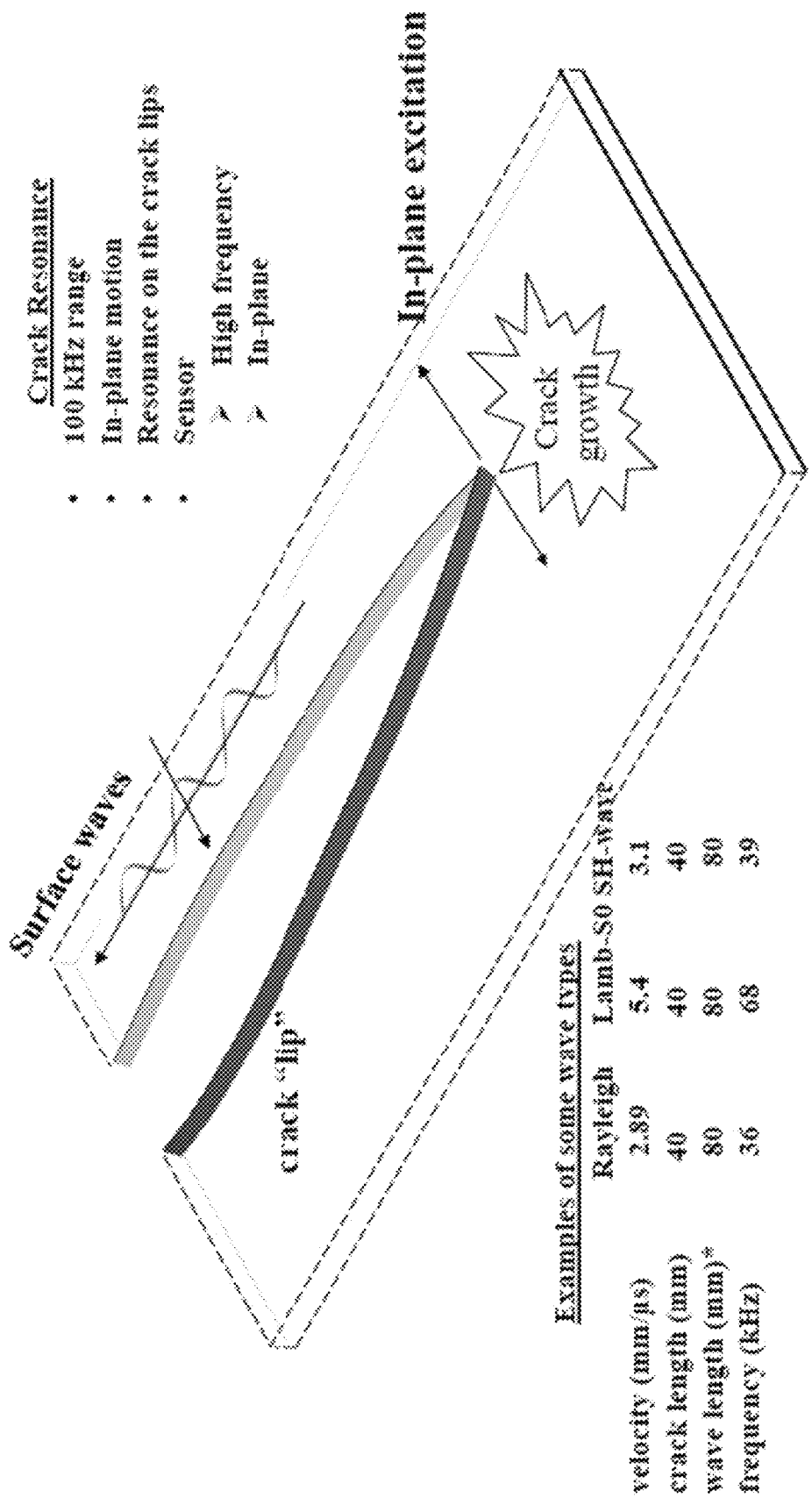
FIG. 2 shows AE generation at the crack tip as the crack advanced during cyclic fatigue or extreme-load events.
Figure 3:
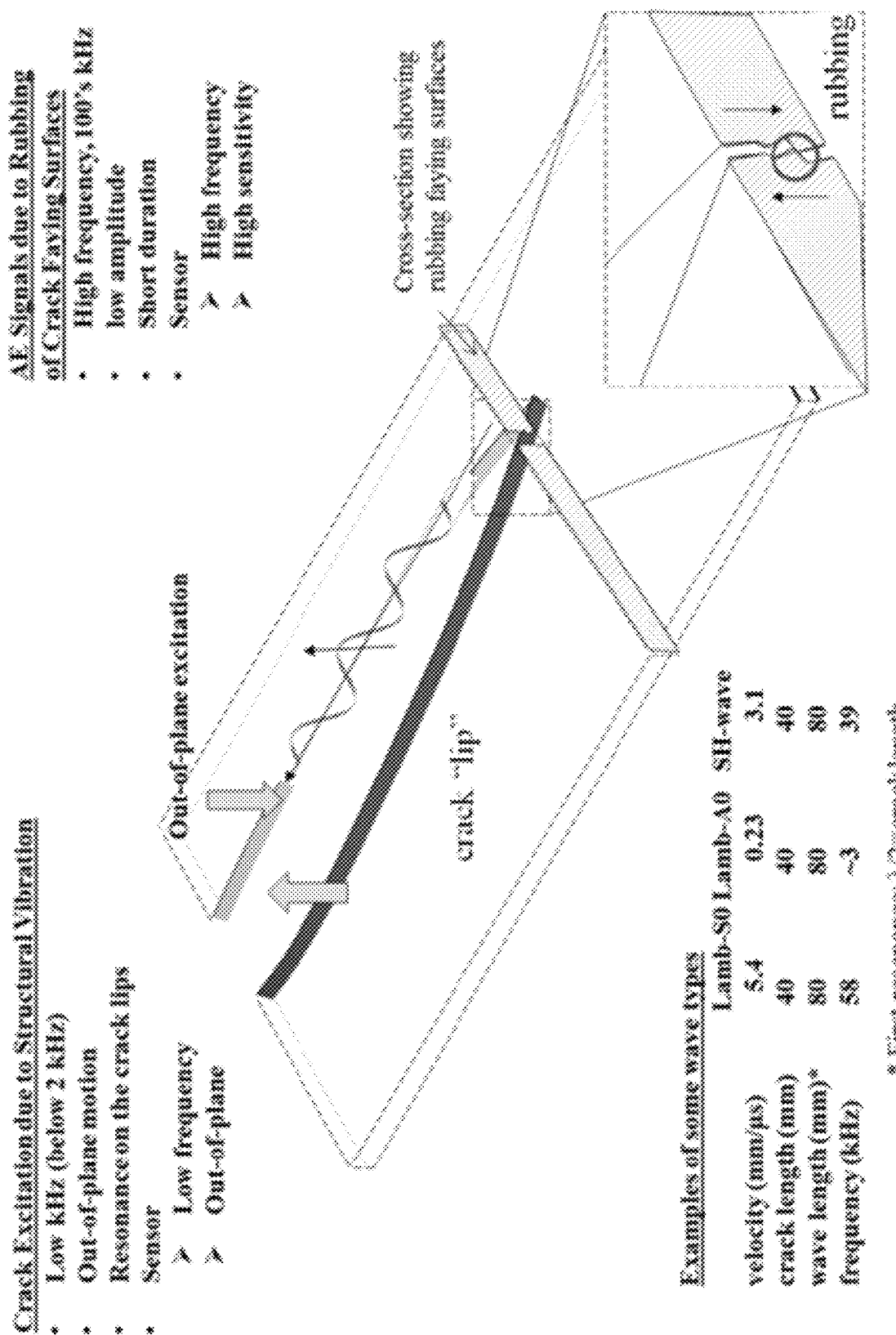
FIG. 3 displays AE generation by micro-fractures during the rubbing, clacking, clapping of the crack faying surfaces due to operational cyclic loading and vibration.

FIGS. 2 and 3 illustrate two major phenomena that generate crack-related AE signals. FIG. 2 shows AE generation at the crack tip as the crack advanced during cyclic fatigue or extreme-load events; and FIG. 3 displays AE generation by micro-fractures during the rubbing, clacking, clapping of the crack faying surfaces due to operational cyclic loading and vibration.

Existing AE equipment records these pops as so-called "hits" identified in the AE signal every time the recorded structural wave signals exceed a predefined threshold. Experimental evidence accumulated over several decades of AE practice indicates that the generation of hits accelerates as the crack enters its terminal stage close to ultimate failure. Thus an increased hit rate could be interpreted as "proximity of failure" and would require immediate action. However, the detection of hits is strongly influenced by how the threshold level is set: (i) if the threshold is too low, then "environmental noise" may trigger a large number of false hits and generate a large Type I error which annoys the crew with too many false positives; whereas (ii) if the threshold is set too high to prevent noise triggering, then the result would be a large Type II error, i.e., failure to detect an actual dangerous crack growth with the accompanying potentially catastrophic consequences. Thus setting the "correct" AE threshold remains an "art form" dependent of the subjective interpretation of experienced AE technicians. By depending on hit rates, current AE practices do not possess an early warning capability. Such early warning capability would greatly assist the effective management of structural fatigue in coordination with allocation of mission profiles and maintenance schedules.

To impart an early warning capability to the AE process, several investigators have posited that the AE signals captured during the AE monitoring contain a wealth of information that is not properly exploited by the current AE practice which is solely based on recording "hits". To extract more information from the AE signals, some authors have adopted a data-driven approach and tried to apply existing statistical signal processing methods that would extract standardized signal features such as amplitude, rise time, duration, MARSE (measured area of the rectified signal envelop), counts, moments, kurtosis, etc. Such AE analysis methods are based on parametric feature extraction, pattern recognition, and statistical analysis, and other data-driven methods.

Figure 4:
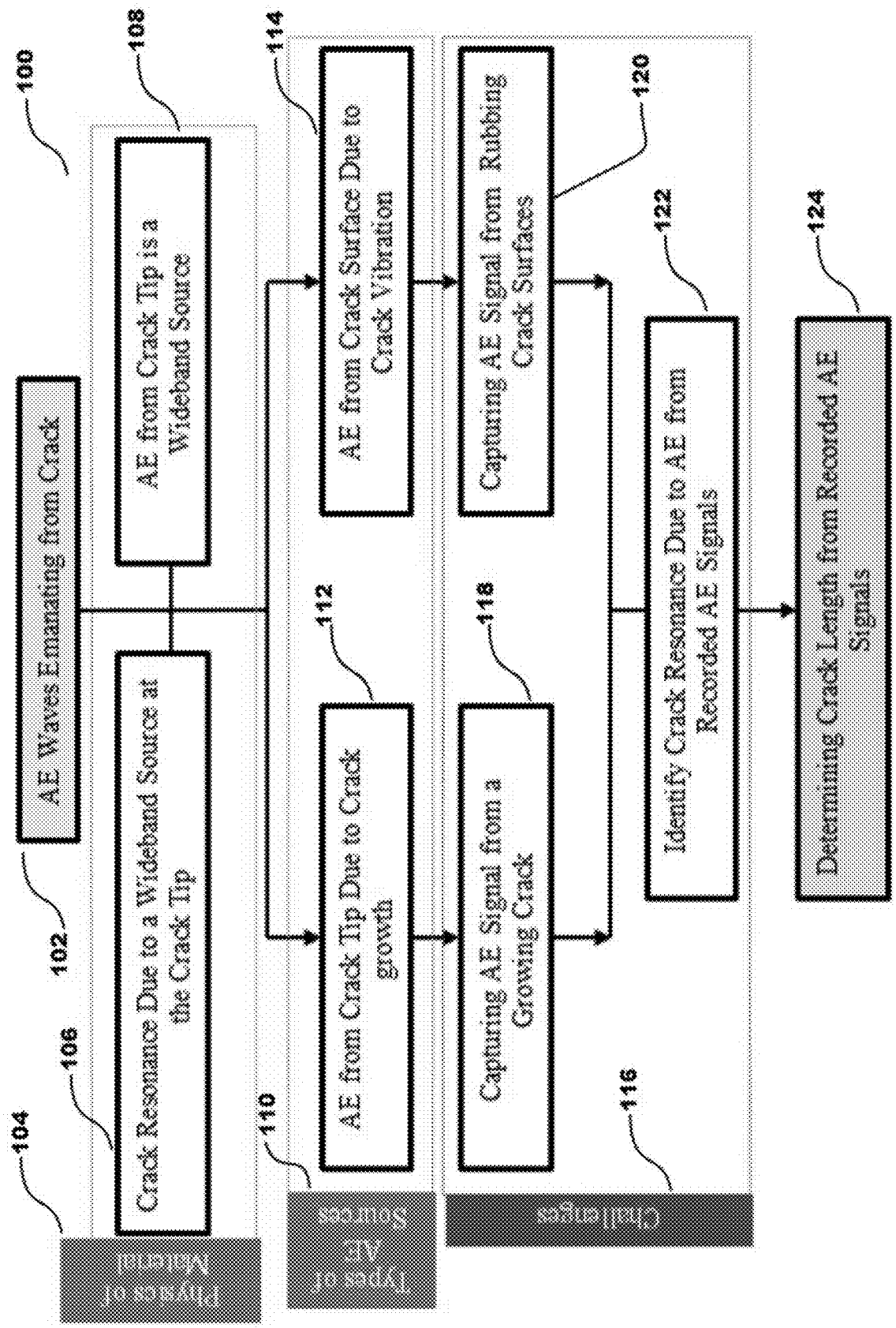
FIG. 4 shows a flow chart diagram for a method of detection of fatigue crack length from acoustic emission.

FIG. 4 shows a flow chart diagram for a method of detection of fatigue crack length from acoustic emission 100. At step 102, one analyzes AE waves emanating from a crack. The physics of the testing material, 104, such as crack resonance due to a wideband source at the crack tip 106 and AE from the crack tip as a wideband source 108 are taken into account. Further, multiple sources of AE 110 to gather from the crack exist, such as AE from the crack tip due to crack growth 112 as well as AE from the crack surface due to crack vibration 114. The challenges 116 of the current disclosure include capturing AE signals from a growing crack 118 as well as capturing AE signals from rubbing or grinding crack surfaces 120. However, with this information one may identify crack resonance due to AE from the recorded AE signals at step 122. With this information, one may determine crack geometries, such as but not intended to be limiting, crack length from the recorded AE signals as shown at step 124.

One objective of the current disclosure is to develop the science and understanding of how crack-generated AE wave signals can be extracted from non-crack wave signals during AE monitoring under actual operational conditions. The aim of this research is to develop a method to predict crack lengths from acoustic emissions (AE) due to crack growth in plate structures. Therefore, to understand generation of plate guided waves due to crack growth and their interaction with cracks, the current disclosure performed FE analysis along with experimental studies. First we introduce the experimental procedure and simplified FE modeling assumptions based on the experiment. Then we present detailed 3D FE models to elaborate our method of estimating crack length from recorded AE signal. Subsequently, we present experimental validation of our method. Finally we present our attempt to apply this method to detect fatigue crack length during fatigue test followed by conclusion.

The AE events are caused by various sources. Several studies have been aimed at understanding the AE generation of guided waves such as, Lamb waves, due to crack growth.

Analytical models have been developed to simulate the generation of AE excitation at the crack tip and the resulting AE elastic waves traveling through the medium. Besides the fatigue crack, other sources such as noise, vibration, rubbing, and clacking may cause AE events that can be captured by the AE instrumentation.

Two major phenomena that generate crack-related AE signals can be distinguished—FIG. 2 at (a) AE generation at the crack tip as the crack advanced during cyclic fatigue or extreme-load events; and FIG. 3 at (b) AE generation by micro-fractures during the rubbing, clacking, clapping of the crack faying surfaces due to operational cyclic loading and vibration. The AE signals of Type (a) make the object of conventional hit-based AE practice, whereas the AE signals of Type (b) are less studied because they are of much lower amplitude and are usually discarded as "noise" by the conventional AE equipment. A flowchart for the detection of crack length from these two main mechanisms of AE generation from a fatigue crack is shown in FIG. 4. As shown on the left branch of FIG. 4, one mechanism to be considered is that of crack growth accompanied by energy being released at the crack tip as AE waves. The other mechanism is depicted on the right branch of FIG. 4; when the crack resonated due to ambient vibration, the rubbing of the crack surfaces create acoustic emissions.

The main challenge of this approach is to develop a thorough understanding of the mechanism of generation and propagation of acoustic emissions waveforms due to the growth of a fatigue crack. As the geometry changes due to the crack growth, so does the local vibrational modes around the crack. The current disclosure's aim is to understand these changing local vibrational modes and find possible relation between the AE waveforms features and the crack geometric features. The main challenge is to identify crack resonances in the collected AE signals.

The current disclosure may follow the left branch of FIG. 4 and investigate AE signals due to fatigue crack growth. Because AE is wideband excitation generally at the crack tip, our aim is to use this phenomenon to detect fatigue crack length from recorded acoustic emission signal.

Figure 5:
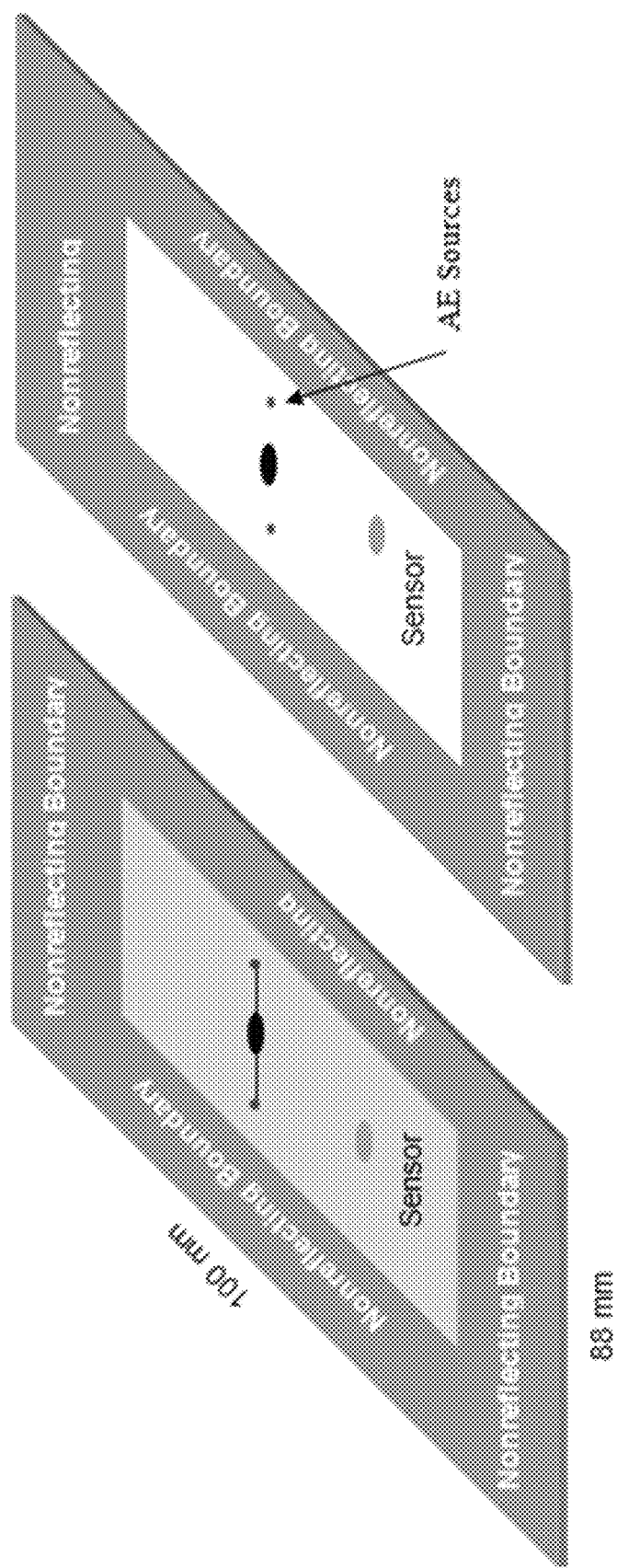
FIG. 5 shows a FEM model for analyzing the effect of crack presence on the AE signal spectrum.

FIG. 5 shows a FEM model for analyzing the effect of crack presence on the AE signal spectrum: (a) model with crack and with two AE sources placed at the crack tip; (b) model without crack but with two AE sources placed at the same locations as where the crack tips would be.

FEM Simulation of Acoustic Emissions in a Plate from Fatigue Experiment

One initial aim was to simulate AE signals recorded during uniaxial tensile fatigue test in a thin-sheet specimen representative for aerospace applications. We assume that the specimen is under pure tension and the crack is fully penetrated through the specimen thickness. Therefore, we also assume symmetric emission of acoustic energy across the plate thickness. These conditions are similar to those encountered during experimental AE work.

The specimen is made of 1-mm thick 2024-T4 aluminum alloy plate. A 1-mm hole is machined in the center of the specimen to create stress concentration for crack initiation. 3D FEM modeling was performed with the ANSYS commercial code using brick elements SOLID45. Both harmonic analysis and wave propagation analysis were performed. For wave propagation analysis, we used dipole AE sources placed on the crack tip following previous work by Hamstad and Prosser. The generated AE signal was captured with a sensor placed at various locations away from the AE source. To identify features of a crack from AE signals, it is important to minimize the effects of the boundary reflections. The current disclosure used nonreflective boundaries to prevent Lamb wave reflections from the specimen edges. The element size was chosen 0.25 mm. The time-domain profile of the dipole sources was a half-cycle cosine with a rise time $\tau=1.5$ µs. FEM modeling of elastic wave propagation requires that the element size and the time step satisfy the Courant-Friedrichs-Lewy (CFL) condition. For material 2024-T4 with bulk longitudinal wave speed of 6.2 mm/µs, we need a time step of 40 ns or less to satisfy the CFL condition. The source rise time $\tau=1.5$ µs corresponds to CFL=3. The minimum wavelength is $\lambda_m=4.71$ mm. We use $\lambda/s$ 9.4, $\lambda/cs=18.8$, D/s=40, where, s, cs, and D are element size, dipole size, and maximum distance between the source and sensor, respectively.

Figure 6:
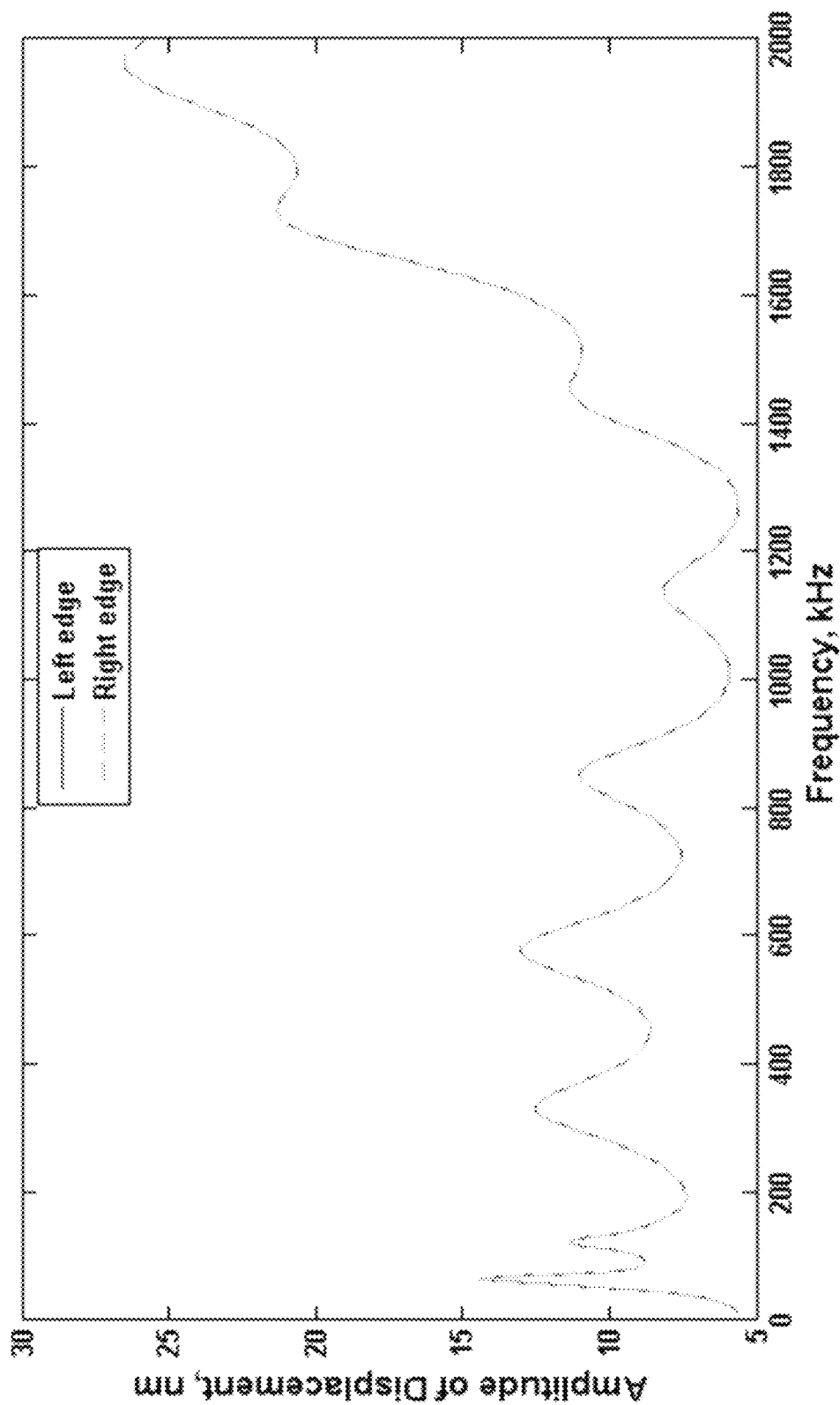
FIG. 6 shows resonances noticed in the harmonic FEM analysis of a specimen.
Figure 7:
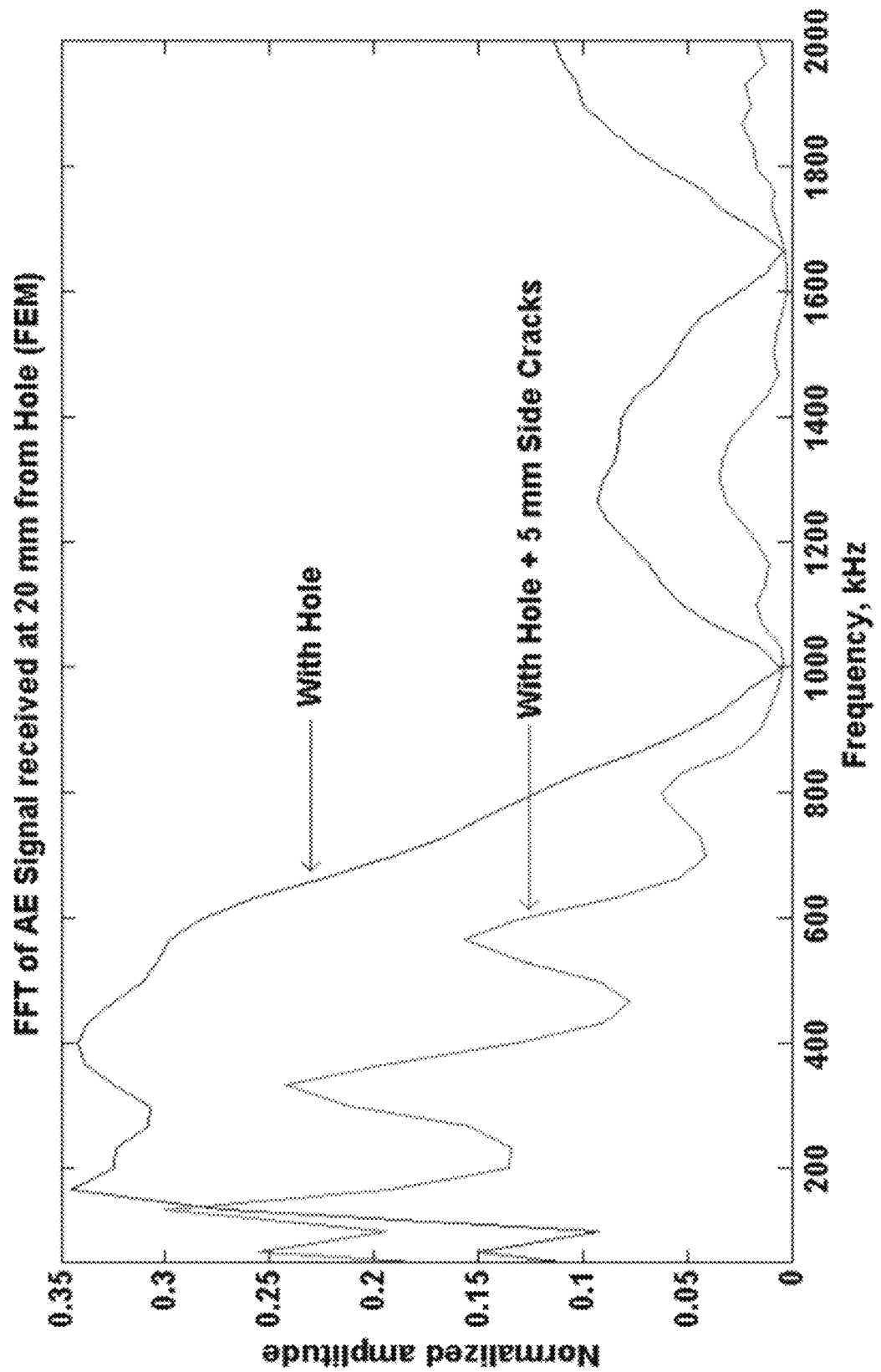
FIG. 7 illustrates the spectrum of the signal received from FEM AE simulation.

FIGS. 6 and 7 show the effect of crack presence on the simulated AE signal spectrum. FIG. 6 shows resonances noticed in the harmonic FEM analysis of specimen with hole plus side half cracks of 5 mm each (11 mm total crack length)—no such resonances were observed when only the hole was present. FIG. 7 illustrates the spectrum of the signal received from FEM AE simulation at the sensor shows similar resonances when the 5-mm side cracks are present, but not when only the hole is present.

A schematic of the FEM model is given in FIG. 5. Note that FIG. 5, left image, shows a specimen with a crack growing laterally from the hole, whereas FIG. 5, right image, shows the same specimen with only the hole. In both cases, AE dipole sources were placed in the same locations corresponding to the crack tips. The purpose of performing AE with and without the crack being present was to investigate if the presence of the crack has an effect on the AE wave signals captured by the sensor.

Crack Presence Effect on Harmonic Response

To investigate the effect of crack presence on the harmonic response of the crack, the current disclosure performed harmonic FEM analysis on the specimen shown in FIG. 5, left image. Unit harmonic excitation was applied at the dipoles and the in-plane $u_x$ response was measured near the crack center. The excitation frequency was swept up to 2000 kHz. The size of the side cracks was 5 mm each resulting in an 11-mm total crack length. The resulting spectrum is shown in FIG. 6. It is apparent that distinct resonance peaks can be observed at a number of frequencies. When the same analysis was performed on the specimen shown in FIG. 5, right image, no such peaks could be observed in the investigated frequency band of up to 2000 kHz. In addition, when a smaller crack (2 mm each side, 5 mm total) was modeled, the corresponding spectrum showed fewer resonance peaks which were wider spread apart. These studies seemed to indicate a clear relationship between the presence and number of resonance peaks and the length of the crack.

The current disclosure proposes that the observed peaks are due to local resonances of the crack due to standing waves pinned between the crack tips. Such waves could be of different types: they could be Rayleigh surface waves traveling on the faying surfaces of the crack. They could be S0 Lamb waves traveling back and forth between the crack tips. Or they could be SH0 waves. A combination of these waves happening simultaneously is also possible.

Crack Presence Effect on AE Signals

To investigate the effect of crack presence on the AE signals, we performed wave propagation analysis using the AE dipole excitation at the crack tips as shown in FIG. 5, left image. We also performed wave propagation analysis of the specimen without crack but only with the 1-mm hole as shown in FIG. 5, right image; in this case, the AE dipole excitation was placed on the uncracked specimen in the exact locations where the crack tips would have been if the specimen was cracked as in FIG. 5, left image. In both cases, the AE waves were captured by the piezo wafer sensor placed at 20 mm from the center of the crack.

The results of this investigation are shown in FIG. 7, which presents, superposed, the Fourier transform of the AE signal for the specimen with hole+5-mm side cracks (11 mm total crack length) and for the specimen with only the hole. It is apparent that the signal from the cracked specimen displays a number of peaks. Careful examination of these peaks reveals that their frequencies correspond almost exactly to the frequencies of the resonance peaks observed in the harmonic analysis see FIG. 6.

Another feature observed in FIG. 7 is that the spectrum of the signal from the specimen without crack and only with hole displays maxima around ~450 and ~1300 kHz as well as minima at ~1000 and ~1660 kHz. Some of these maxima and minima can be also observed in the spectrum of the signal of the specimen with crack. We attribute these maxima and minima to some sort of resonance that involves the 1-mm hole.

These numerical investigations have revealed that the AE wave signal measured at a distance from the crack may carry information about the crack length. The fact that such phenomenon has not been reported yet may be due to the limitations of current AE sensors. Based on our numerical investigation, the current disclosure proposes that (a) a crack exhibits specific resonances related to its length; and (b) the AE signal generated by the energy discharged at the crack tip during crack growth may contain traces of these resonances that, upon signal processing, may reveal information about the crack length. This means that the crack length information is embedded in the AE signal and that, with appropriate skills, "one can hear the length of the crack".

Experimental Investigations

In order to test our hypothesis, the current disclosure cut a thin ~17-mm slit in a relatively large plate such as the boundary reflections would not interfere with the AE signal. Then, we designed an experimental setup to excite the slit and measure its response. As excitation, we used two piezo wafer active sensor (PWAS) bonded top/bottom at one of the slit tips. For measuring, we used a laser Doppler velocimeter (LDV) at ~20 mm away from the center of the slit. The PWAS transducers were excited in phase with a wideband pulse repeated in synch with LDV measurements. In this way, we reproduced the conditions of the FEM simulation reported supra.

Figure 8:
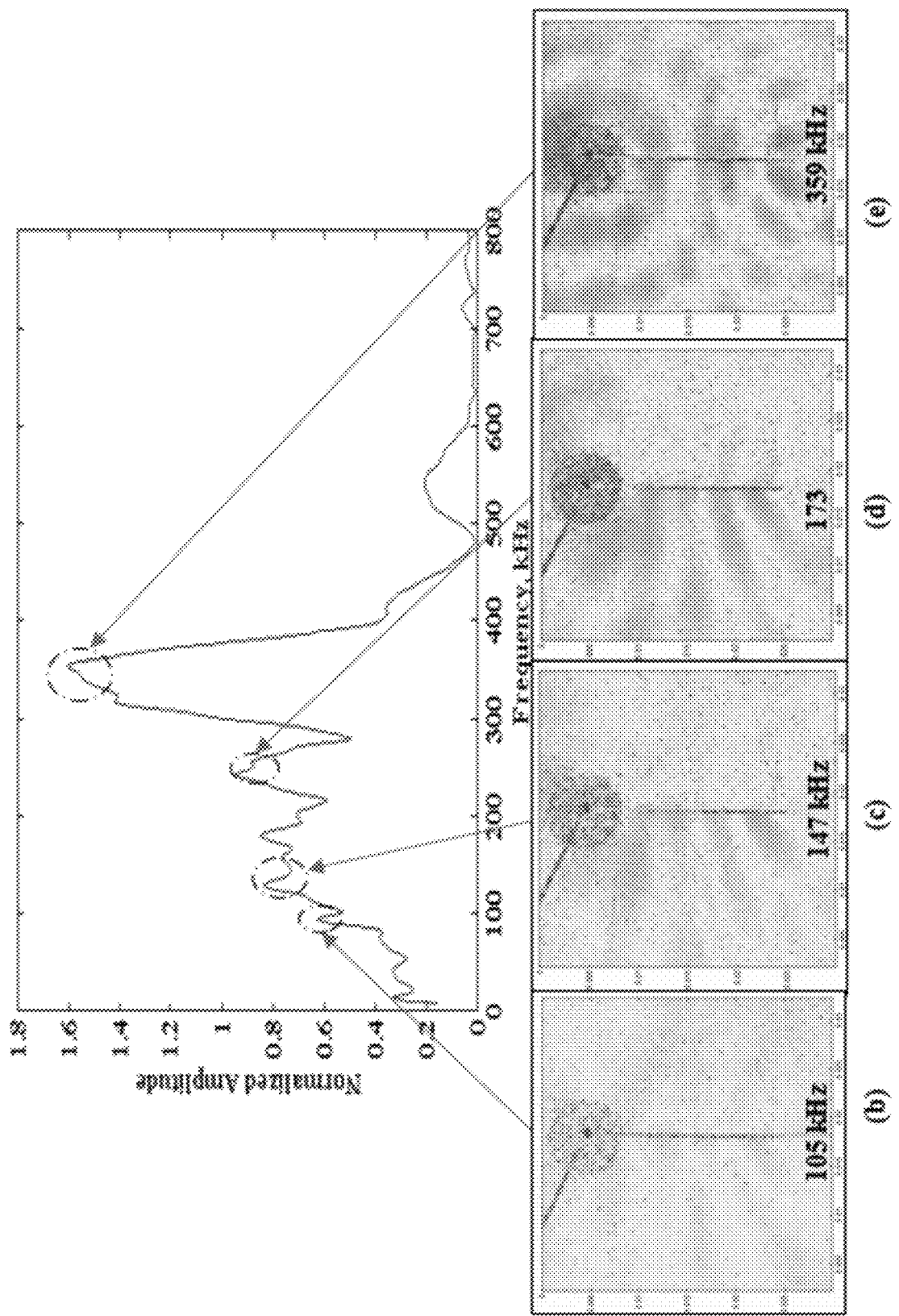
FIG. 8 shows the frequency spectrum of the signal measured at 20 mm from the slit shown FIGS. 6 and 7.

The frequency spectrum of the signal measured at 20 mm from the slit is shown in FIG. 8. It is apparent that this spectrum contains multiple peaks similar to the resonance peaks predicted by the numerical FEM simulation shown in FIGS. 6 and 7. To verify that these peaks are indeed resonances, we performed LDV scanning of the area around the slit. In this case, we used chirp excitation synchronized with LDV measurement at each of the scanning points around the slit. Thus, we were able to visualize the wave field around the slit at various frequencies. Some of these visualization results are presented in FIG. 8. Upon comparison with the frequency spectrum of FIG. 8 at (a), we were able to identify the resonance modes corresponding to some of the peaks identified in the frequency spectrum of FIG. 8 at (a). This experiment validates our FEM analysis and confirms the proposal that crack resonance may appear due to AE excitation at the crack tip.

FIG. 8 shows resonance of the slit at multiple frequencies due to acoustic emission from PWAS (a) measured at 20 mm from the slit (b)-(e) area scan results showing standing wave field around the slit.

The results presented so far seem to indicate that the AE signals recorded during crack advance may contain embedded information about the length of the crack. This embedded information is generated by the fact that the AE energy discarded at the crack tip during crack growth may generate standing waves that would engage the crack into local resonances. These resonances are of high frequency, typically hundreds of kHz and low MHz. The current disclosure proposes that these local vibration resonances would modulate the AE wave signal that travels away from the crack thus embedding crack-size information in the AE wave signal. We also hypothesize that these AE wave signals would travel at a distance from the crack and could be capture with appropriate AE transducers that sufficiently sensitive for this task. These AE wave signals, could be processed and decoded such as to reveal the embedded crack-size information.

Our laboratory experiments on a slit cut into a large plate have confirmed the FEM simulation results. However, this experiment is rather facile, because it ensured stress-free non-contacting faying surfaces that may not always be the case in actual operational AE work because a fatigue crack may open only temporarily during the fatigue cycle.

Nonetheless, the current disclosure's FEM modeling confirmed by laboratory experiments indicate that crack length information may exist encoded into the AE wave signal. To summarize, fatigue crack generated AE waves were studied with analytical simulation, numerical simulation, and experiments. Finite element method (FEM) analysis was used to model AE events due to fatigue crack growth. This was done using dipole excitation at the crack tips. Harmonic analysis was also performed on these FE models to understand the local vibrational modes. Experimental study was carried out to verify these results.

The acoustic emission signals received from a growing crack may be processed to yield information about the crack length and other geometric properties. A library of features of the AE waveforms can be used to identify fatigue crack geometric features. Thus, we may be able to identify the geometric features of a fatigue crack such as crack length, and crack tip locations by "listening" to the crack-generated AE waves. The amplitude and frequency contents of the secondary wave emitting from fatigue crack resonances may be used to determine their geometric properties. Other possible geometries that the current disclosure may reveal include finding hairline cracks that may not be detected via other nondestructive testing methods. Crack geometry may generate specific high frequency spectrum signatures that may be detected by the current method and could be related to particular crack size and geometry. By geometry we understand this to mean length, orientation, straight or "zig zag" patterns, single or split crack paths, length, breadth, and depth of the cracks, the presence of a single crack or multiple cracks, etc., as geometry would be known to those of skill in the art.

The novelty of the current disclosure is that various groups of AE waveforms were used to explain the complex phenomena of the metal fatigue. In situ AE-fatigue experiments were conducted to monitor the fatigue crack growth with simultaneous measurement of AE signals, fatigue loading, and optical crack growth measurement. An in situ microscope was also used to optically monitor the crack growth while the fatigue loading was being applied in the mechanical testing system (MTS) machine. The AE-hit based analysis, as well as AE-waveform based analysis, has been performed to identify the various groups of the waveforms in synchronized with the fatigue loading. A source localization method was also used to confirm the source of the AE signal groups.

A huge amount of AE data can be sorted into few groups based on the waveform signatures of the AE and this is a significant achievement of the current disclosure. Another important achievement is the coordination of the AE waveform signatures with the load level during the cyclic fatigue. The methodology discussed in this research could be applicable to the study of fatigue crack-related AE events for varieties of material using AE method. The source localization for confirming the fatigue crack source of the AE waveforms may be another significant portion of the current research.

In Situ AE-Fatigue Experimental Setup

Figure 10:
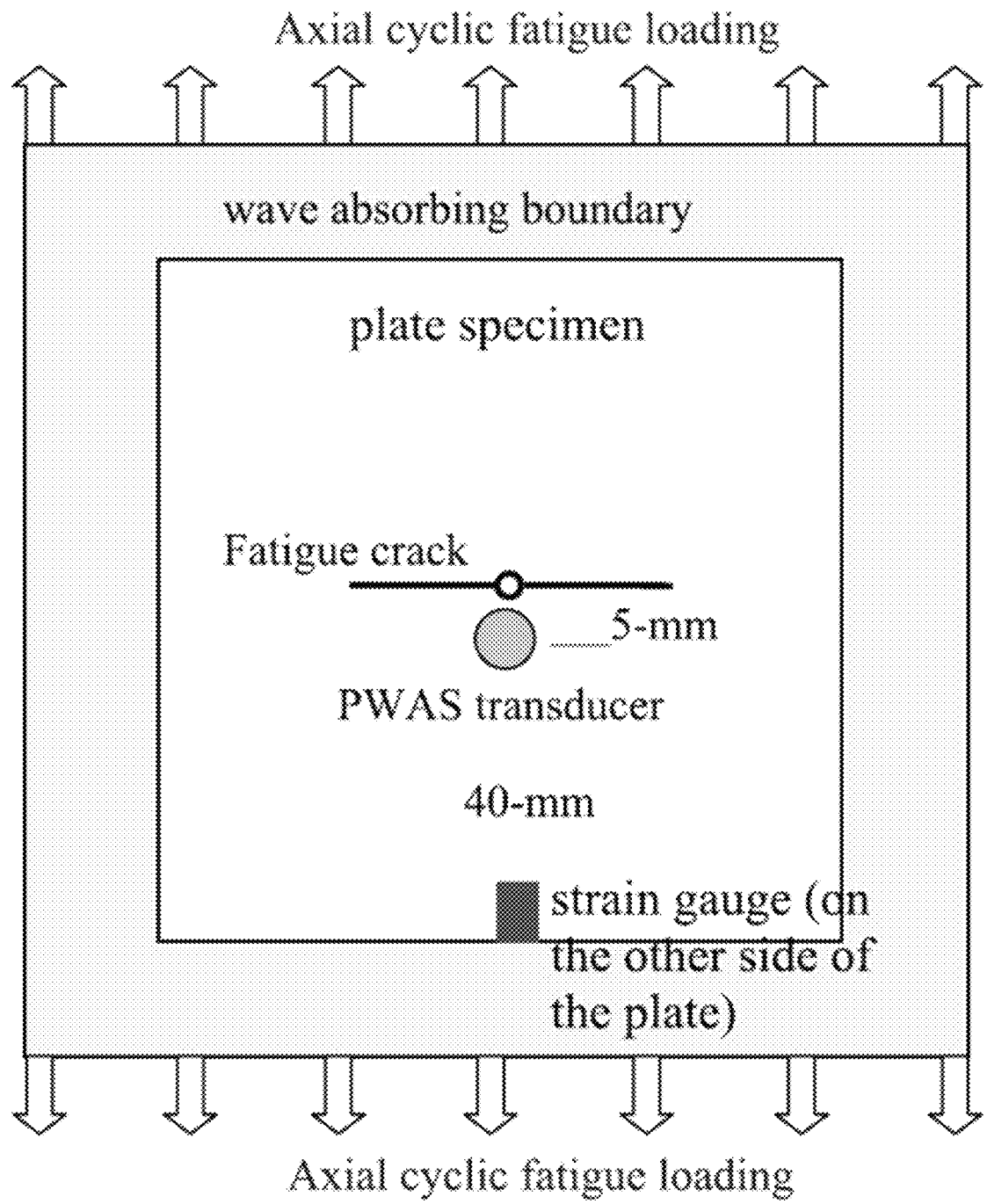
FIG. 10 shows a schematic diagram of the fatigue test plate-specimen.

An in situ AE-fatigue experiment was designed and performed to simultaneously measure the AE signals while the fatigue crack had grown under fatigue loading. Aircraft grade aluminum Al-2024 T3 material was used to make the test plate-specimen. The dimension of the specimen was 305 mm in length, 100 mm in width, and 1 mm in thickness. The schematic diagram of the specimen with one PWAS transducer is shown in FIG. 10.

To initiate the fatigue crack, a small (1 mm diameter) hole was drilled at the center of the specimen. A hydraulic MTS machine was used to apply the fatigue loading to the specimen as shown in FIG. 10 at (b). An axial tensile cyclic fatigue loading was sinusoidally varied between a maximum and a minimum tensile load level. The cyclic fatigue loadings were chosen based on the practical application in aircraft testing. Typically, in aircraft fatigue testing, the stress level is maintained between 65% and 6.5% of the yield strength of the material. The maximum and minimum load levels were calculated based on these stress level and the yield strength aluminum Al 2024 T3 is 345 MPa. An R-ratio ($\sigma_{min}/\sigma_{max}$) of 0.1 was maintained for the applied loading.

The fatigue experiment was conducted in two steps. In the first step, the fatigue crack started to initiate after running 33 000 fatigue cycles at a rate of 4 Hz. The crack grew up to 20 mm (tip to tip length) at this loading level and rate, however, without any AE measurement. The 20 mm crack was the initial crack for the second step of the experiment. At this initial crack, we scribed a mark and were able to optically monitor the crack growth easily. We were certain that the crack grew from a prescribed mark at 20 mm. At the beginning (before 33 000 cycles), the crack opening displacement, as well as crack growth rate, was very small to optically measure the crack growth. This made it very difficult to pinpoint the crack tip. When the crack length was relatively larger (~20 mm), the crack opening displacement was larger and it was easier to locate the crack tip and measure the crack length optically.

In the second step, the specimen was equipped with two commercially available AE sensors (model: PICO from PAC Mistras Inc.; thereafter, mentioned as 'PICO' sensor) and two PWAS transducers. Two PICO AE sensors were bonded 5 mm and 25 mm from the crack. Two PWAS transducers were bonded symmetrically about the crack on 5 and 25 mm from the crack. There were two main purposes of bonding all these sensors: (1) to confirm if all of them can pick up the AE signals, (2) the identification of the sources of these AE signals.

The current disclosure also compared the frequency of the commercial PICO transducer and our PWAS transducer and found that our PWAS transducers capture signals with a wider frequency band than the commercial PICO transducers. Hence, the AE waveform comparison and sorting in various groups as discussed in this paper is based on signals recorded consistently with only one transducer type, viz the PWAS transducer. We used a simultaneous recording of the signal received from PWAS transducers placed at various locations and found that the signal frequency content remained the same, though amplitude diminished with distance from the crack.

Figure 9:
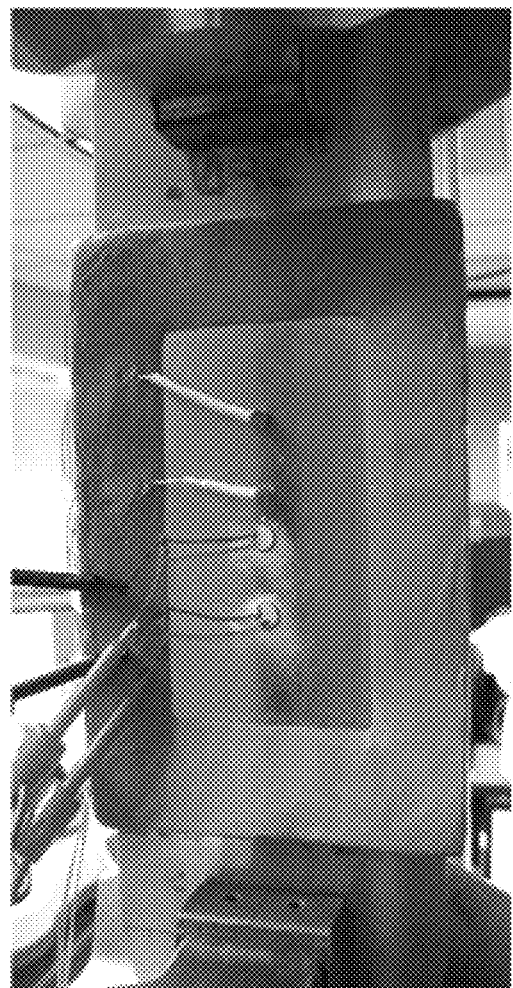
FIG. 9 shows the fatigue test plate-specimen on the MTS machine as well as shows near-field PWAS and PICO sensors relative to the fatigue crack of FIGS. 6 and 7.
Figure 9:
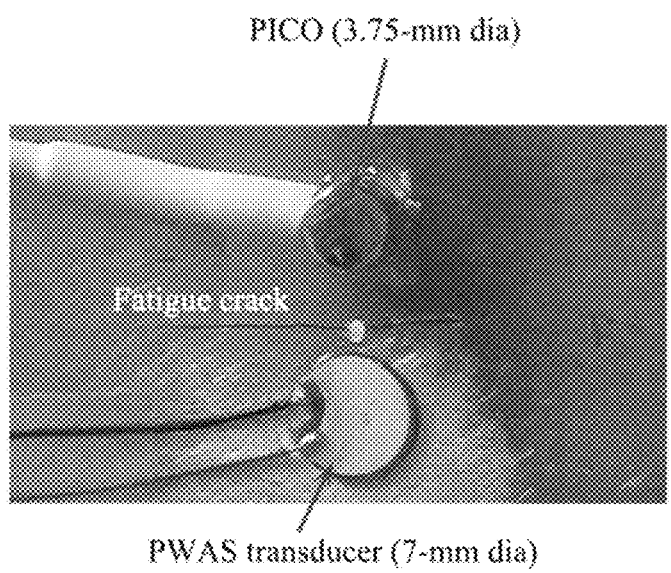

A schematic of the near-field PWAS transducer is shown in FIG. 10. Although there were three other sensors (one farfield PWAS and two PICO sensors as shown in FIG. 9, only near-field PWAS transducer is shown since the PWAS signals were explored more in this communication. Such proximity of a sensor allowed picking up low amplitude AE signals which would otherwise diminish due to geometric spreading and any material damping as they travel away from the crack. Furthermore, it would capture waveforms from any local interaction of the AE signals and the crack. A strain gauge was also bonded 40 mm from the crack to pick up the fatigue load information directly from the specimen.

The output from the strain gauge was fed into the AE measuring system. A wave absorbing clay boundary was used around the region of fatigue crack and sensors as shown in FIG. 10. This boundary would strongly attenuate the acoustic waves before they reach the plate edge thus minimizing the effect of boundary reflections from the recorded AE signals. This attenuation is higher for the antisymmetric wave mode in the considered frequency-thickness regime compared to the symmetric wave mode. However, the attenuation may not be entirely zero.

There was a minimal possibility to have any friction that may cause any AE between the absorbing material and the plate due to the cyclic loading. If there were any friction, they are more likely to generate AE in sync with the loading frequency which was very low (0.25 Hz). The low frequency (<30 kHz) AE were filtered out during the AE recording process. This filtering was done by using a preamplifier with a built-in bandpass filter (30-700 kHz). A 40 dB gain was selected in the preamplifier. A sampling rate of 10 MHz was used and the threshold (about 48 dB) was set just 2 dB above the environmental noise level.

Figure 11:
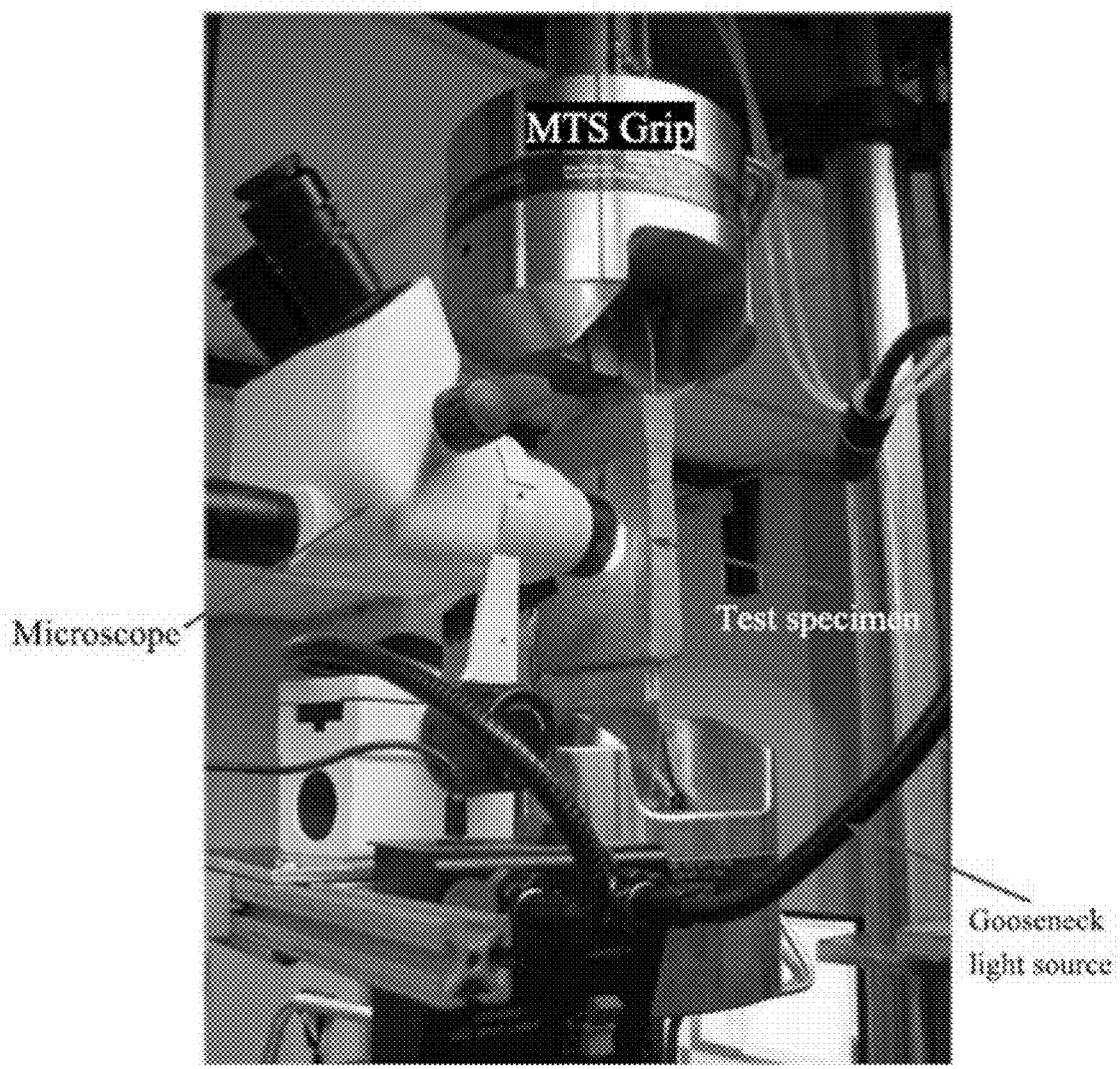
FIG. 11 shows an actual fatigue test specimen mounted in the MTS grips.

An in situ microscope was used to optically monitor the fatigue crack growth, as shown in FIG. 11. A digital camera was attached to the microscope that allowed capturing still images as well as the video recording of the fatigue crack growth. A gooseneck light was used for necessary light for the microscope camera. It also used to illuminate the crack from the front and back side of the plate. Various combination of the light adjustment was used for proper image capturing.

Three parallel systems were used simultaneously during the in situ AE-fatigue experiment: (a) fatigue loading by the MTS machine, (b) AE and load measurement by the AE system, and (c) fatigue crack growth measurement by an in situ microscope camera. Since the AE recording and the fatigue load recording was performed in the same AE measuring instrument, it would allow better synchronization between the fatigue load and AE measurement. Thus, the measured AE hit and the fatigue load had a common timeline with respect to the global time of reference.

AE Hits Synchronized with the Fatigue Loading

Figure 12:
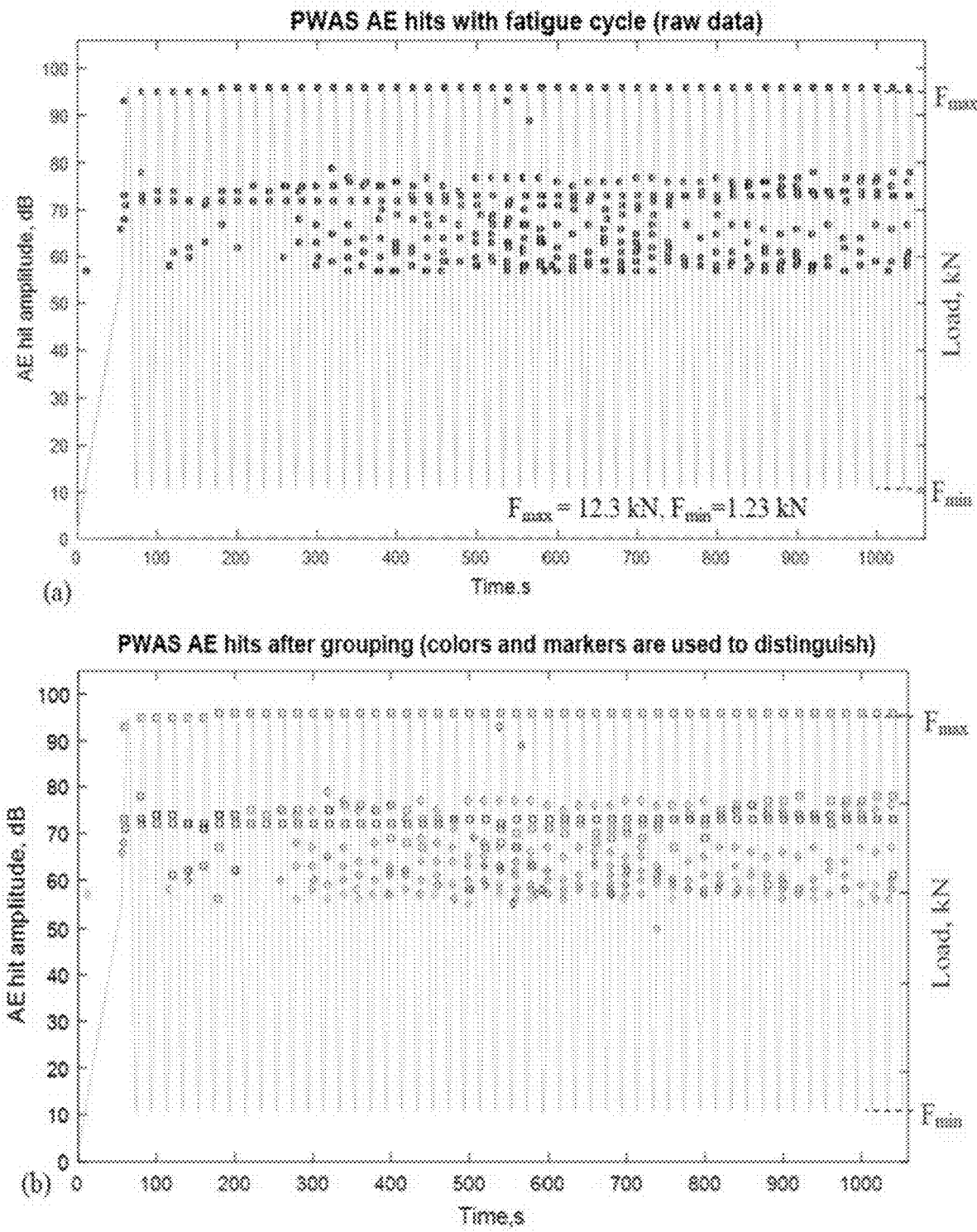
FIG. 12 shows at AE hits captured by the PWAS transducer.

The cyclic fatigue loading and the AE hits were measured in a common timeline. The fatigue crack grew by releasing the AE signals that were captured by all the AE sensors. The AE hit captured by the near-field PWAS transducer was extensively analyzed and presented in this communication. The similar nature of AE hits was also observed in other sensors but not discussed for the sake of brevity. The synchronized plot of the fatigue loading and the AE hits captured by the near-field PWAS is shown in FIG. 12. The AE hit amplitude was measured in dB scale. The fatigue loading was varied sinusoidally between a maximum ($F_{max}$=12.3 kN) and minimum ($F_{min}$=1.23 kN) load level with a slower loading rate (0.05 Hz).

To preserve the clarity of the load-hit synchronization plot, only 50 fatigue cycles results are shown in FIG. 12. The near-field PWAS transducer captured 427 AE hits in 50 fatigue cycles. In this particular 50 cycles, the fatigue crack growth was optically measured as approx. 300 µm. It can be noticed that there are high-amplitude AE hits at about 96 dB. They happened at almost every cycle near the peak load of the fatigue cycle. There are numerous AE hits in the range of 55-75 dB. At every cycle, there were multiple AE hits.

AE hits were observed during the loading cycle meaning when the fatigue load was going from minimum to the maximum level. On the unloading cycle meaning when the fatigue load was going from maximum to minimum, no AE hits were observed. Each AE hit corresponded to an AE waveform. The individual waveform analysis on the AE hits was performed to find any possible similarities in the AE signals. That allowed us grouping the AE hits as discussed next.

FIG. 9 at (a) shows the fatigue test plate-specimen on the MTS machine. Four transducers: two PWAS and two PICO AE sensors were used to record the AE signals. FIG. 9 at (b) shows near-field PWAS and PICO sensors relative to the fatigue crack. For scale, please note, the hole has 1 mm diameter.

The AE hits were analyzed at the individual waveform level. The waveform of each AE hit was analyzed in both time domain signal and frequency spectrum. Fast Fourier transform (FFT) was used to obtain the frequency spectrum from the time-domain signal. It was found that there were some groups of AE hits that had the same time-domain signal and frequency spectrum.

Classification of the AE Events into Different Groups

The 427 raw AE hits as presented in FIG. 12 at (a) can produce 427 time-domain waveforms. Some similarities in the time domain signals were observed. Also, the FFT was performed on each of the 427 waveforms which generated 427 frequency-domain waveforms. It was found that there were also some similarities in these frequency domain waveforms. Then the AE events are sorted based on the same (or very close) time-domain signal and frequency spectrum. In this sorting process, nine groups of AE hits were produced. The AE events in a particular group have almost same time-domain signal and frequency spectrum (as illustrated later by comparing the waveforms).

Once, the AE events are classified based on the time signal and frequency spectrum, some other similarities, for example, the load levels at which they occur were found very similar. Also, the duration and the amplitude of these AE events were found to be similar.

Repetitive AE Waveforms at Every Fatigue Cycle

Figure 13:
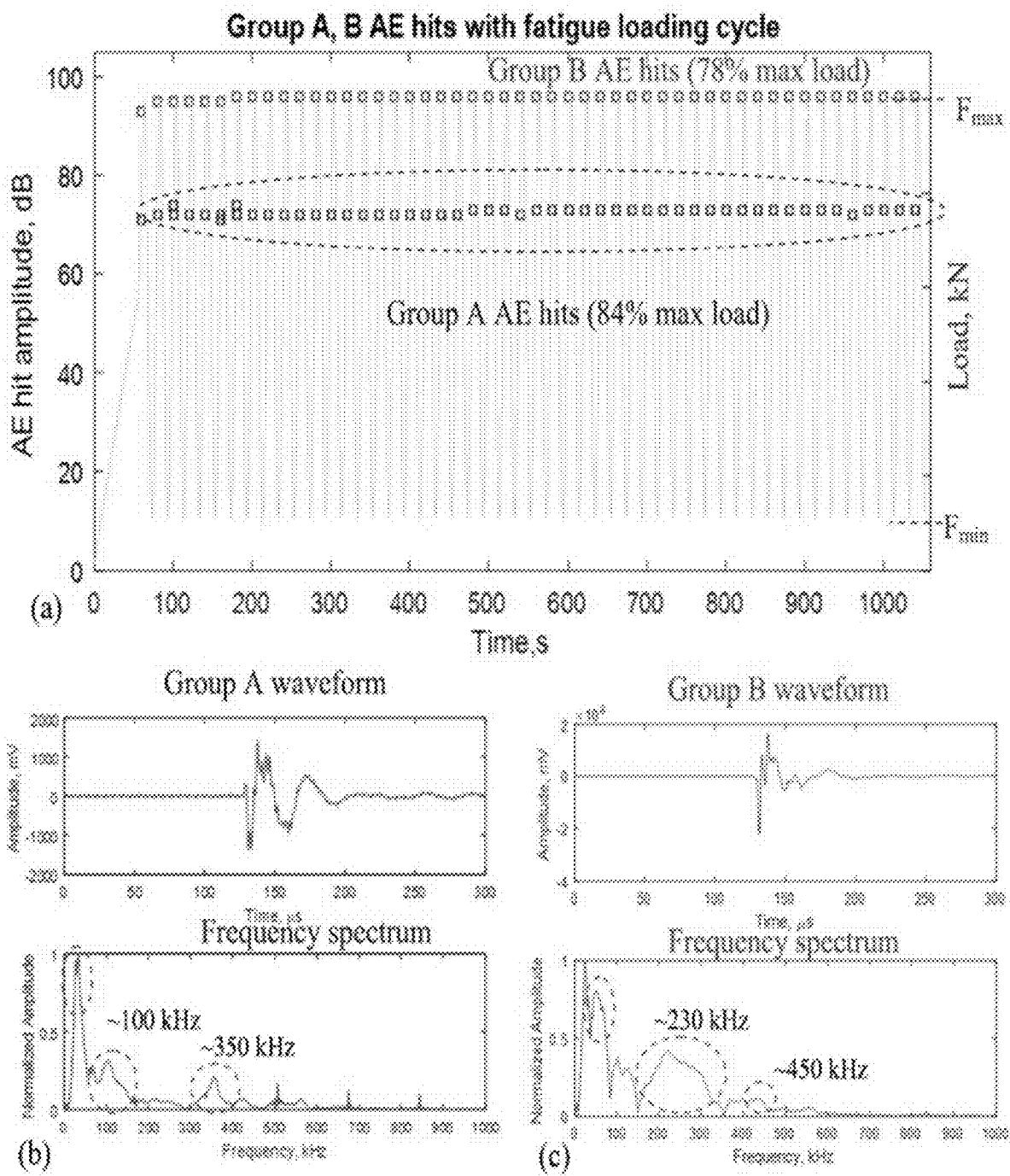
FIG. 13 shows group AE hits plotted in sync with cyclic fatigue loading.

From FIG. 12, one can easily distinguish two different zones of AE hits: the higher-amplitude zone at 96 dB and a denser low-amplitude zone at 55-75 dB. From the denser zone, it was identified that there exist a group of AE hits which had the same time-domain signal and frequency spectrum. They were named as 'group A'. The hit amplitudes of group A were almost constant at 72 dB. Interestingly, all of them happened at approximately 84% of maximum fatigue load. It indicated that there was a certain AE source due to a change happen in fatigue crack at 84% of maximum load. Group A hits are shown in FIG. 13 at (a) and marked by a dotted ellipse.

Figure 14:
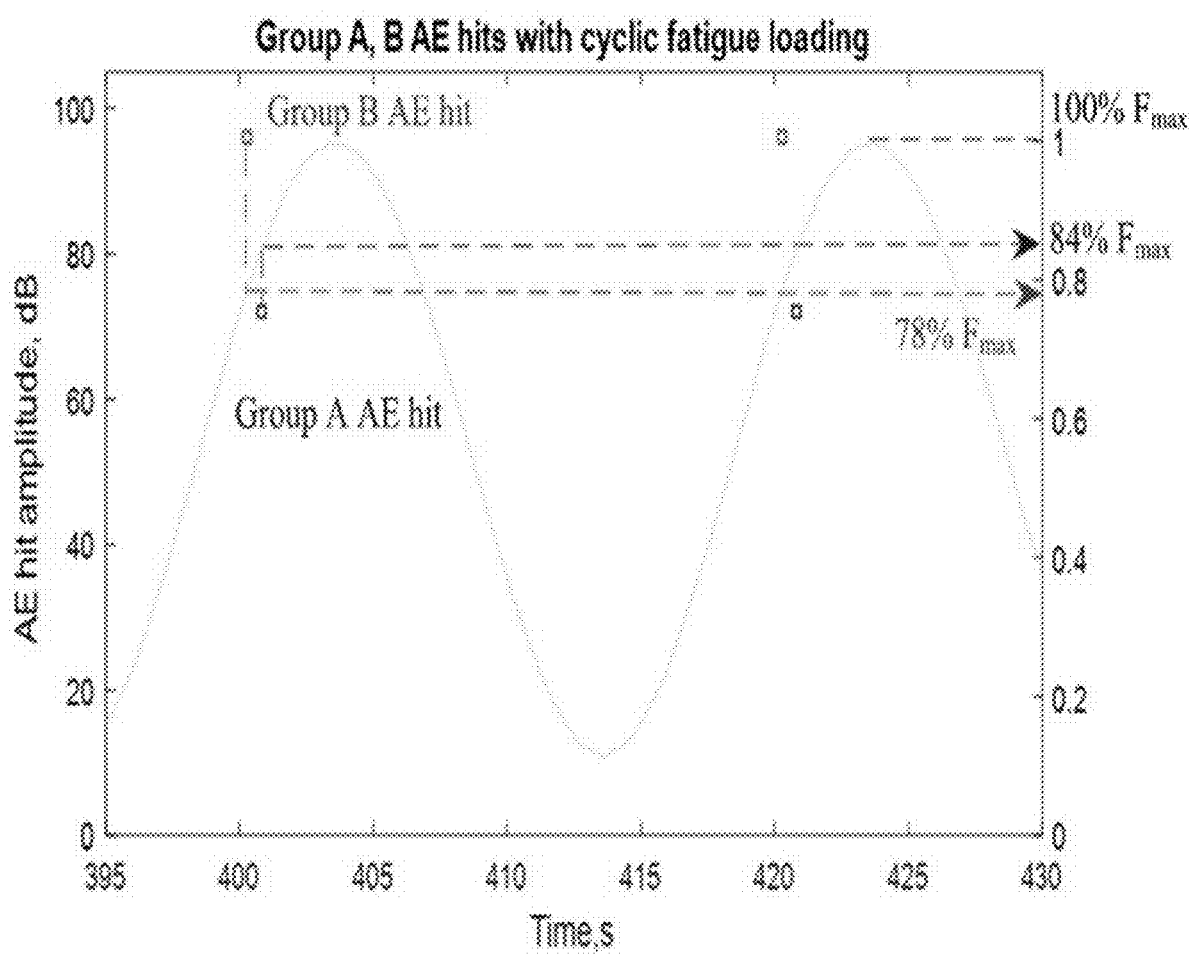
FIG. 14 shows the load level determination of group A and group B AE hit.

All the higher-amplitude (96 dB) AE hits have the same time-domain signal and frequency spectrum. These AE hits were assigned as 'group B' and shown in FIG. 13 at (a). The load cell determination for the AE hit is illustrated in FIG. 14. FIG. 9 shows (a) The fatigue test plate-specimen on the MTS machine. Four transducers: two PWAS and two PICO AE sensors were used to record the AE signals. (b) Near-field PWAS and PICO sensors relative to the fatigue crack. For scale, please note, the hole has 1 mm diameter.

FIG. 10 shows a schematic diagram of the fatigue test plate-specimen with 1 mm diameter hole and a fatigue crack of variable length; A PWAS transducer, 5 mm from the crack, was capturing the AE signals while the axial cyclic fatigue loading was being applied; a strain gauge (on the other side of the plate), 40 mm from the crack, was used to record the fatigue load directly from the specimen. FIG. 11 shows the actual fatigue test specimen mounted in the MTS grips; an in situ microscope was used to optically monitor the fatigue crack growth and measure the crack opening displacements; gooseneck light source was used to properly illuminate the fatigue crack.

Similarities in the Signals Belonging to One Group

Figure 15:
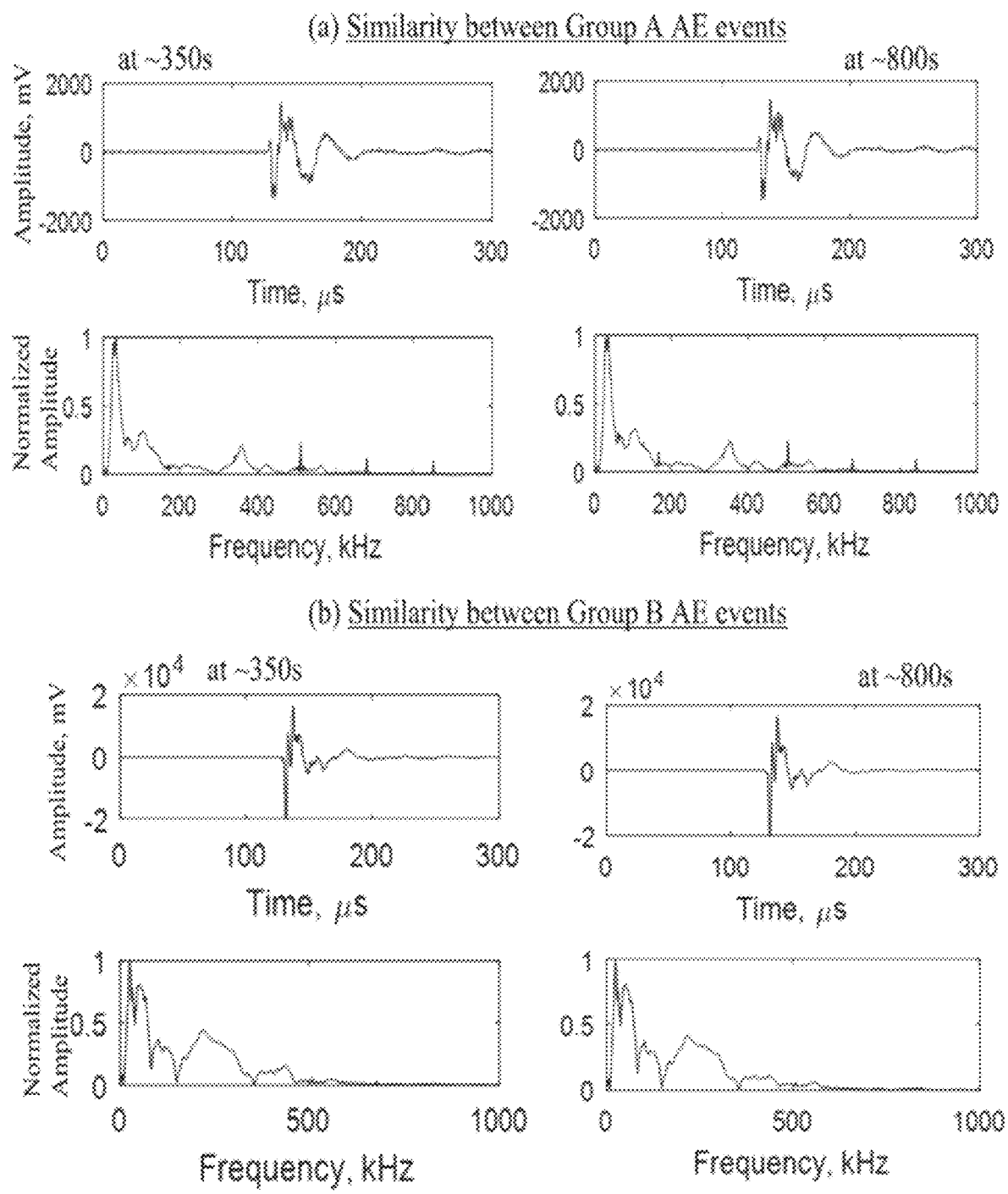
FIG. 15 shows similarity between AE events at two different times.

To illustrate the similarities of the signals belonging to one group, we picked up few AE events from group A and group B. The time-domain signals and frequency spectra of the AE waveforms are plotted in FIG. 15. The AE events at two different times (~350 s, ~800 s) are shown here. FIG. 15 at (a) shows that both time-domain signals and frequency spectra of group A are very similar to each other even though they happened at two different fatigue cycles (~350 s, ~800 s).

FIG. 15 at (b) shows that both time-domain signals and frequency spectra of group B are very similar to each other even though they happened at two different fatigue cycles (~350 s, ~800 s). A similar observation was true for other AE events and other groups of AE signals.

The representative waveforms from group A, B is plotted in FIG. 13 at (b) and (c), respectively. Both time-domain signals and frequency spectra are shown here. It was observed that the AE waveform of group A was different from that of B. Group A has frequency peaks at 40, 100, 350 kHz whereas the group B has frequency peaks at 30, 50, 100, 230, 450 kHz. Group B waveform contained some of the frequency peaks of group A, for example, 100 kHz. The amplitude of the group B waveform was several orders higher than that of the group A. When we compare the time of occurrences of the two waveforms, we found that during the fatigue loading, group B (at 78% $F_{max}$) happened earlier than the group A (at 84% $F_{max}$). Both of them happened at every fatigue cycle.

Figure 16:
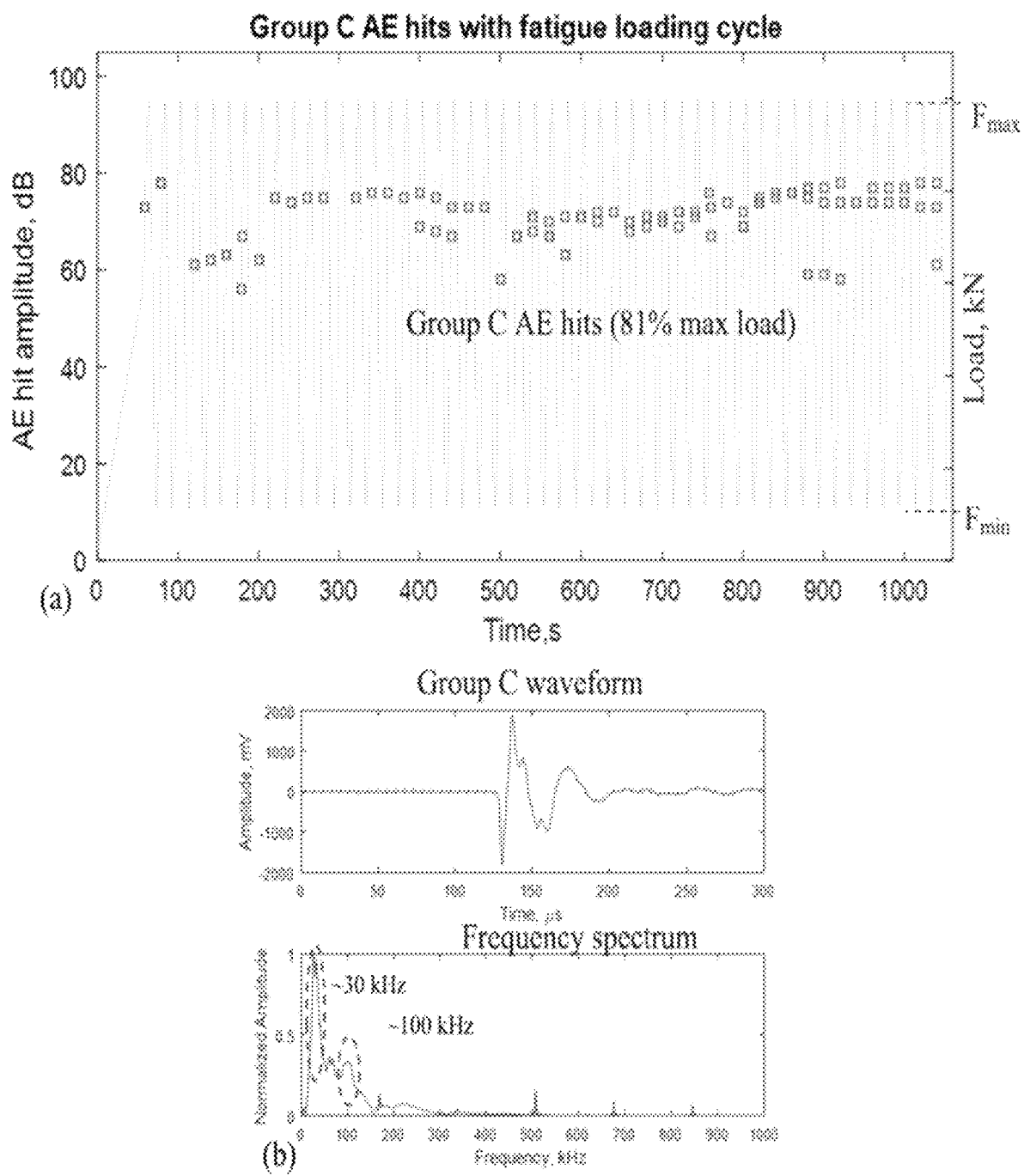
FIG. 16 shows at AE hits plotted in sync with the cyclic fatigue loading at the time domain signal and frequency spectrum of a representative group C waveform.

Group C AE hits can be identified that happened in between group A and B. They happened at 81% of fatigue loading. The AE hit-load plot of group C is shown in FIG. 16 at (a). It can be shown that until 400 s, group C happened once at every fatigue cycle whereas, after 400 s, two group C waveforms happened at every cycle. The amplitudes of the group C hits were not constant unlike group A, B rather they varied. When the two group C hits happened as a cluster, one had a higher amplitude than the other. It seemed like the acoustic energy from the fatigue crack had been split into two wave packets.

The time-domain signal and the frequency spectrum of a representative group C waveform are shown in FIG. 16 at (b). They are different from the group A, B. The major frequency peaks of group C waveform are 30, 100 kHz. The low-frequency peaks are dominant in this group.

Appearance, Continuation and Disappearing Nature of Certain Waveforms

Figure 17:
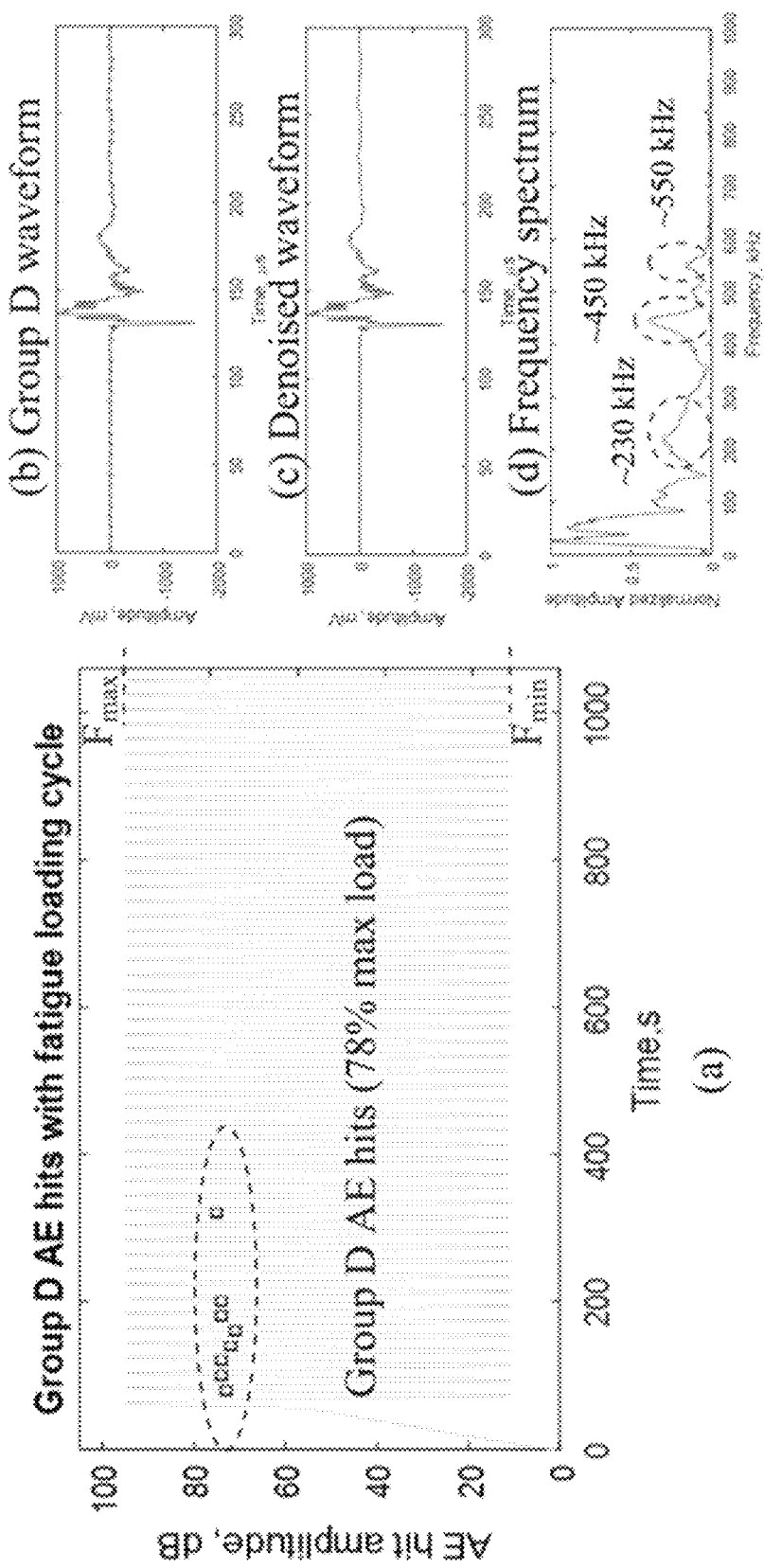
FIG. 17 shows at Group D AE hits plotted in sync with cyclic fatigue loading.

There were group D AE hits that happened at 78% of fatigue loading. The AE hit plot of group D synchronized with the fatigue loading is shown in FIG. 17 at (a). They appeared for some time and then discontinued after 320 s. The amplitude of group D was relatively smaller than the group A, B, C. The time-domain signal of a representative group D waveform is shown at FIG. 17 at (b). It can be noticed that there is a regular noise floor before and after the main signal. This can easily be removed to obtain a denoised waveform as plotted in FIG. 17 at (c).

FIG. 12 shows at (a) AE hits captured by the PWAS transducer are plotted in synchronization with the cyclic fatigue loading (raw data); the cyclic fatigue loading was sinusoidally varied with time; only 50 complete fatigue cycles are shown in this picture to preserve the clarity of the load hit synchronization. In this particular 50 cycles, the fatigue crack growth was optically measured as approx. 300 μm. FIG. 12 at (b) PWAS AE hits after grouping; different colors and marker shapes are used to distinguish the AE hit groups.

The frequency spectrum of the denoised waveform is shown in FIG. 17 at (c). They have same frequency contents as group B waveforms except for an additional peak at 550 kHz in group D. They also happened at the similar fatigue load level of group B. The group B and D may be related to the same AE event due to a change in the fatigue crack.

Clustered Waveforms at Every Fatigue Cycle

Figure 18:
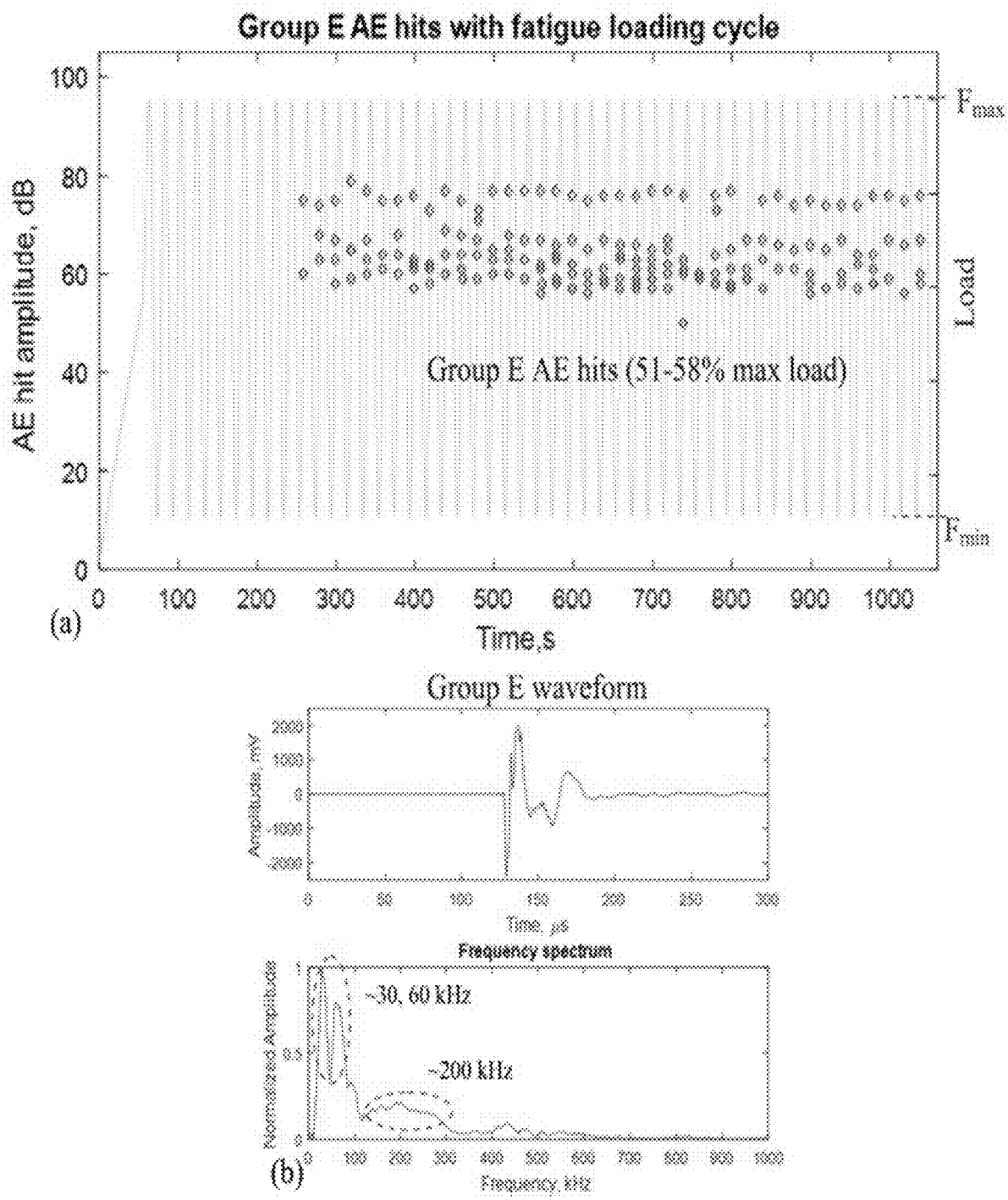
FIG. 18 shows Group E AE hits plotted in sync with cyclic fatigue loading.

Group E AE hits in sync with the cyclic fatigue loading are plotted in FIG. 18 at (a). The main feature of these hits was that they happened as a cluster of two or three hits in every cycle. They happened in between 51% and 58% of maximum load in the fatigue loading cycle. They appeared after approx. 250 s and then continued in every fatigue cycle. In a cluster, the first hit had a higher amplitude than that of the second and third hits. The time-domain signals and the frequency spectra of these AE hits in a cluster are exactly same except the amplitudes. The waveform of a representative AE hit is shown in FIG. 18 at (b). The first AE hit of a particular cluster is shown in FIG. 18. The frequency spectrum shows that the dominant frequency peaks are located at 30, 60, 200 kHz.

Possible Explanation of Clustered Waveforms

Figure 19:
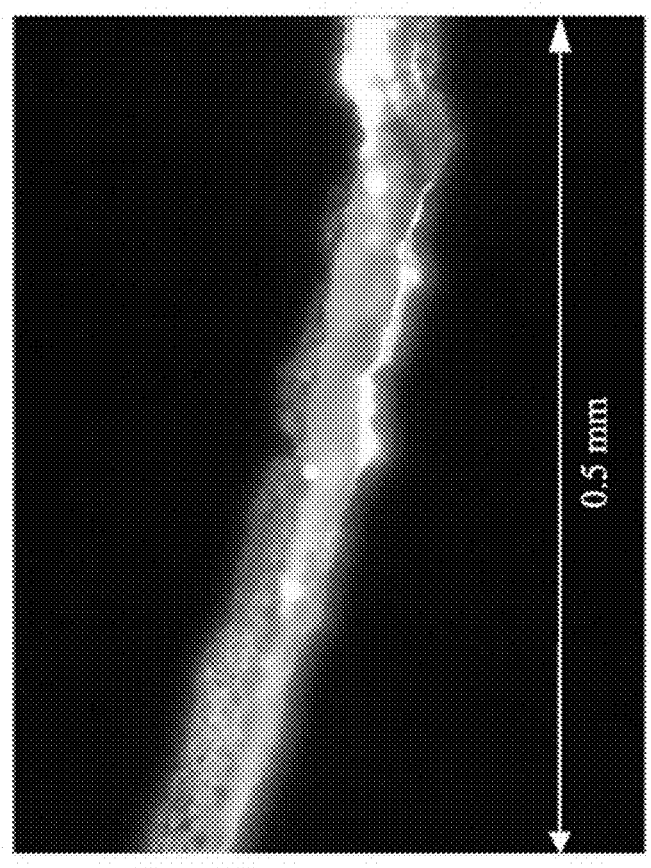
FIG. 19 shows a microscopic view of the zigzags and the faying surfaces of a fatigue crack.
Figure 19:
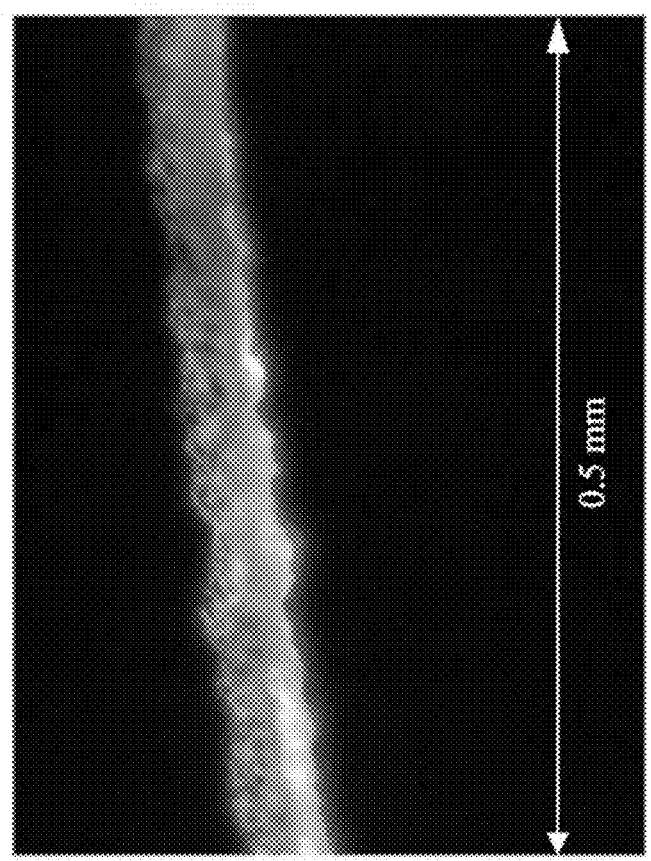

There may be a sequence of small AE events that were happening in every cycle at relatively low loading levels (51%-58% $F_{max}$). These load levels may be too small to cause any crack extension. The possible explanation for the cluster group E AE hits could be: (a) crack surfaces have a zigzag saw-tooth thickness-wise pattern because cracks in thin-gauge specimens happen on shear planes. The zigzag nature of the crack was captured by the in situ microscopic images and is shown in FIG. 19. The faying surfaces along the thickness can be seen from this figure. The light was shining directly from behind the fatigue crack. (b) Because crack propagation has a zigzag path, cracks are not perfectly straight and may 'catch' when opening. (c) Repeated saw-tooth crushing seems to happen, first at 51% load level and then at slightly higher loads, but of progressively smaller AE intensity. (d) When the first crushing is happening at 51% load, it is releasing higher amplitude AE signals. Subsequent crushing is causing lower amplitude AE signals.

The crack extension was optically monitored by this microscope camera video recording. However, much detail on the optical microscopic was not given because the main focus of the current research was the AE technique based on AE waveform. The microscopic images have just helped the process of explaining the above-mentioned physics of the AE waveforms.

FIG. 13 at (a) shows group A, B AE hits are plotted in sync with the cyclic fatigue loading; group A, B happened at every cycle but at different load levels; group A happened at 84% of maximum load level while group B happened at 78% of maximum load level; FIG. 13 at (b) and (c) shows the waveforms and frequency spectra of group A, B, respectively; the major frequency peaks of each group are marked by dotted ellipses. Please note, $F_{max}$=12.3 kN, $F_{min}$=1.23 kN.

FIG. 14 shows the load level determination of group A and group B AE hit. Draw a vertical line from the AE hit to the loading cycle which gives the time when the AE hit happened and drawing a horizontal line from that intersection point to the load axis gives the load level. A similar approach has been used for determining the load level of all the AE hit groups.

FIG. 15 shows the similarity between the AE events happened at two different times (~350 s, ~800 s) in a particular group. For illustration purpose, only two groups (A, B) are presented here. The time-domain and the frequency spectrum of each signal are plotted.

FIG. 16 shows at (a) Group C AE hits are plotted in sync with the cyclic fatigue loading; the hit amplitude varied over the fatigue cycles, they happened at every cycle approx. 81% of maximum load. FIG. 16 illustrates at (b) the time domain signal and frequency spectrum of a representative group C waveform.

FIG. 17 shows at (a) Group D AE hits are plotted in sync with the cyclic fatigue loading; they happened at approx. 78% of maximum load, they appeared in the beginning and disappeared after approx. 300 s. FIG. 17 illustrates at (b) the raw time domain signal of group D. At (c), FIG. 17 shows the denoised waveform of (b). At (d), FIG. 17 provides frequency spectrum of the denoised group D waveform.

FIG. 18 at (a) shows Group E AE hits are plotted in sync with the cyclic fatigue loading; they happened as a cluster of two or three hits in every cycle and at approx. 51%-58% of maximum load, they appeared after approx. 250 s and then continued. At (b), FIG. 18 provides the time domain denoised signal and frequency spectrum of a representative group E waveform.

Characteristics of Rest of the AE Waveform Groups

Figure 20:
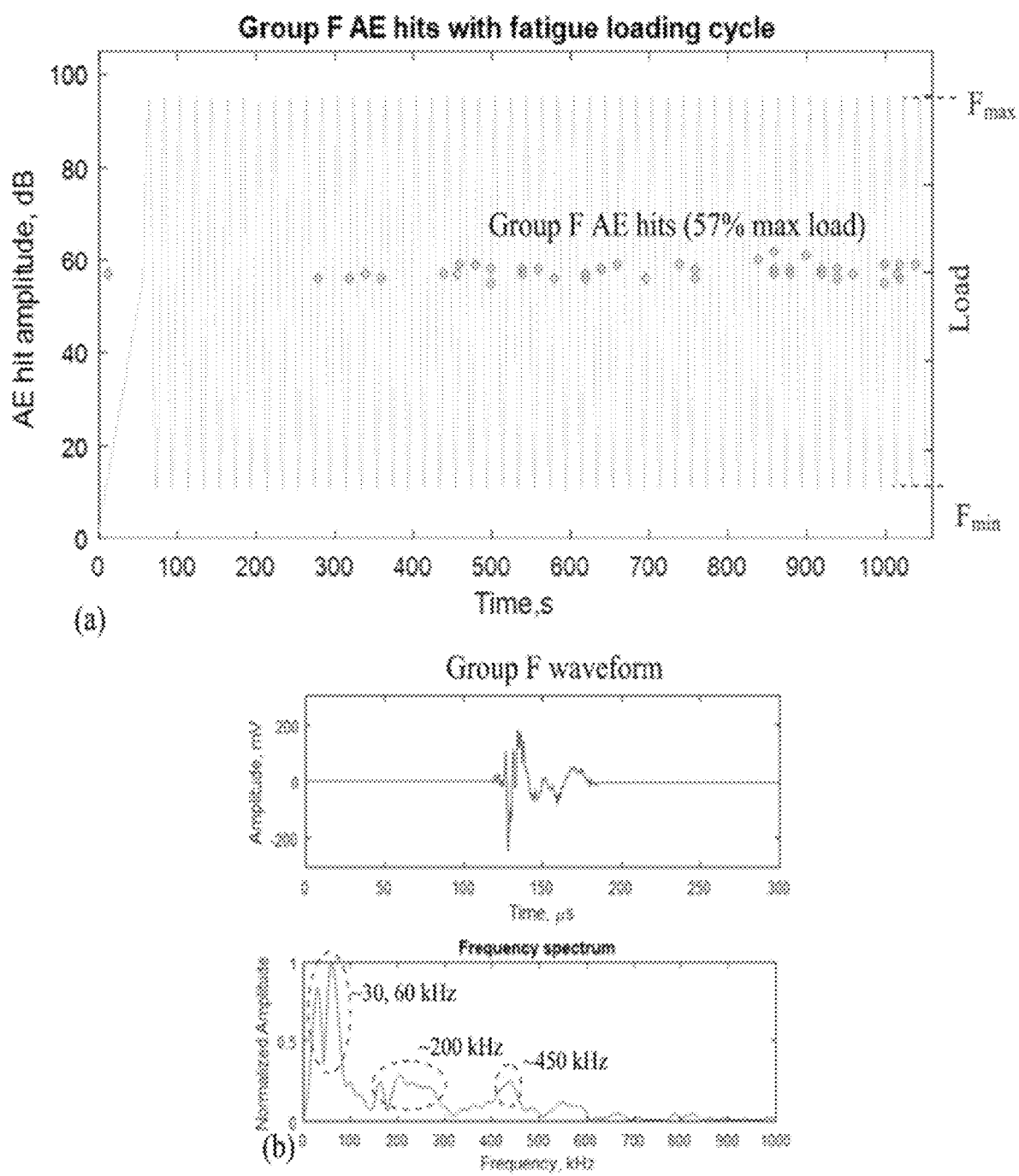
FIG. 20 shows Group F AE hits plotted in sync with cyclic fatigue loading.

Group F AE hits are shown in FIG. 20 at (a). These hits happened at the similar time of group E. They also happened at every fatigue cycle. The time-domain signal and the frequency spectrum of a representative group F waveform are shown in FIG. 20 at (b). The frequency spectrum was same as that of group E except that it had an additional higher frequency at 450 kHz. They happened at 57% of maximum load level. The AE source of group F may be closely related to that of group E.

Figure 21:
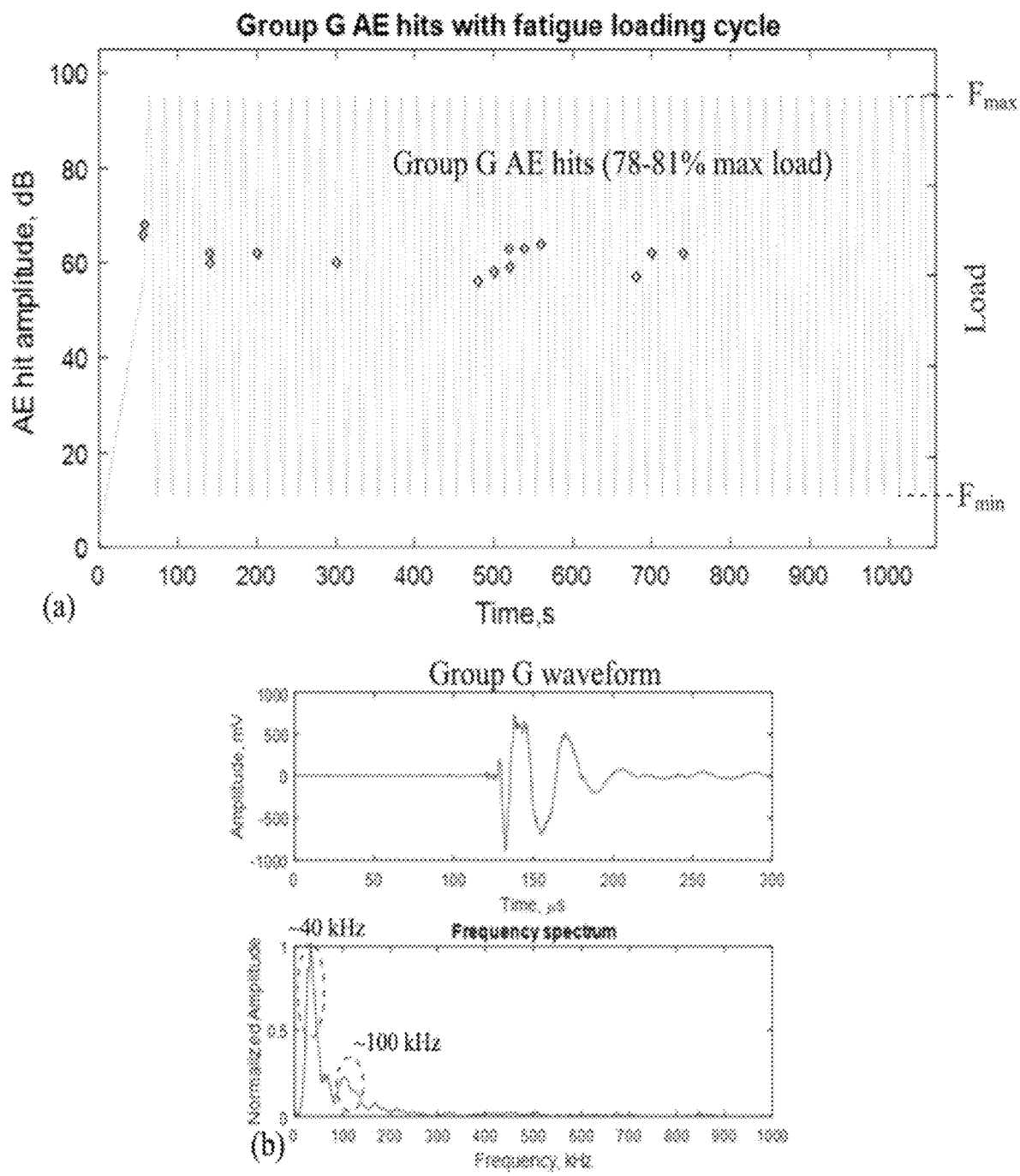
FIG. 21 shows Group G AE hits plotted in sync with cyclic fatigue loading.
Figure 22:
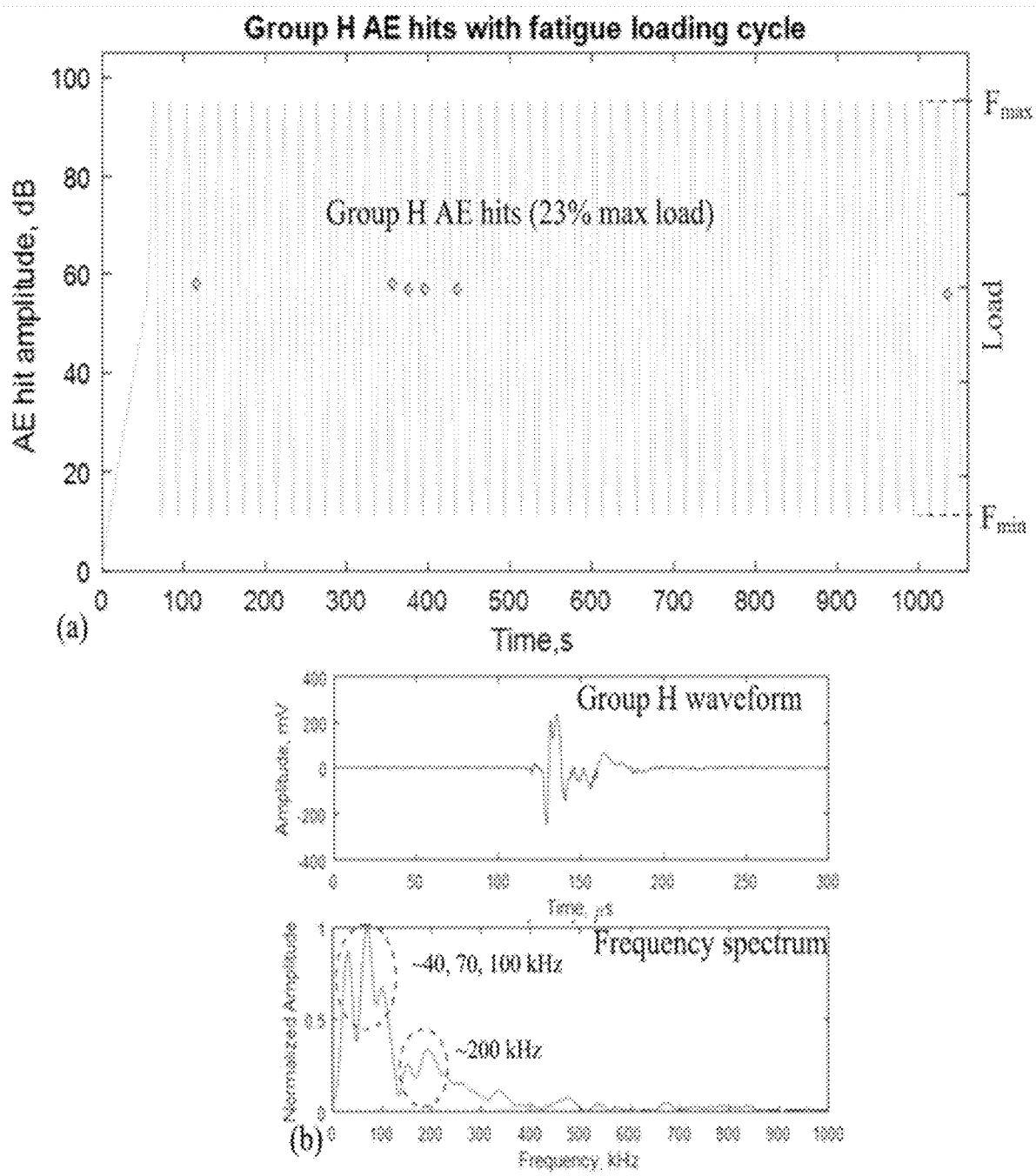
FIG. 22 shows Group H AE hits plotted in sync with cyclic fatigue loading.

Group G AE hits happened in between 78% and 81% of maximum load level during fatigue loading period as shown in FIG. 21 at (a). They happened sporadically over the fatigue cycles. The time-domain signal and the frequency spectrum of a representative group G waveform are shown in FIG. 21 at (b). They were similar to the group C AE hits based on the frequency spectrum except for the low-frequency peaks at 40 kHz. The other difference as that they happened at a variable load level from 78% to 81% $F_{max}$. A few AE hits were observed near very low load level (e.g., 23% $F_{max}$). These were assigned as group H. The hits sync with the fatigue load is shown in FIG. 22 at (a). The time domain signal and the frequency spectrum of a representative group H waveform are shown in FIG. 22 at (b). The major frequency peaks of the group H waveform were 40, 70, 100, 200 kHz.

The current disclosure also observed a very few irregular AE hits happened randomly at different load levels (not shown). Most of them had a sharp peak and hence, we classified them as 'sharp'. They had a wideband frequency as mentioned in the summary table 1, see FIG. 23. They happened somewhere between 23% and 94% $F_{max}$. They had a very wide range of hit amplitudes that resulted in large standard deviation (SD). The AE signals may differ slightly at various crack lengths because of any standing wave modes along the crack length. A single parameter from the frequency spectrum, for example, centroid may help to quantify the groupings.

Summary of the AE Waveform Groups

The summary statistics of the 427 AE hits in 50 fatigue cycles are shown in table 1, see FIG. 23. We had nine different groups of AE hits from A, B, C, K, Sharp. The number of AE hits, the load level of occurrence, mean hit amplitude, SD of the mean hit amplitude, and major frequency peaks for each group are detailed in this table.

It was observed that the AE waveform pattern in the lower load level (below 58% of maximum load) is different from that in the higher load level (between 70% and 85% of maximum load level). The waveform groups (for example, group E, F, H) that happened at the lower load level have mostly lower frequency contents (60 kHz, 100 kHz, 200 kHz). In that load level, mostly crack friction may happen that could generate these lower frequency content AE signals. On the other hand, mostly crack extension related AE signals (for example, group A, B, D) may happen at higher load level and they contain relatively higher frequency contents (100 kHz, 230 kHz, 450 kHz, 550 kHz).

The origin of some waveform groups (for example, group C, G) may not be entirely explained since they had happened at higher load level but has mostly lower frequency content. It may be hypothesized that some crack friction (mostly at the crack tip region) may occur at higher load level that could cause these lower frequency AE events. However, a future investigation may be needed to entirely explain this scenario.

FIG. 19 shows a microscopic view of the zigzags and the faying surfaces of the fatigue crack. The microscopic images were captured at maximum load level; two different locations along the fatigue crack length are shown here; the light was shining from the back side of the crack.

FIG. 20 shows at (a) Group F AE hits are plotted in sync with the cyclic fatigue loading; they happened at every cycle and at approx. 57% of maximum load, they appeared after approx. 250 s and then continued. FIG. 20 shows at (b) the time domain denoised signal and frequency spectrum of a representative group F waveform.

FIG. 21 shows at (a) Group G AE hits are plotted in sync with the cyclic fatigue loading; they appeared sporadically over the cycles at approx. 78%-81% of maximum load. At (b), FIG. 21 provides the denoised time domain signal and the frequency spectrum of a representative group G waveform.

We observed that the highest amplitude AE hit happened at each cycle when the load level reached to 78% of maximum load. It may be related to the fatigue crack growth mechanism during one fatigue cycle. We have explained the fatigue crack growth mechanisms within one fatigue cycle in a separate communication [35]. We have not observed any AE at 100% of maximum load level in each cycle. The highest amplitude AE hit happened near the maximum load (78% of max. load). Some other relatively higher amplitude AE hits in between 78% and 84% of maximum load and then stops. This is because the crack growth happened during this period. After that, as the load increases, plasticity-driven crack hardening may occur near the crack tip region which may prevent any further crack growth within one cycle (as we don't see any AE activity near 100% of the maximum load).

The metal fatigue contains many complex phenomena that may be captured through the AE waveform analysis. In the AE hits results, only two distinct zones of AE hits can be obtained: one zone in the high amplitude and the other zone in the low amplitude denser AE hits. But, the AE waveform based analysis suggested that beyond the two distinct zones, several groups can be distinguished based on the AE waveform signatures, especially from the denser AE hit zone.

Thus, the AE hit based analysis may not be sufficient to capture all the information. Once the AE hits were sorted based on the similarity of waveform signatures (time-domain signals and frequency spectra), other similarities, for example, the load level, duration, hit amplitude of the waveform were automatically obtained. The particular waveform signature may explain a particular behavior during the fatigue crack growth. In this particular fatigue crack growth in a thin metal specimen, nine different AE waveforms groups were identified.

The signatures of the fatigue cracks are highly related to the frequency contents of the AE waveform groups. A particular waveform group represents a particular source of AE event related to the crack growth. We found that group A, B, D waveforms that happened at the higher load levels (75%-85% of maximum load) are responsible for crack extension. They contain mostly higher frequency content AE signals. Some AE waveforms happened at relatively lower load level (e.g. group E) and appeared as a clustered form. The lower load level may cause the 'catching' of the faying crack surfaces may generate crack friction related AE waveforms. The micro-fracture may happen during the friction of the faying surfaces. These waveforms mostly contain lower frequency content AE signals. Thus, the AE-waveform based analysis may give us a comprehensive idea of the metal fatigue. It was interesting that no AE activity has been observed at exactly 100% of the maximum load during a fatigue cycle. This may be because of the plasticity-driven crack hardening near the crack tip region that may prevent any crack growth.

FIG. 22 shows at (a) Group H AE hits are plotted in sync with the cyclic fatigue loading; they appeared a few times over the cycles at relatively lower load level (23% of max. load). At (b), FIG. 22 provides the denoised time domain signal and the frequency spectrum of a representative group H waveform. FIG. 23 shows Table 1, which provides summary statistics of the 427 AE hits over the 50 fatigue cycles with 300 μm crack growth.

This methodology of the AE technique may be used for the other cases such as crack monitoring on the welded structures, damage evolution in the composite structures. The full history of the AE hits of the fatigue crack growth from beginning to failure may be analyzed at the waveform level. It would be labor-intensive but worth analysis if we could establish any possible relationship between the AE signal-groups with the fatigue crack length. The AE waveforms would be further analyzed to capture any possible local interaction between the AE signals and the fatigue crack. The multiphysics simulation could be performed to predict the failure mechanism corresponding to different AE signal groups.

Passive detection of fatigue cracks by sensing acoustic emission (AE) has attracted attention of many researchers for decades. To extract crack related acoustic emission data from recorded AE signals, researchers have applied data driven methods. One of the most critical damages studied is a fatigue crack. However, it is important to develop science and understanding of crack-generated acoustic emission (AE) wave signals to successfully identify acoustic emission due to crack growth using passive sensing mode. To develop this understanding, researchers have studied acoustic emission (AE) due to crack propagation in elastic medium. Ceranogliu and Yih-Hsing have analyzed generation of transient waves by variety of dynamic nuclei of strains based on generalized ray theory. Chung and Kannatey-Asibu have studied acoustic emission due to plastic deformation in a pure crystals considering acceleration of a moving dislocation. Lysak investigated acoustic emission from a growing crack by formulating non-stationary dynamic problems of crack theory. Lysak obtained variety of new analytical relationship between crack parameters and AE signal parameters. Andreykiv et al. have studied acoustic emission caused by internal crack growth. Sause and Richler have studied cracks as source of AE using cohesive zone approach in FEM. In another work Sause and Horn have proposed a microscopic source model to simulate AE in CFRP. González and LLorca have used multiscale modeling to capture the fracture behavior of fiber reinforced composite. Other researchers have used peridynamic formulation based on homogenization and mapping between elastic and fracture parameters of the micro-scale peridynamic bonds and the macro-scale parameters of the composite. Several studies are also performed to understand the emission of guided waves such as, Lamb waves, due to crack growth in plate like structures. Gorman and Prosser suggested the application of normal mode expansion. Maji et al. have demonstrated the use of NDE technique based on Lamb wave propagation to locate the source of acoustic emissions. Prosser et al. used Mindlin plate theory and finite element analysis to model acoustic emissions. Zhou and Zhang have studied the use of phase difference of the received signal at two different sensor locations to locate AE source in a thick plate. Use of acoustic emission for detecting and locating fatigue cracks in metallic structures is widely reported but studies to estimate crack length from acoustic emission are rare. Lysak have demonstrated a relationship between the experimental AE count and theoretical stress intensity factor. In other experimental study researchers aimed to find relationship between AE energy and fracture energy in concrete. Gagar et al. have developed a method for deducing crack length based on correlations between AE signals generated during fatigue crack growth and corresponding cyclic loads. The methods of estimating crack length reported in the literature are based on parametric relationship of AE and fracture mechanics. These methods rely on experiment driven models. In this paper we present our work aimed towards estimation of crack length based on physics of wave propagation in plate structures due to crack growth.

There are two fundamental stages of generation of acoustic energy and a crack growth due to material failure; first the failure of the material and formation of new crack surfaces and then, the propagation of the resulting temporal displacement field as acoustic waves. Lysak has proposed an analytical approach to address the generation of this acoustic waves due to material failure using the theory of fracture mechanics and wave propagation. This model is good for explaining the generation of the acoustic energy due to material failure. However, the propagation of the generated acoustic wave through the plate waveguide with a crack is a very complex wave guide problem for an analytical model. The approach presented by Sause's relies on finite element method to solve the wave guide problem where a failure criterion is defined for the initiation of crack and the resulting temporal displacement field was calculated. This approach is again focused on the generation of acoustic emission from the crack tip. However, the dynamics of a growing crack and its characteristics as a wave source have not been studied before.

The aim of this research is to develop an understanding of the characteristics of a fatigue crack as a guided wave source. This understanding will help us predict crack lengths from acoustic emissions (AE) in plate structures. For simplicity of simulation, we approximated the source at the crack tip as an extended source using the method proposed by Hamstad et al. In this study we focused on the dynamics of the crack as an AE source rather than the generation of acoustic energy due to the material failure at the crack tip. We performed FE analysis along with experimental studies. First, we introduce the experimental procedure and present detailed 3D FE models. Then, we elaborate physical phenomenon to be used to estimate the crack length from recorded AE signal. Subsequently, we present experimental validation of our method. Finally, we present our attempt to apply this method to detect fatigue crack length during fatigue test followed by conclusion.

FE Simulation of Acoustic Emissions in a Plate from Fatigue Experiment

The current disclosure seeks to simulate acoustic emission recorded during uniaxial tensile fatigue test. For generation of AE signals we use 1 mm thick Al2024 specimens with a 1 mm hole at the center. We assume that the specimen is under pure tension and the crack growth is through the thickness of the plate along the plate surface. Therefore, we also assume symmetric emission of acoustic energy across the plate thickness, see FIG. 24. We used 3D FE model of the plate to capture the effects of the crack on the acoustic emission. Dynamic finite-element modeling requires that the element size must be smaller than the smallest wavelength of interest, and the time step must satisfy a stability condition called the Courant-Friedrichs-Lewy (CFL) condition. For the current disclosure, the CFL condition requires the time step to be less than the time required for the bulk longitudinal wave to traverse a single element. This means the smaller the element size the smaller the time step should be. Due to limitation on simulation capability, we choose element size of 0.25 mm for our simulation. For AL2024T4 with bulk longitudinal wave speed of 6.2 mm/μs, we need a time step of 40 ns or less to satisfy the CFL condition. But, because of limitation on computational resources, we are able to simulate at CFL=3 for the source rise time of 1.5 μs with half cycle cosine, see FIG. 25. Following Hamstad et al., this also gives us minimum wavelength $\lambda m=4.71$ mm. We use $\lambda/s=9.4$, $\lambda/cs=18.8$, $D/s=40$ (where, s, cs, and D are element size, dipole size and the distance between the source and sensor) which according to Hamstad et al. should give satisfactory result for acoustic emission simulation.

Figure 24:
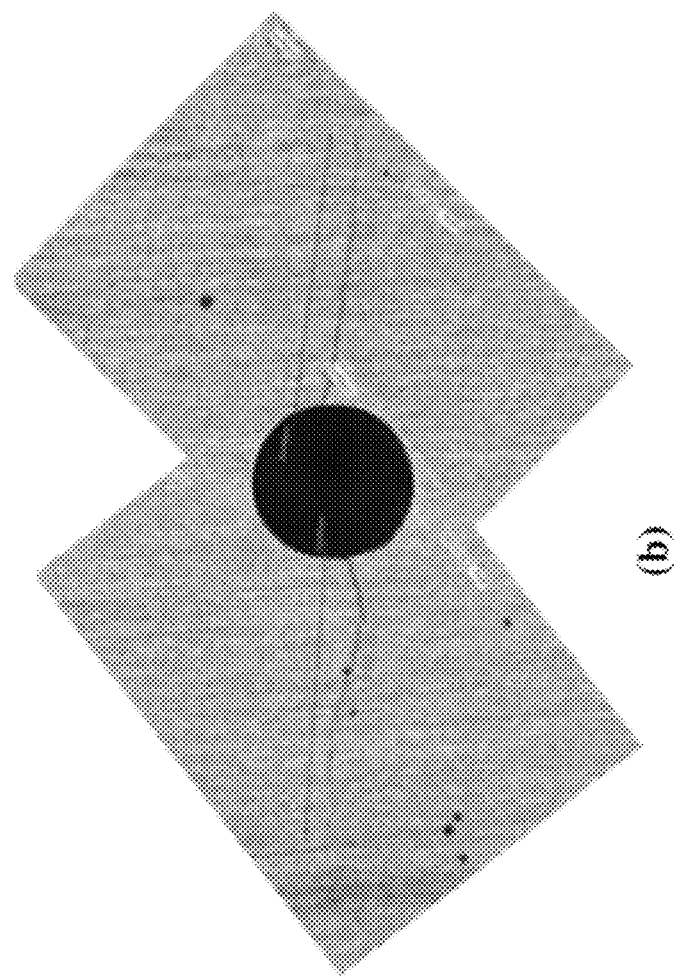
FIG. 24 shows (a) schematic of the fatigue crack growth, (b) fatigue crack in the actual specimen.
Figure 24:
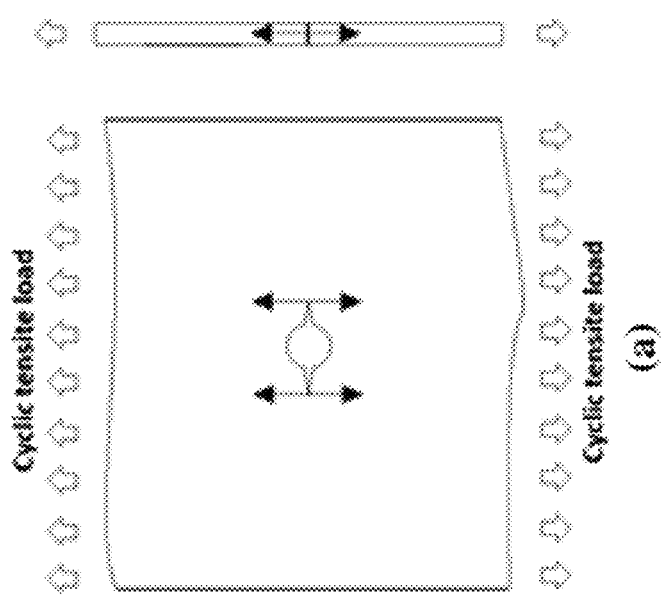

To create a 3D FEM model of a fatigue crack in a plate, we idealize a fatigue butterfly-crack in our specimen shown at FIG. 24 at (b). We assume crack surfaces to be perpendicular to the plate surface and radiating outwards from the hole. We also assume crack surfaces to be stress free. We place the acoustic emission sources at the tips of the cracks. We extend the point source model to a line source by distributing point sources along a line. We model the source as equal strength dipoles distributed across the thickness of the plate (FIG. 3) approximating to a line source of acoustic emission.

Also, we place these dipoles at both the ends of the elements at the crack tips to approximate AE due to crack growth of one element length (0.25 mm). This makes the AE source as an extended source instead of a point source. By incorporating a temporal variation of the dipole strength, we simulate generation of acoustic emission from the crack tips. As mentioned earlier, following Hamstad et al., we use the temporal variation of the dipole strength as a cosine bell curve with 1.5 µs rise time.

Figure 25:
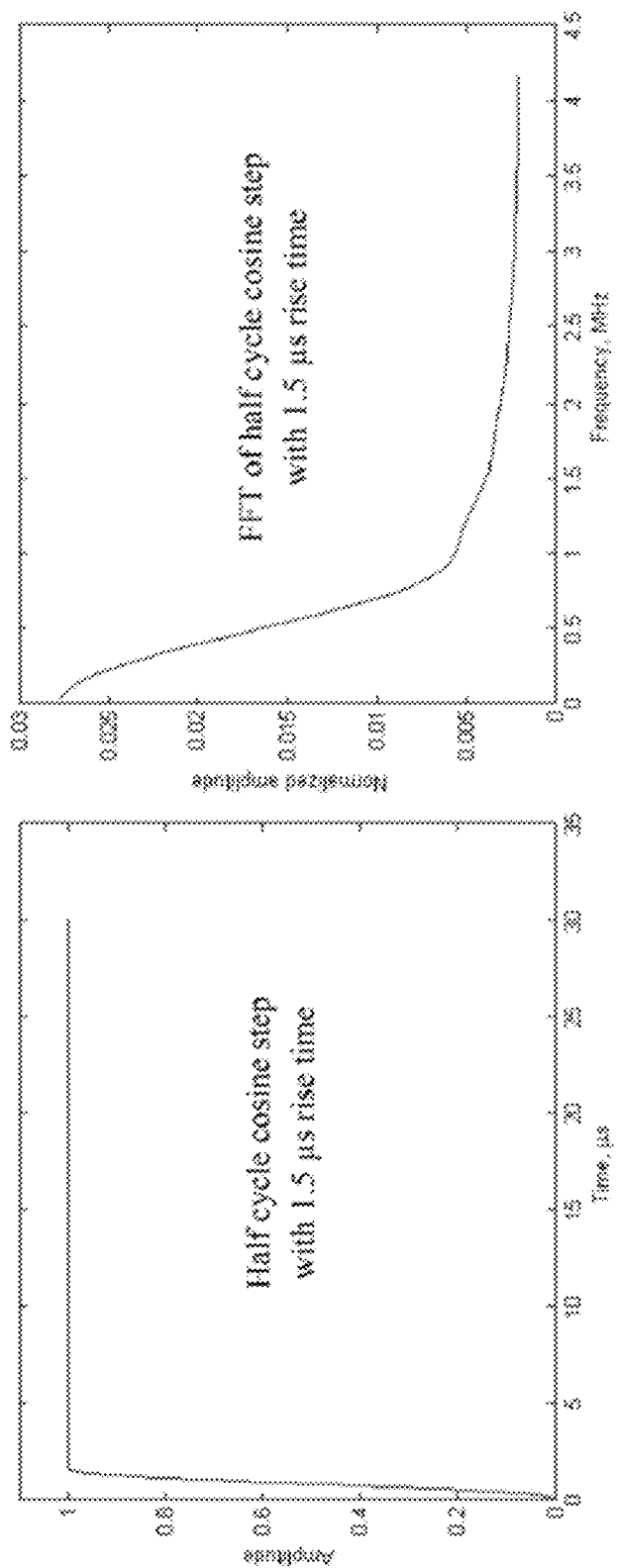
FIG. 25 shows time and frequency characteristics of dipole as acoustic emission source.
Figure 26:
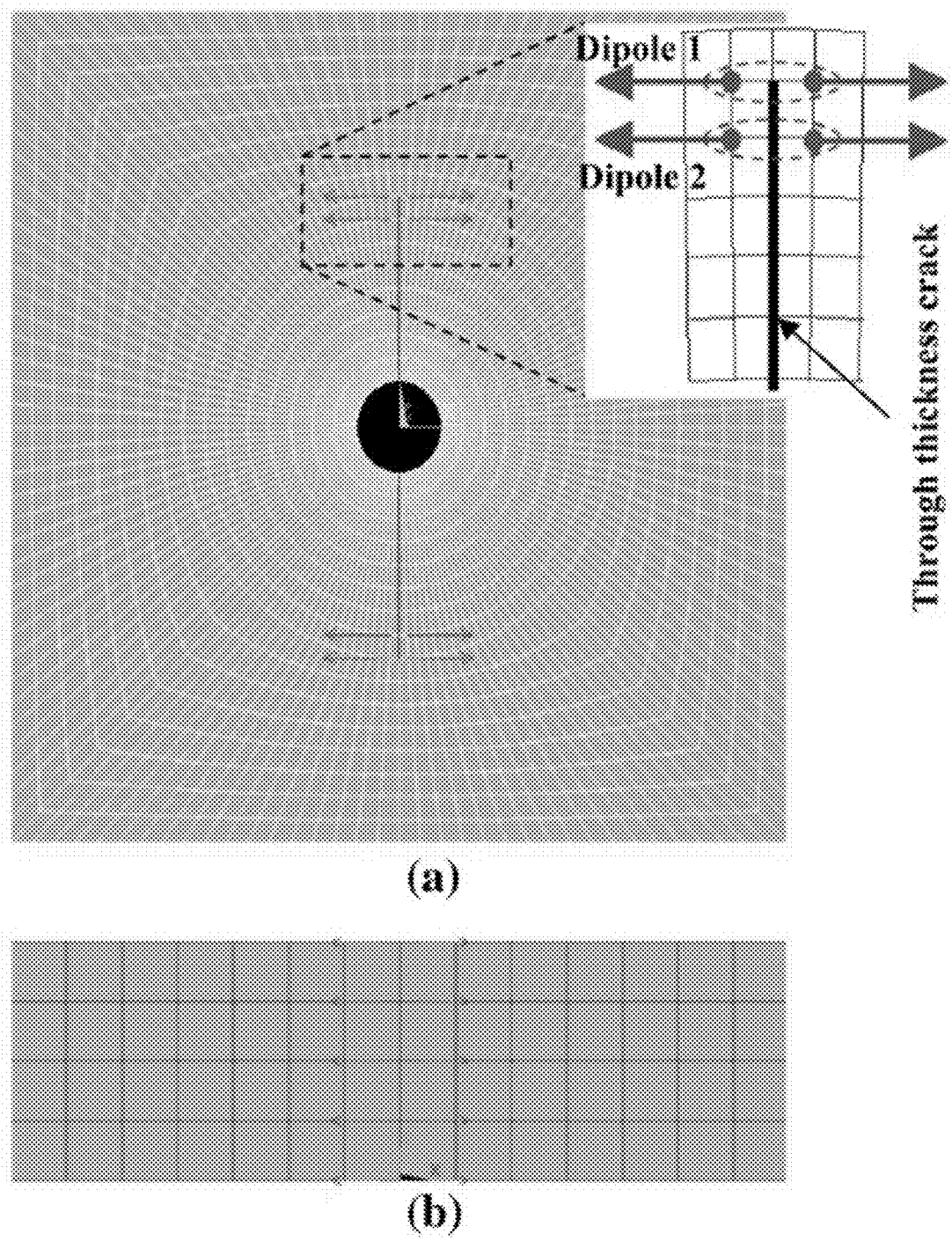
FIG. 26 shows dipoles at crack tips for simulation of acoustic emission due to crack growth of one element length and illustrates distribution of dipoles.

FIG. 24 shows (a) a schematic of the fatigue crack growth and (b) fatigue crack in the actual specimen. FIG. 25 shows time and frequency characteristics of dipole as acoustic emission source. FIG. 26 shows at (a) shows Dipoles at crack tips for simulation of acoustic emission due to crack growth of one element length. FIG. 26 at (b) illustrates distribution of dipoles across the thickness of the plate.

Figure 27:
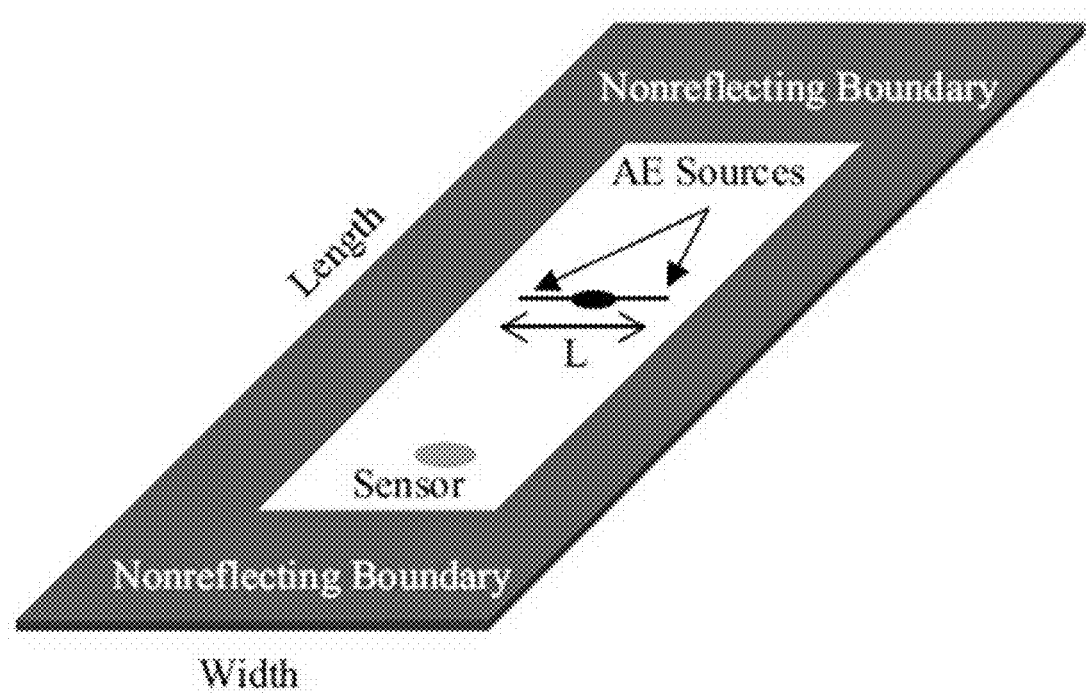
FIG. 27 shows a schematic diagram of the FEM model created for simulation of acoustic emission in 3D.

FIG. 27 shows a schematic diagram of the FEM model created for simulation of acoustic emission in 3D. To minimize boundary reflections from the edges of the FE model, we use non-reflecting boundaries (NRB) around the edges. FIG. 27 shows schematic diagram of 3D FE model for acoustic emission from crack tips. The NRBs are created by adding damping elements on top and bottom surfaces of the plate around the edges and at the edge of the boundaries. We increase the damping coefficients of these damping elements along the length of the NRB starting from zero to a finite value. This is done to minimize the reflection of wave energy from the edge of the NRB. It has been shown that this type of NRBs is more effective in reducing the edge reflections in a plate structures. The purpose of NRBs is to absorb the incident and reflected wave energies to minimize boundary reflections.

Figure 28:
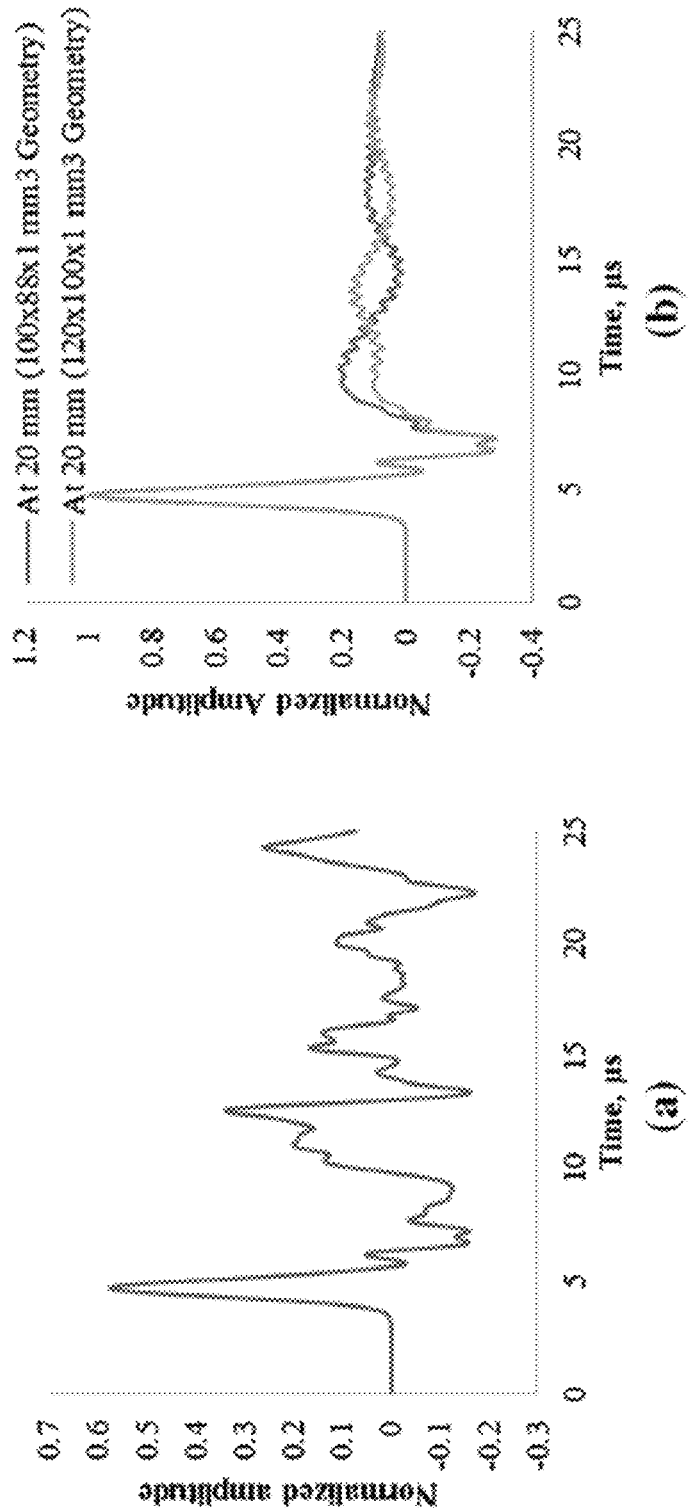
FIG. 28 shows out of plane displacements at 20 mm from the hole along the length of the specimen from FE model without NRB and with NRB.
Figure 29:
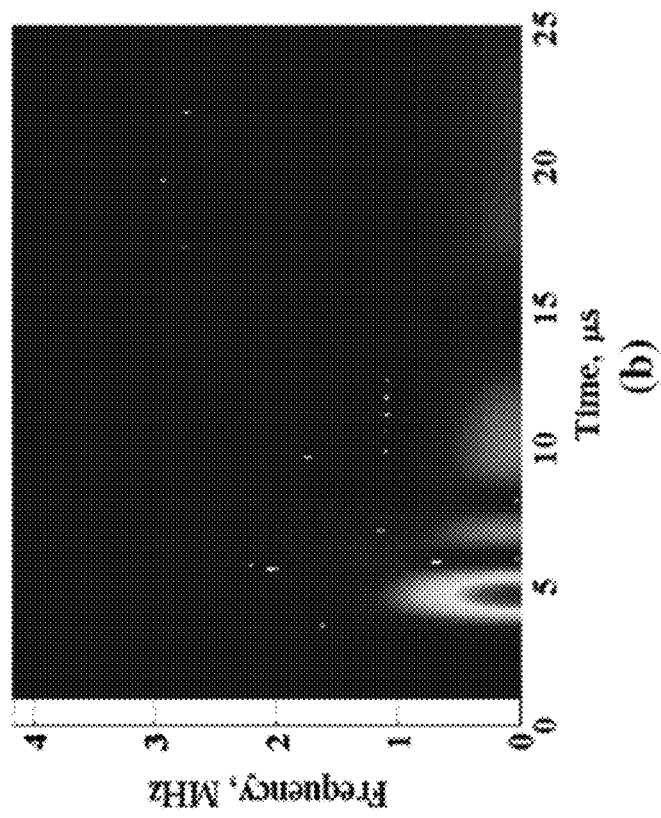
FIG. 29 shows time-frequency analysis of out of plane displacement at 20 mm from hole at (a) without NRB, and at (b) with NRB.
Figure 29:
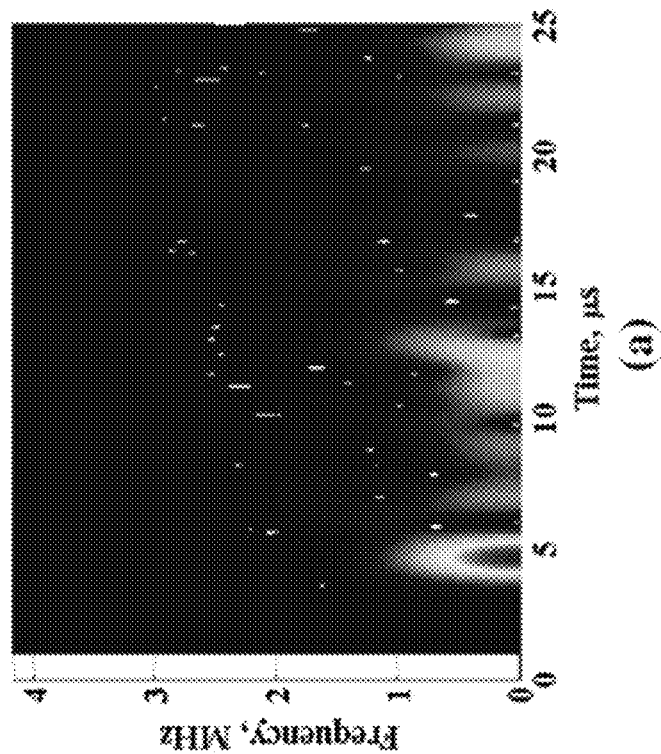

FIG. 28 at (a) and (b) shows out of plane displacements at 20 mm from the hole along the length of the specimen from FE model without NRB and with NRB. We can see that the boundary reflections are almost eliminated by the use of NRB. The usefulness of NRB is also clear from FIG. 29 at (a) and (b) which show the time frequency analysis of the displacement plots shown in FIG. 28. However, the NRBs do not eliminate boundary reflections completely. From FIG. 28 at (b), we can see that the ripples after the arrival of the first acoustic emission changes as the specimen dimensions are changed. This is the effect of specimen geometry on the acoustic emission signal due to reminiscent boundary reflections. But, these reflections are much smaller than the direct acoustic emission signal and contain only very low frequencies as shown in FIG. 29 at (b). Therefore, we conclude that, NRBs are effective in simulating acoustic emissions using small 3D FE models for efficient simulation.

To further investigate effects of the presence of the butterfly crack, we create another FE model with the identical geometry with no crack. We place the dipoles at the same locations relative to the hole. The purpose of this study is to understand if there is a difference in the acoustic emission signal due to the presence of the crack and if this difference is related to the crack geometry.

Figure 30:
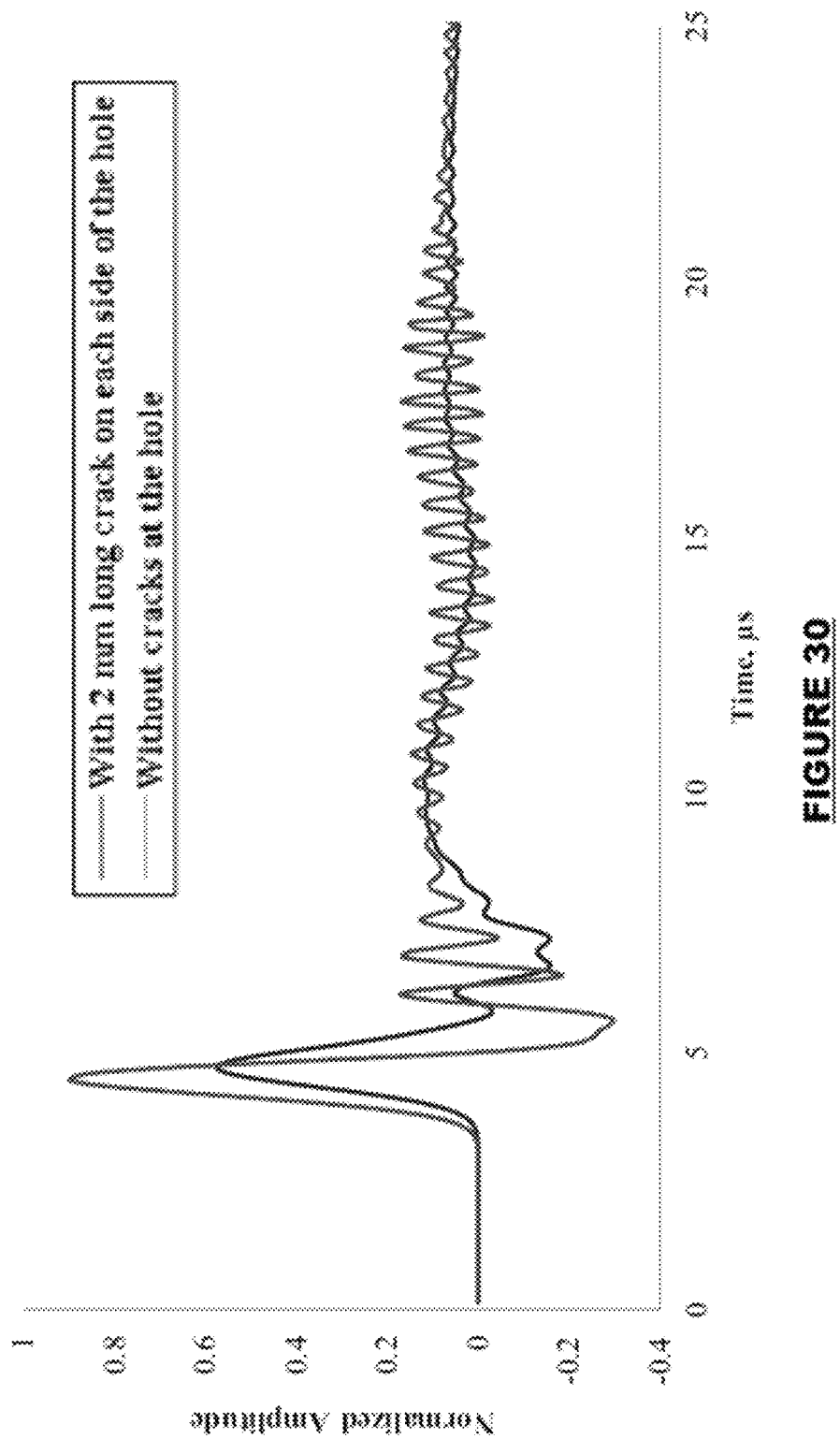
FIG. 30 shows out of plane displacement at 20 mm from hole.
Figure 31:
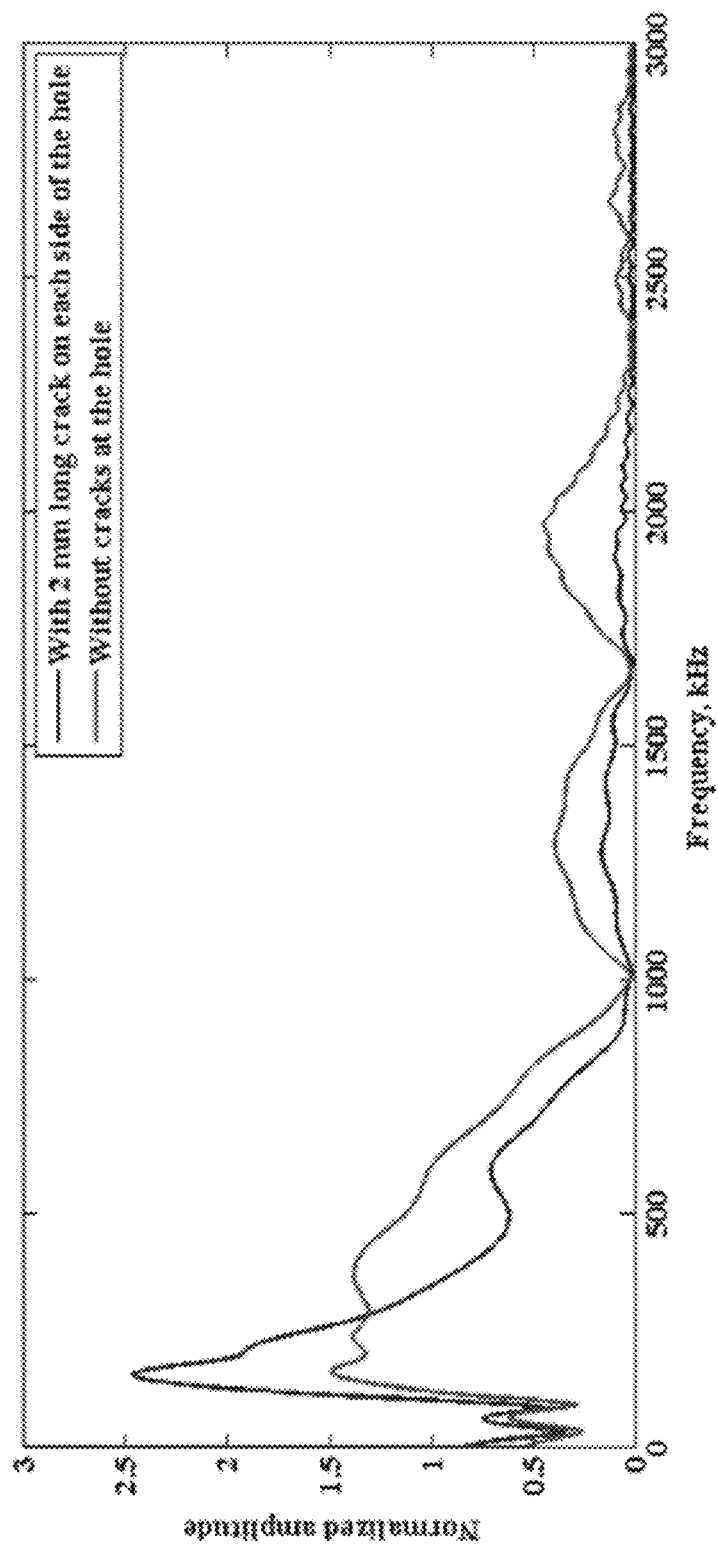
FIG. 31 shows frequency content of out of plane displacement at 20 mm from hole.

FIG. 30 shows the comparison between the out of plane displacement calculated by the two FE models; one is with butterfly cracks and the other is without. From the time variation of the displacements, we can clearly see that there is a significant difference due to the presence of the crack. FIG. 31 shows the calculated displacements in frequency domain. We can see that the presence of the butterfly cracks modifies the frequency content of the acoustic emission signal significantly. Therefore, the crack acts as a frequency filter to the acoustic emission. It is apparent that, at least theoretically, a significant difference exists between the crack related acoustic emission and non-crack related acoustic emission.

FIG. 28 at (a) shows out of plane displacement at 20 mm from hole without NRB, and FIG. 28 at (b) with NRB. FIG. 29 shows time-frequency analysis of out of plane displacement at 20 mm from hole at (a) without NRB, and at (b) with NRB. FIG. 30 shows out of plane displacement at 20 mm from hole. FIG. 31 shows frequency content of out of plane displacement at 20 mm from hole.

Resonance of Fatigue Crack Due to Fatigue

Figure 32:
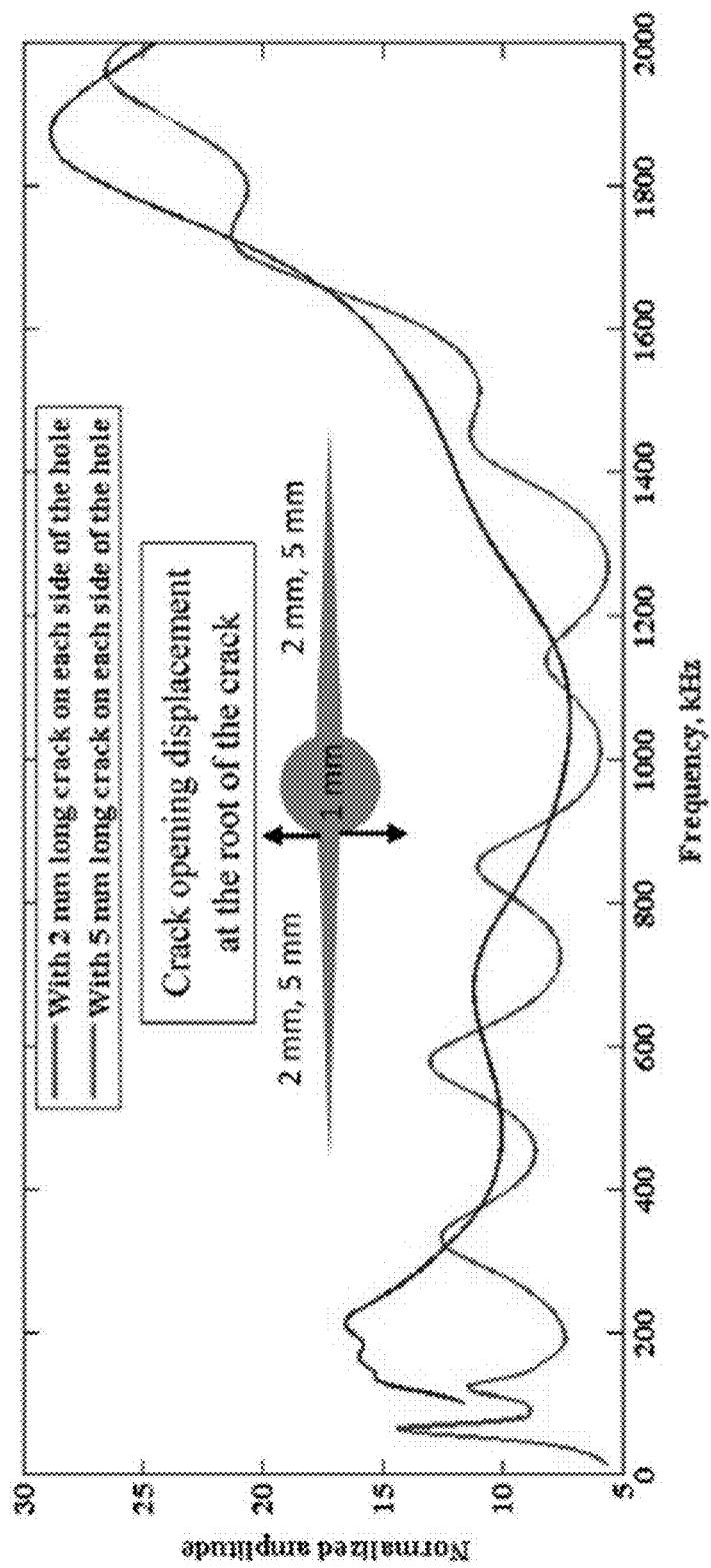
FIG. 32 shows a crack undergoes resonances in crack-opening type motion.

The presence of the crack modifies the frequency content to the acoustic emission signal received. Next, we investigate the possibility of extracting crack features from acoustic emission. First, we perform harmonic analysis on 3D FE models. On the model with crack, instead of performing transient analysis with time varying dipole strengths, we performed harmonic analysis with dipole strengths being constant with frequency. The aim is to understand the dynamics of the crack vibration. FIG. 32 shows that due to a harmonic source at the crack tip, the crack undergoes resonances in crack-opening type motion.

Also, it shows that the resonance frequency will depend on the length of the crack. For example, the fundamental resonance frequency of a 2 mm long crack is higher than that of a 5 mm long crack; as the crack length increases, the fundamental resonance frequency will decrease. It is important to note that, this is an extended source type model as described by Sause et al. Therefore, the prediction of the FE simulation is reliable when the size of a crack is much larger than the thickness of the plate as well as the increase in crack length. For this case the size of the crack (4 mm) is much larger than the thickness of the plate (1 mm) and the increase in crack length simulated (0.25 mm).

Figure 33:
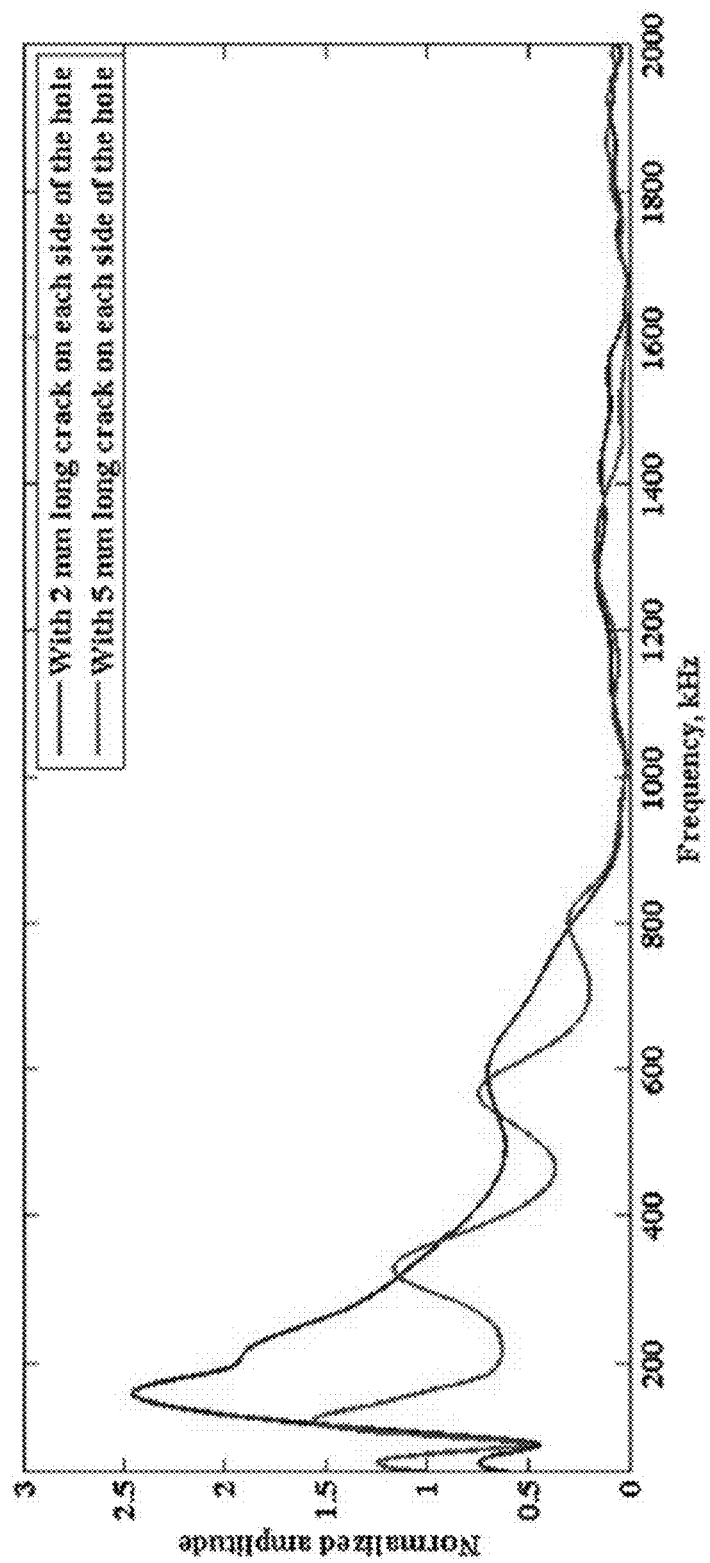
FIG. 33 shows the frequency content of the simulated acoustic emission in terms of out of plane displacement measured at 20 mm away from the hole.

FIG. 33 shows the frequency content of the simulated acoustic emission in terms of out of plane displacement measured at 20 mm away from the hole. We can clearly see multiple resonances from the simulated acoustic emission signal. Upon comparing FIGS. 32 and 33, we can see that these resonance frequencies are same as the resonance frequencies associated with the crack opening motion. Therefore, we confirm through simulation that a wideband acoustic source located at the tip of a crack causes the crack to resonate and this resonance can be detected from the acoustic emission signal at a distance from the crack. Since the crack resonance frequency depends on the crack length, theoretically it is possible to detect crack length from the acoustic emission signals. The correlation of the crack length with the resonance frequency can be obtained by FE models similar to the ones presented. FIG. 32 shows Crack opening resonance frequencies from harmonic analysis. FIG. 33 shows crack resonance captured from an acoustic emission signal measured at a distance.

Experimental Validation of the Resonance

Figure 35:
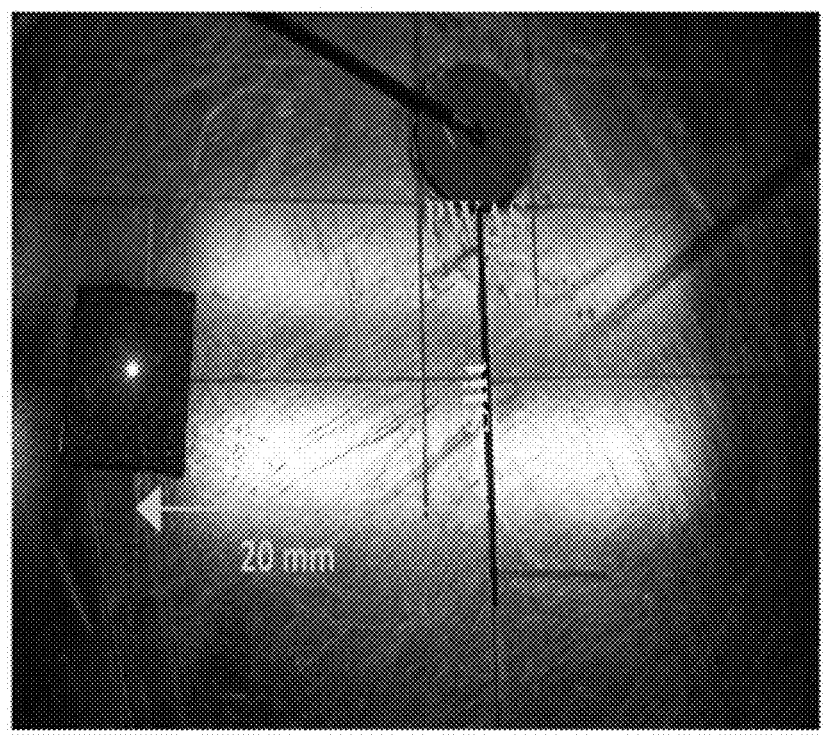
FIG. 35 shows at (a) a picture of the specimen with a slit and at (b) an excitation signal in time domain; and at (c) an excitation signal in frequency domain.
Figure 35:
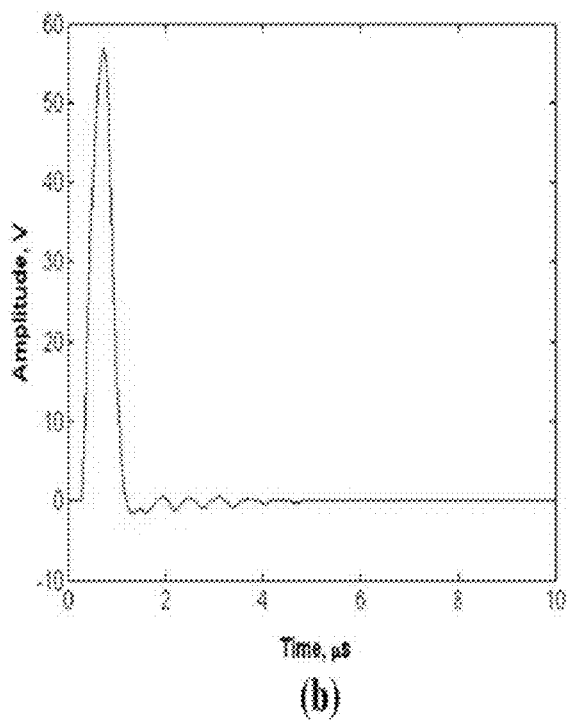
Figure 35:
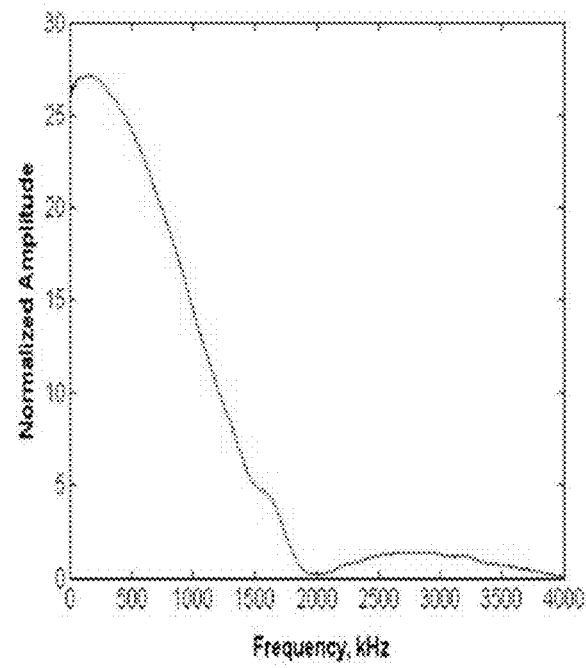

The current disclosure seeks to validate the simulation results with a fatigue test experiment. During fatigue tests, when the crack grows, the plate causes acoustic emissions from one of the crack tips. In our simulation, the crack surfaces are assumed to be stress free which is not the case in a fatigue crack. Therefore, to confirm the phenomenon of crack resonance due an acoustic emission source at the tip, we use a slit instead of a fatigue crack. We start with a large aluminum plate with 1220 mm in length and 1220 mm in width and 1.6 mm thick to avoid boundary reflections. We cut a through thickness slit in the plate with diamond cutting disc of 0.25 mm in thickness as shown in FIGS. 11 and 12a. Then, piezoelectric wafer active sensors (PWAS) are bonded at one of the tips of the slit to emulate an acoustic source. Two PWAS transducers are bonded at the slit tip on the top and bottom surfaces of the plate. The advantage of using a PWAS in this configuration is in its excitability. We can excite the PWAS transducers in-phase or out-of-phase. However, in our fatigue test, we load the plate under uniform tension which, in our understanding, will cause symmetric type excitation at the crack when the crack grows. Therefore, we excite the PWAS transducers simultaneously in-phase to cause a symmetric excitation. To create a wideband acoustic emission, we excite the PWAS transducers with a voltage pulse as shown in FIG. 35 at (b) and (c).

Figure 34:
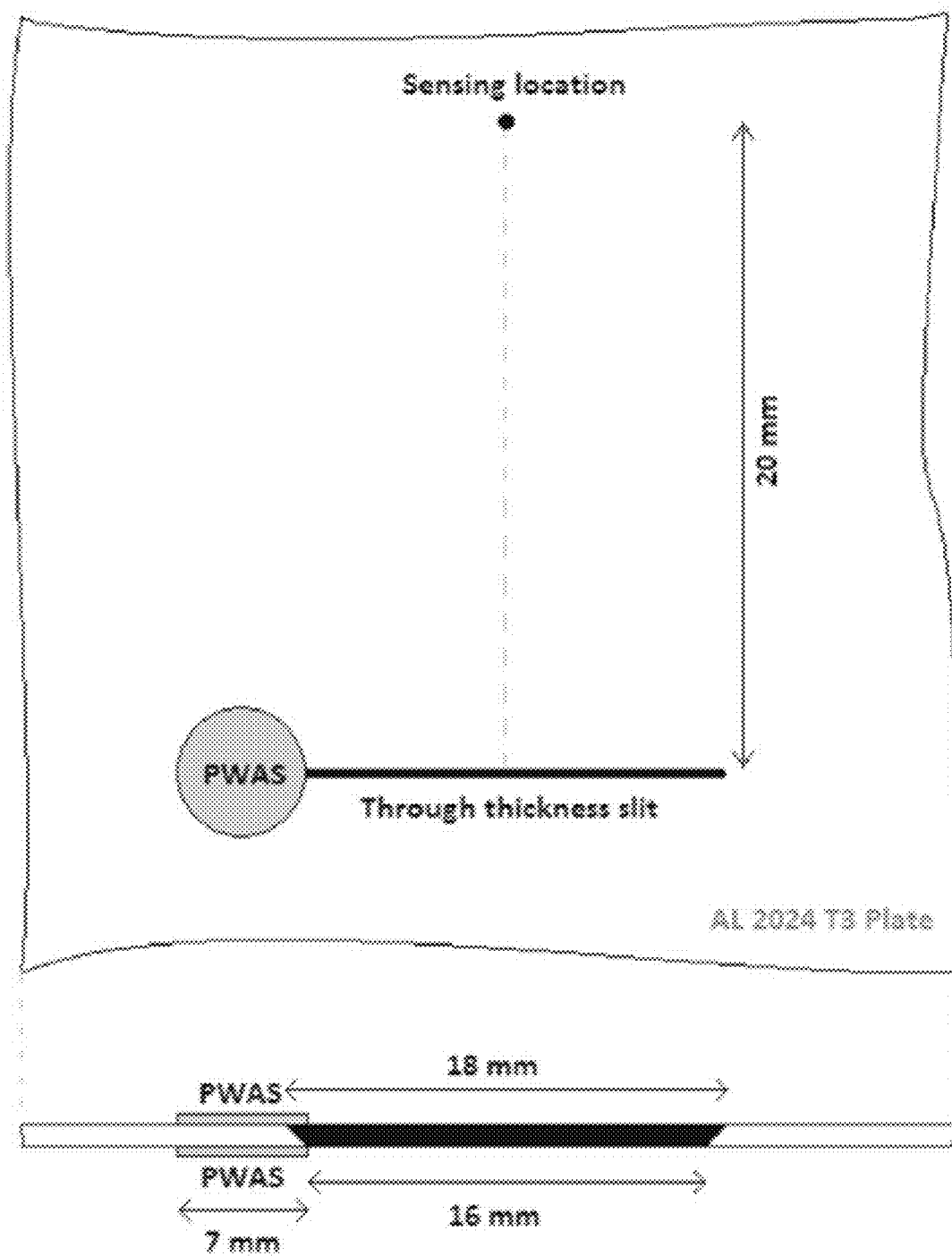
FIG. 34 shows a schematic diagram of experiment to detect resonance of a slit caused by an acoustic source at tip.

FIG. 34 shows a schematic diagram of experiment to detect resonance of a slit caused by an acoustic source at tip. FIG. 35 shows at (a) a picture of the specimen with a slit and at (b) an excitation signal in time domain; and at (c) an excitation signal in frequency domain.

Figure 36:
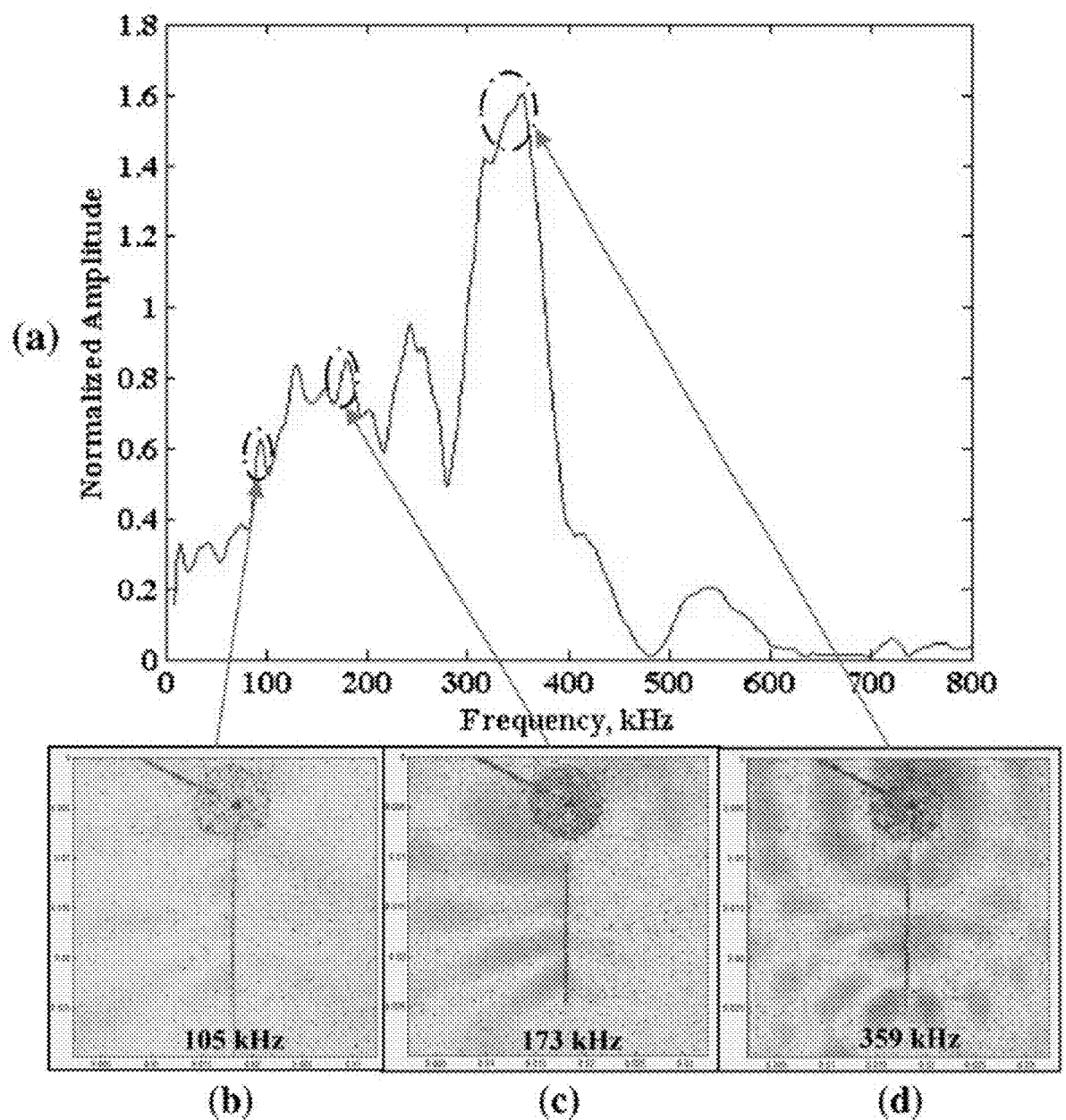
FIG. 36 shows the frequency domain plot of the measured acoustic emission at 20 mm from the slit.

The resulted acoustic emission is measured 20 mm from the slit with a LASER doppler velocimeter (LDV). FIG. 36 at (a) shows the frequency domain plot of the measured acoustic emission at 20 mm from the slit; in this figure, we can see multiple peaks which look like resonances. To verify these peaks, we also scan the area around crack using LDV to visualize the wave field around the crack. This is done by using chirp excitation with synchronized LDV measurement at a large number of points around the slit. This measurement makes it possible to visualize resonances of the slit due to the acoustic emission from PWAS. FIG. 36 at (b)-(e) shows the plate surface velocity around the slit measured by LDV at various resonance frequencies. Upon comparison with FIG. 36 at (a), we can clearly understand that the resonance peaks in FIG. 36 at (a) correspond to the resonance at the through thickness slit. This experiment confirms the crack resonance due to acoustic emission from its tip and validates our FE analysis. FIG. 36 shows resonance of the slit at multiple frequencies due to acoustic emission from PWAS (a) measured at 20 mm from the slit, (b-e) show area scan results showing standing wave field around the slit.

Detection of Fatigue Crack Length

Figure 37:
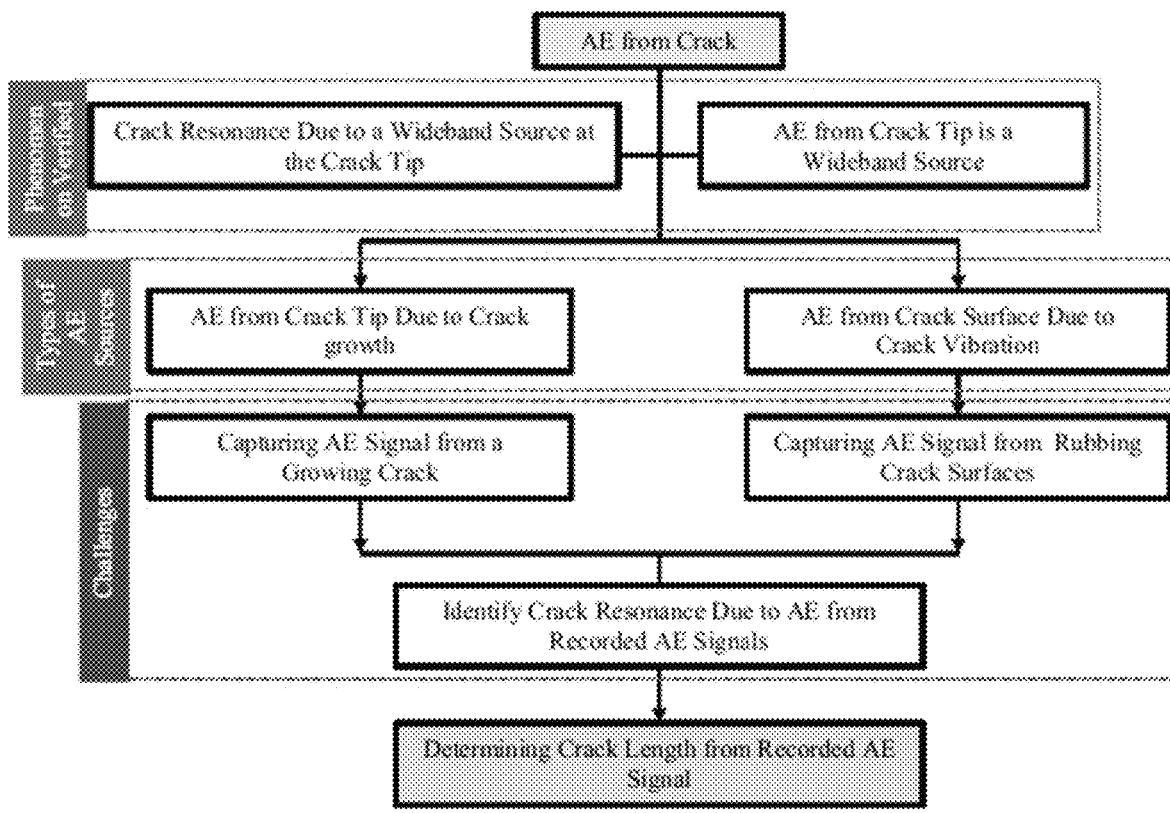
FIG. 37 shows a flow chart diagram for detection of fatigue crack length from acoustic emission.

Previous sections proposed and validated the phenomenon source at the crack tip using FE analysis and experiments. As acoustic emissions are wideband excitations generally at the crack tip, our aim is to use this phenomenon to detect fatigue crack length from recorded acoustic emission signal. There are two main mechanisms for generation of acoustic emission from a fatigue crack as shown in FIG. 37. FIG. 37 shows a flow chart diagram for detection of fatigue crack length from acoustic emission. As shown on the left branch of FIG. 37, one mechanism is when the crack grows and some of the energy at the crack tip is released in the form of acoustic emission. The other mechanism is depicted on the right branch of FIG. 37; when the crack resonated due to ambient vibration, the rubbing of the crack surfaces create acoustic emissions. The main challenge is to detect these acoustic emissions and identify crack resonance from them. The current disclosure follow the left branch of FIG. 37 to investigate acoustic emissions due to fatigue crack growth.

Identification of Crack Length from Acoustic Emission Due to Crack Growth

It is important to minimize the boundary reflections to successfully extract crack information from acoustic emission. To minimize boundary reflection in a small specimen, we use absorbing clay around the boundary, see FIG. 38 at (a) and (b). The length, width, and thickness of the specimen are 300 mm, 100 mm, and 1 mm; a 1 mm diameter hole is drilled at the center for the crack initiation.

For minimum effect of sensor, we need smallest possible AE sensor such as PICO AE sensor. However, conventional acoustic emission sensors are resonant sensors. This implies that these sensors have strong resonances around the frequency it is designed for. This is good in general for detection of acoustic emissions even for low energy acoustic emissions. However, these resonating sensors may not be best to detect crack resonances as the signals detected by these sensors are modified by their own dynamics. Therefore, we use piezo electric wafer active sensors (PWAS) for detection of acoustic emissions during fatigue tests. One advantage of using PWAS is that it senses both in plane and out of plane motion, whereas PICO is predominantly sensitive to out of plane motion. Realistically, any contact type sensors will have its own dynamics which will influence the wave field that it senses. However, from FIG. 39, we can see that, for out of plane type motion, PWAS is much more sensitive in lower frequencies than PICO because PICO resonated at around 450 kHz. This is advantageous for detection of crack resonances at lower frequencies. Therefore, in fatigue tests we rely on the PWAS sensor signal.

We mount the specimen in MTS machine for fatigue testing and applied cyclic loading between 6.5 and 65% of the yield stress of the material (AL2024T4) to shorten the test duration. We conduct the test in two stages. In the first stage we do not use any sensor or clay boundary on the specimen. We use higher frequency (10-12 Hz) of fatigue loading to shorten the duration of the test. In the second stage we use absorbing clay to absorb boundary reflections and used very low frequency fatigue loading (0.25 Hz) for higher degree of control over the crack growth. First we grow a long crack in the specimen, FIG. 40, and we mount the PWAS very close to the crack, see FIG. 41. Then, the crack is grown further under low frequency fatigue loading. The reasons for such proximity of the PWAS are to sense the low amplitude crack resonances due to AE and the surface strains being very low close to a long crack. This ensures that the PWAS bonding on the plate surface did not break and the acoustic emissions detected by the PWAS corresponded to the crack growth are not due to cracking adhesive bonds.

Figure 42:
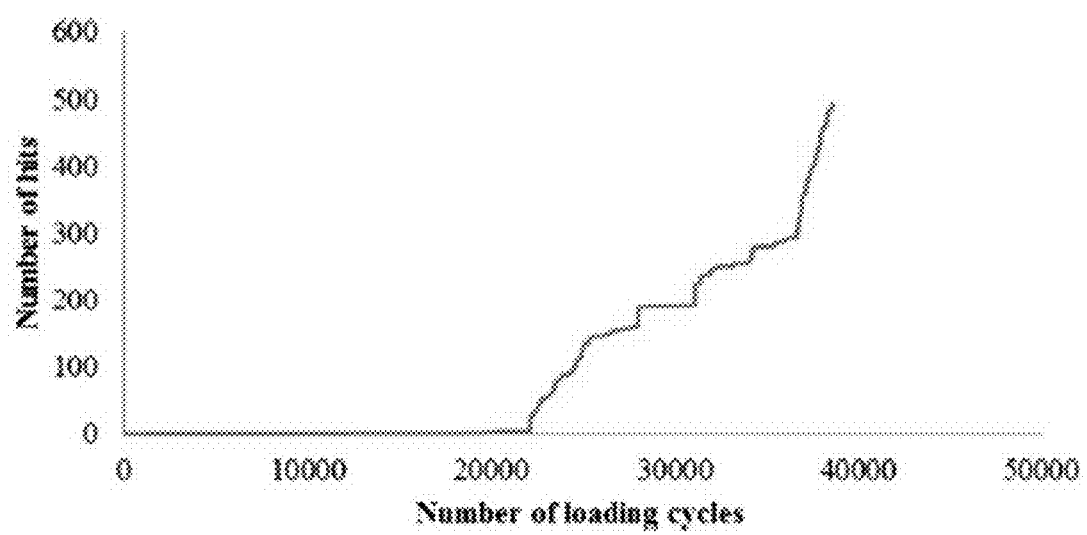
FIG. 42 shows the cumulative number of acoustic emission recorded.
Figure 43:
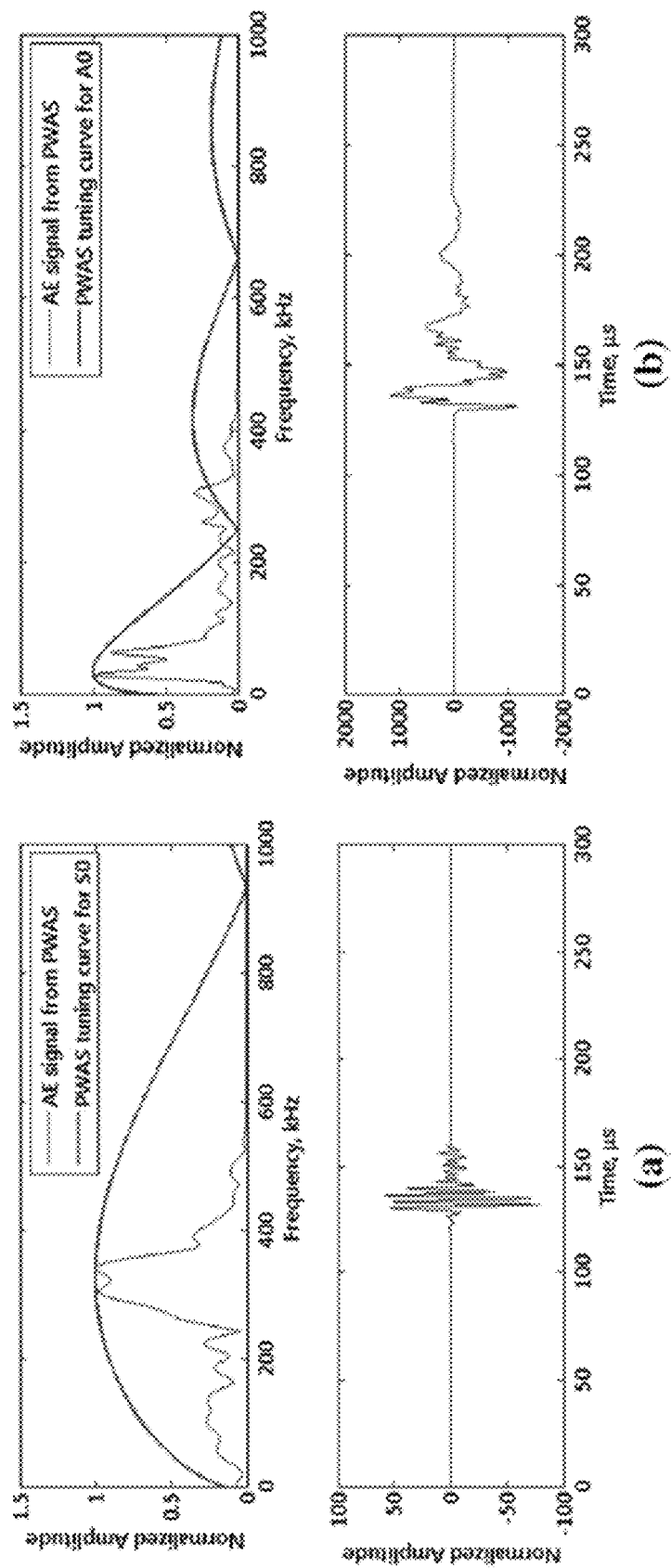
FIG. 43 shows acoustic emission signals received by PWAS and PWAS tuning: (a) type 1 and (b) type 2.

We use preamplifiers to amplify the signal detected by PWAS before recording. FIG. 42 shows accumulative number of acoustic emissions detected by the PWAS. This is consistent with the crack growth rate. As the crack grows longer, the growth rate increases resulting in higher rate of emissions. This can be easily understood from FIG. 42. FIG. 43 shows typical signals received by PWAS related to crack growth. Predominantly we record two types of acoustic emission signals type 1 and type 2. If we compare type 1 signals with type 2 signals as shown in FIG. 43 at (a) and (b), we can see that the type 1 signals appears to be non-dispersive and type 2 signals appear to be dispersive. Upon inspecting the tuning curves of PWAS in FIG. 43 at (a) and (b) we realize that the frequency contents of type 1 and type 2 signals are very similar to the tuning curves of PWAS for S0 and A0 modes respectively. Also it is well known fact that S0 mode is non-dispersive and A0 mode is dispersive at relatively low frequencies. Therefore, we conclude that the type 1 and type 2 signals correspond to the S0 and A0 Lamb wave modes respectively.

Figure 44:
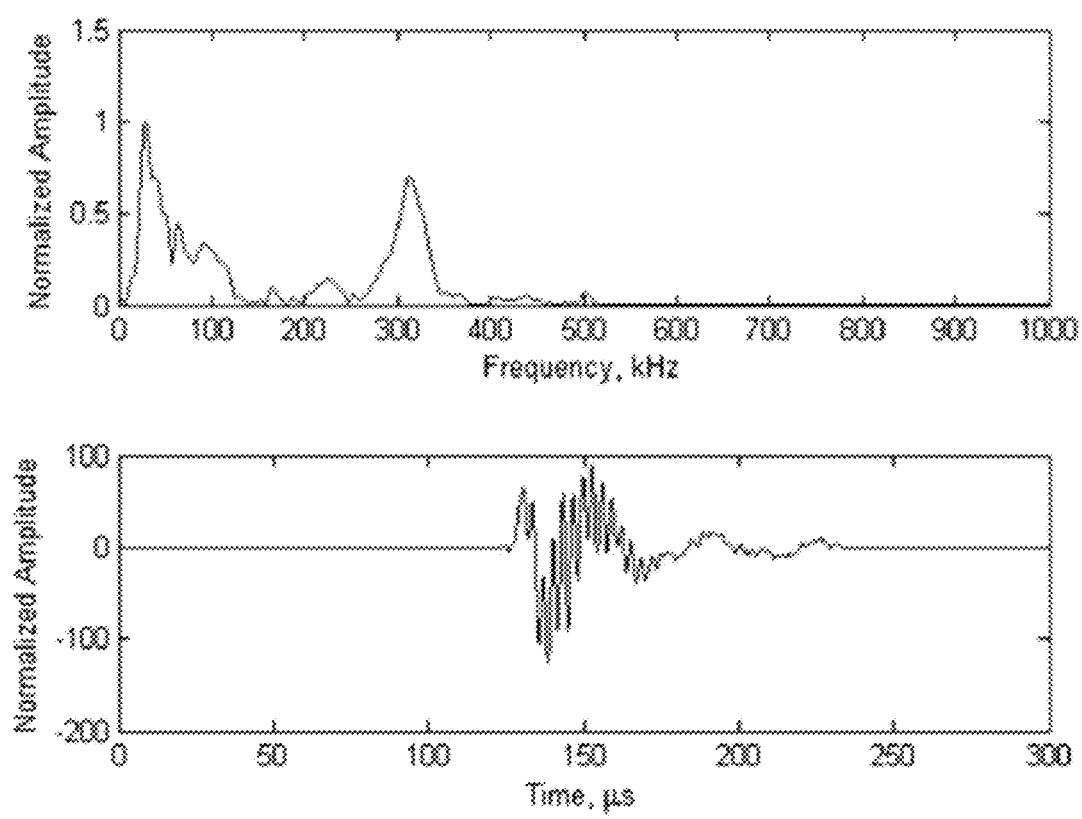
FIG. 44 shows a PWAS signal of mixed type.

A small percentage of signals appear to contain both S0 and A0 modes, see FIG. 44. However, type 1 and type 2 signals account for more than 90% of acoustic emissions recorded with both of these types being present in equal proportions. We use a Hanning window to isolate the meaningful part of the signal from the noise floor then filtered the noise using 8 order low pass Butterworth filter of 800 kHz.

Since acoustic emissions due to fatigue crack growth occur within a very short time interval, the source should contain a wide frequency band. Therefore, based on the recorded acoustic emission signals, distinctive type 1 or type 2 signals are possible when the acoustic emission source is emitting either symmetric or antisymmetric modes respectively. So, there are two distinctive behaviors of the acoustic emission source represented by type 1 and type 2 signals. One possible explanation of this is, during the crack growth at the top of the loading cycle, the acoustic energy is released predominantly in S0 Lamb wave mode. Then, when loading cycles are decreasing, the inclined crack surfaces rub against each other near the crack tip and emit A0 Lamb wave mode.

Figure 45:
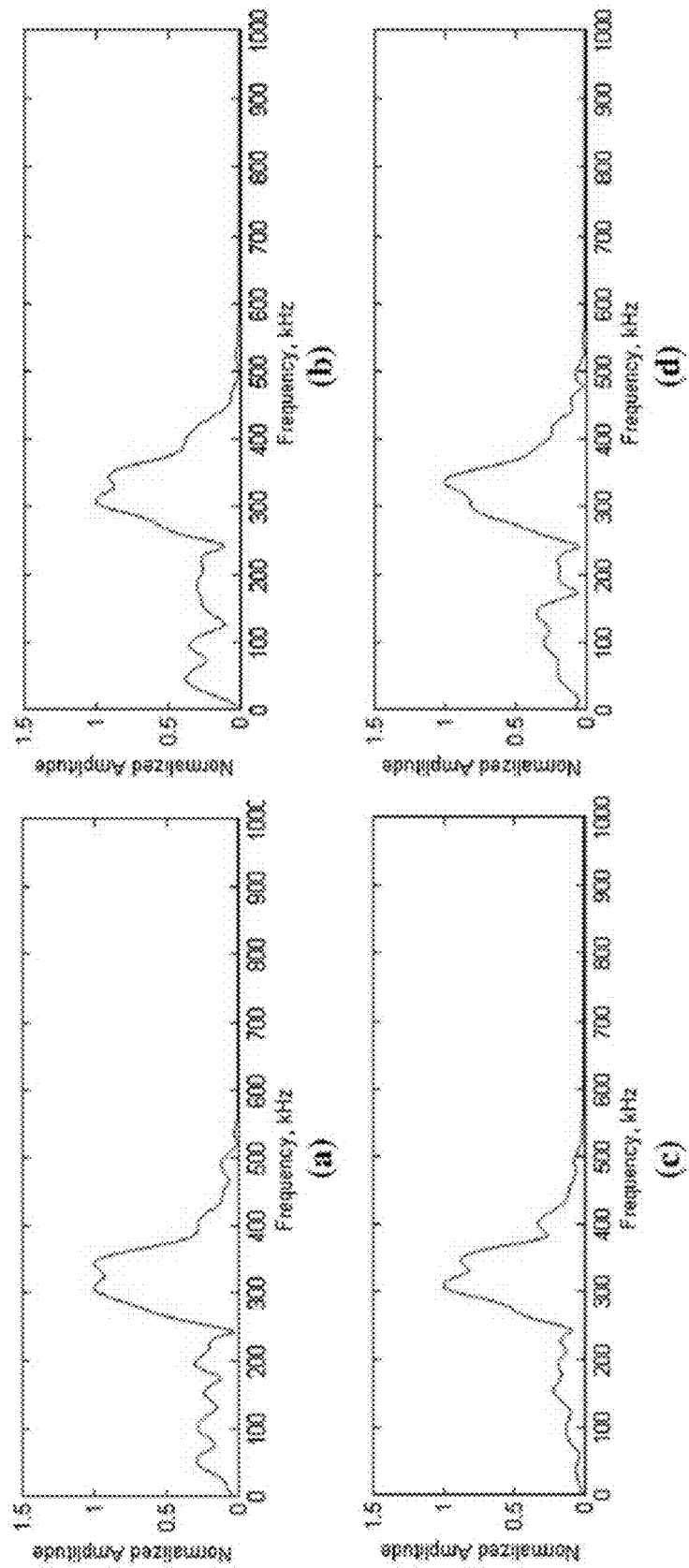
FIG. 45 illustrates frequency content of PWAS signal of type 1 at four different crack lengths; (a) 20 mm; (b) 25 mm; (c) 30 mm; and (d) 37 mm.
Figure 46:
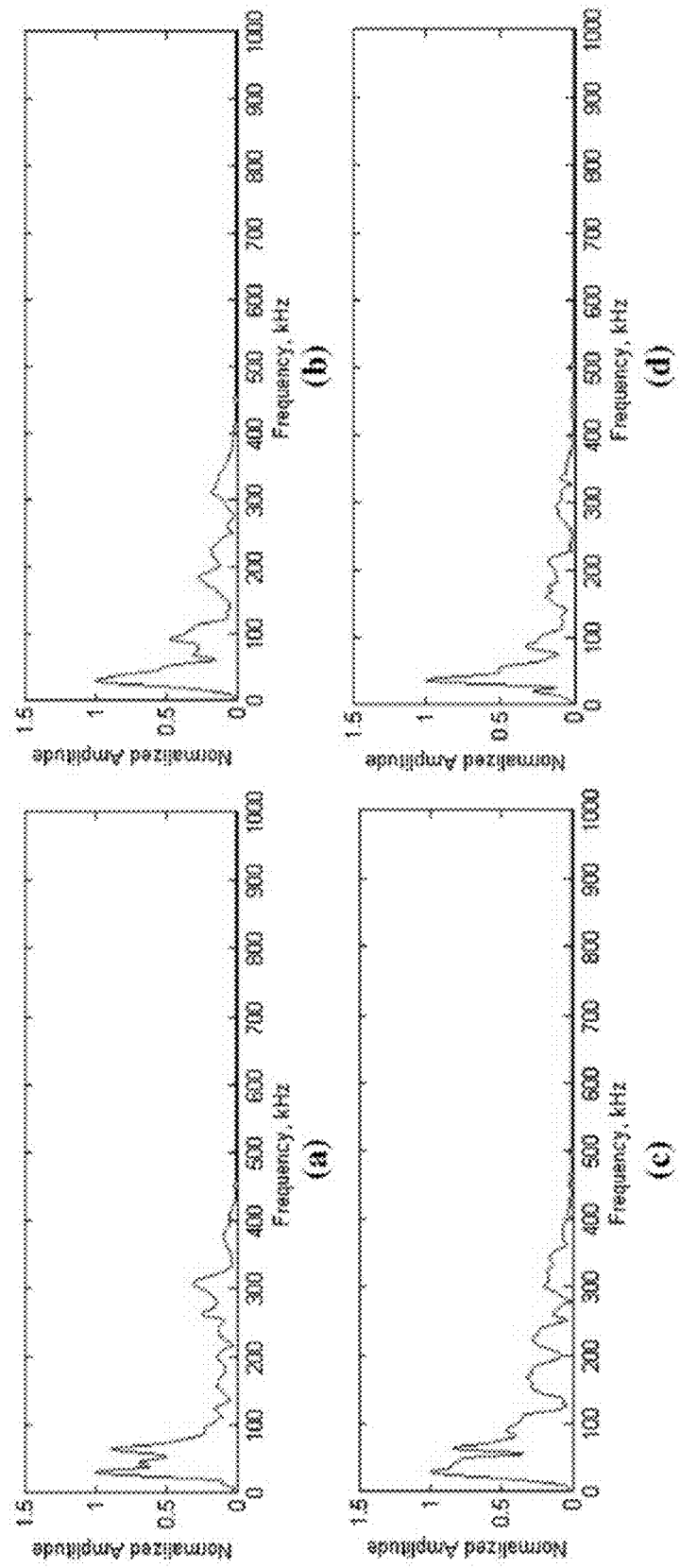
FIG. 46 shows frequency content of PWAS signal of type 2 at four different crack length of (a) 20 mm; (b) 25 mm; (c) 30 mm; and (d) 37 mm.

In FIG. 45 (a)-(d) and FIG. 46 (a)-(d) we can see samples of type 1 and type 2 signals at different stages of the test with different lengths of the fatigue crack. However, in the frequency plots of either of these two types of signals, we do not see any obvious crack resonance peak decreasing in frequency as the crack increased in length. If our explanation is correct, then the crack surfaces are not stress free when the A0 mode is emitted. So the boundary conditions are unpredictable at the crack surfaces during this type of acoustic emissions. Therefore, using type 2 signals, we may not be able to predict crack length based on the crack resonance phenomenon which assumed stress free crack surfaces. At the top of the loading cycles, as the crack grows, the crack surfaces are stress free and we expect the generation of S0 mode. Therefore, using the crack resonance phenomenon we should be able to identify crack resonances from type 1 signals under ideal circumstances. However, there is also a possibility that our explanation is not correct because the proximity of the PWAS to the crack changes the crack resonance. This may also be the reason for the type 1 and 2 signals being very similar to the PWAS tuning curves.

Figure 38:
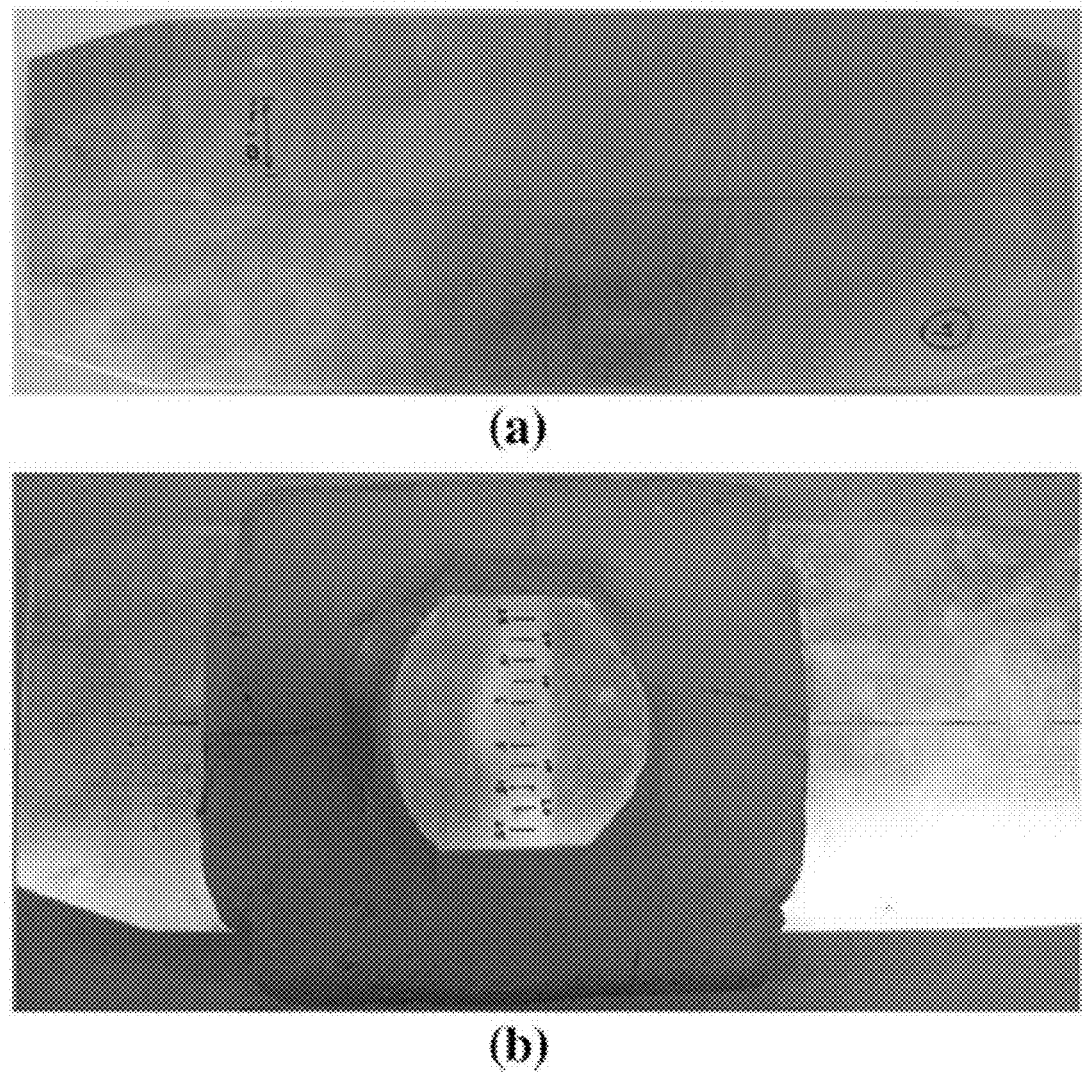
FIG. 38 shows at (a) 100 mm wide, 300 mm long, and at (b) a 1 mm thick specimen.
Figure 39:
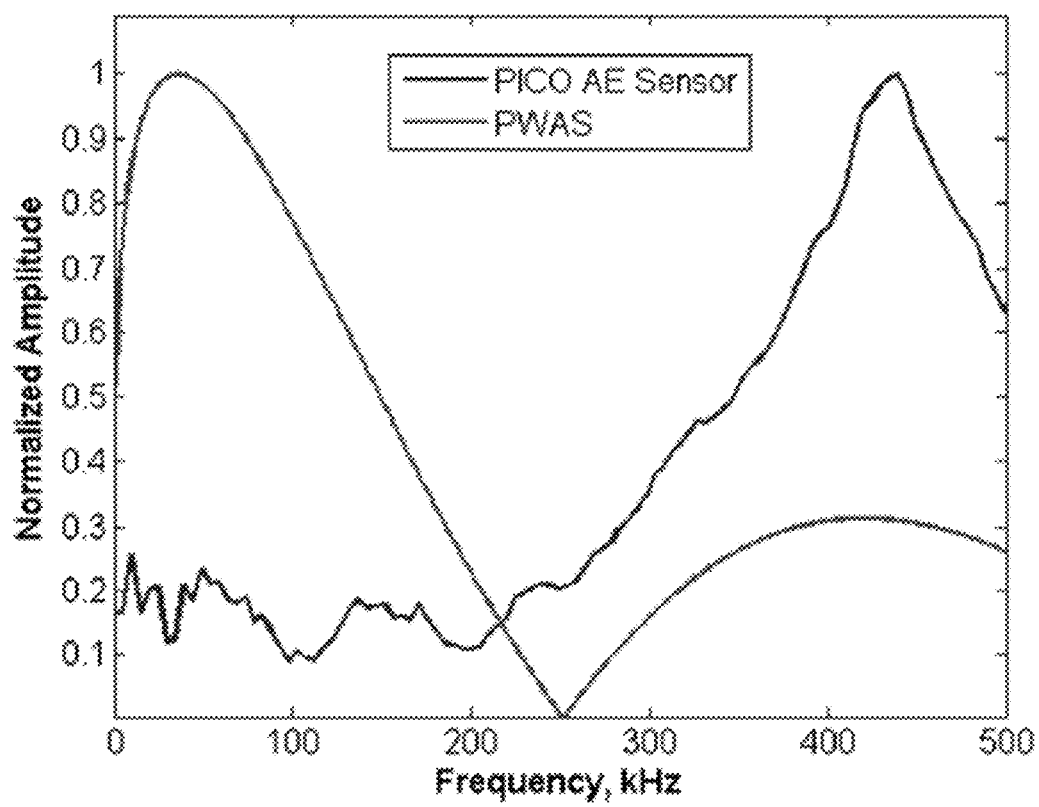
FIG. 39 shows a tuning curve of sensors.
Figure 40:
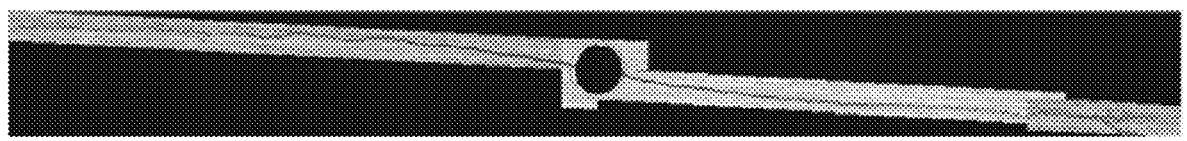
FIG. 40 shows a 20 mm long fatigue crack after 30,000 cycles of loading.
Figure 41:
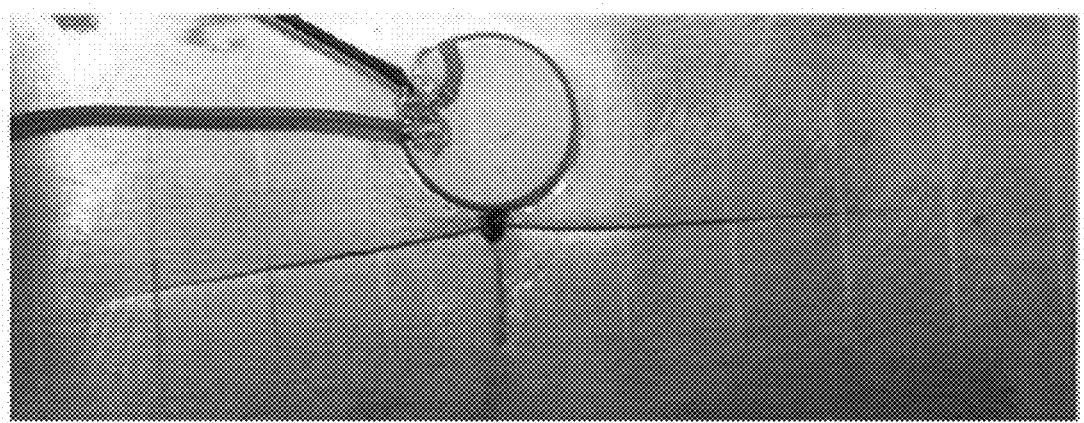
FIG. 41 shows PWAS bonded next to a 20 mm long fatigue crack.

FIG. 38 shows at (a) 100 mm wide, 300 mm long, and at (b) a 1 mm thick specimen. FIG. 39 shows a tuning curve of sensors. FIG. 40 shows a 20 mm long fatigue crack after 30,000 cycles of loading. FIG. 41 shows PWAS bonded next to a 20 mm long fatigue crack. FIG. 42 shows the cumulative number of acoustic emission recorded. FIG. 43 shows acoustic emission signals received by PWAS and PWAS tuning: (a) type 1 and (b) type 2. FIG. 44 shows a PWAS signal of mixed type. FIG. 45 illustrates frequency content of PWAS signal of type 1 at four different crack lengths; (a) 20 mm; (b) 25 mm; (c) 30 mm; and (d) 37 mm. FIG. 46 shows frequency content of PWAS signal of type 2 at four different crack length of (a) 20 mm; (b) 25 mm; (c) 30 mm; and (d) 37 mm.

Here, as described supra, the current disclosure has extended the point source model suggested by Hamstad et al. to a line source to simulate acoustic emission due to fatigue crack growth in a thin plate. The current disclosure shows the effective use of non-reflective boundaries to absorb boundary reflection in AE simulation using a small and efficient 3D model.

Further, the current disclosure focuses on analyzing the acoustic emission waveforms of the fatigue crack growth despite the conventional statistics-based analysis of acoustic emission. The acoustic emission monitoring technique is a well-known approach in the non-destructive evaluation/structural health monitoring research field. The growth of the fatigue crack causes the acoustic emission in the material that propagates in the structure. The acoustic emission happens not only from the crack growth but also from the interaction of the crack tips during the fatigue loading in the structure. The acoustic emission waveforms are generated from the acoustic emission events; they propagate and create local vibration modes along the crack faces (crack resonance). In situ fatigue and acoustic emission experiments were conducted to monitor the acoustic emission waveforms from the fatigue cracks. Several test specimens were used in the fatigue experiments, and corresponding acoustic emission waveforms were captured. The acoustic emission waveforms were analyzed and distinguished into three types based on the similar nature in both time and frequency domains. Three-dimensional harmonic finite element analyses were performed to identify the local vibration modes. The local crack resonance phenomenon has been observed from the finite element simulation that could potentially give the geometric information of the crack. The laser Doppler vibrometry experiment was performed to identify the crack resonance phenomenon, and the experimental results were used to verify the simulated results. This is important as researchers in structural health monitoring (SHM) and non-destructive evaluation (NDE) always thrive for the techniques to assess the health of the structure.

The Acoustic Emission (AE) Technique of NDE

SHM has been used for structural defects detection for many years. It can be categorized in the passive detection of the structural defects since it uses the defect as the passive source of AE. Recently, the fatigue crack-related AE detection has attracted much attention to the researchers. The detection of fatigue crack propagation is important to prevent any potential catastrophic failure of a structure. The detection of fatigue cracks was investigated in both active detection and passive detection in the past.

The AE technique has a wide range of applicability such as damage source localization, characterization, crack-growth monitoring in the isotropic materials, and anisotropic composite and concrete structures. Many methods were observed to focus on the first few peaks of the waveform, and the examination of these few wave peaks had given very limited information such as AE wave amplitude, average frequency, time of arrival, and duration. To understand the AE source mechanism, finite element and some analytical works had been reported. In fact, the complex nature of the AE wave generation, propagation, and interaction with the structural features makes it difficult to analyze the AE waveforms.

Piezoelectric wafer active sensors (PWAS) were used to detect the AE waveforms in the past, and the performance of PWAS was well characterized for detecting ultrasonic guided waves. Efforts were made to retrieve the structural-feature-related information from the AE waveforms. Bao et al. discussed the identification of geometric feature of the fatigue crack growth from AE signal. Gagar et al. developed some correlations between AE signals generated during fatigue crack growth and corresponding cyclic loads to determine the crack length. Sagar and Prasad reported a parametric relationship of AE and fracture mechanics to estimate crack length. However, these methods predominantly rely on experimental data-driven statistical models to understand the AE signatures. To successfully extract geometric feature information from the AE events due to fatigue crack growth, it is important to analyze the AE waveforms and to find any clue on estimating the crack-length information.

The nonlinear acoustic technique for crack detection and the generation of harmonics for breathing-type cracks had been analyzed numerically and experimentally. The results showed the higher harmonic generation due to crack formation. However, these analyses focused on input voltage amplitude change with harmonics and localizing the breathing cracks in the structure.

The current disclosure presents an experimental and computational analysis of AE waveforms resulting from fatigue crack growth. It focuses on the analysis toward identifying crack-length-related resonance phenomenon in the experimental AE waveforms. The measured AE waveforms were analyzed in both time and frequency domains, and they were classified into three major types. To understand the insight of the AE waveforms and their interaction with local crack boundaries, three-dimensional (3D) finite element harmonic analysis was applied. The experimental results provided the guidelines for choosing the frequency range of the finite element model (FEM) harmonic analysis and excitation frequencies of the laser Doppler vibrometry (LDV) experiments. FEM results showed the crack-length-related resonance phenomenon that was also confirmed by the LDV experiments. Both the FEM and LDV experimental results suggest that the crack resonance phenomena could be used to estimate the fatigue crack length from the AE waveforms.

Experimental Setup for Fatigue—AE Experiments

The fatigue experiments were designed to capture the real-time AE signals. Aircraft grade aluminum Al-2024 T3 test coupons of 100-mm-wide, 300-mm-long and 1-mm-thick dimension were used. A small (1-mm diameter) hole was created at the center of the specimen to initiate the crack growth. It was important to minimize the boundary reflections from the coupon edges to extract the AE waveform that was related to a fatigue crack. Thus, an absorbing clay boundary around the edges of the coupon was used and the measured AE waveforms were free of coupon edge reflection contamination. The clay absorbing boundary is outside the fatigue crack region and the sensor.

Thus, the recorded AE waveform may contain information from any possible interaction between the crack-tip AE and the crack boundaries. The fatigue loading level was selected based on the yield limit (345 MPa) of the material. The MTS mechanical testing machine was used to apply the fatigue loading in the specimen. The highest and lowest load level was, respectively, kept at 65% and 6.5% of the yield strength maintaining an R ratio ($\sigma_{min}=\sigma_{max}$) of 0.1. At the beginning, an initial crack was created by the cyclic fatigue loading without any AE instrumentation. Then, the AE sensor was bonded to the specimen with AE instrumentation. The fatigue loading with AE instrumentation was conducted in two stages: fast fatigue loading (0.25 Hz) and slow fatigue loading rate (0.05 Hz). At fast loading rate, the coupon undergoes one complete cycle of loading in 4 s. While the crack was growing faster, we wanted more control on capturing the AE events and thus conducted the experiment at the slow fatigue loading rate which was five times slower than the fast loading rate. In both cases, the same cyclic load level was maintained.

Figure 47:
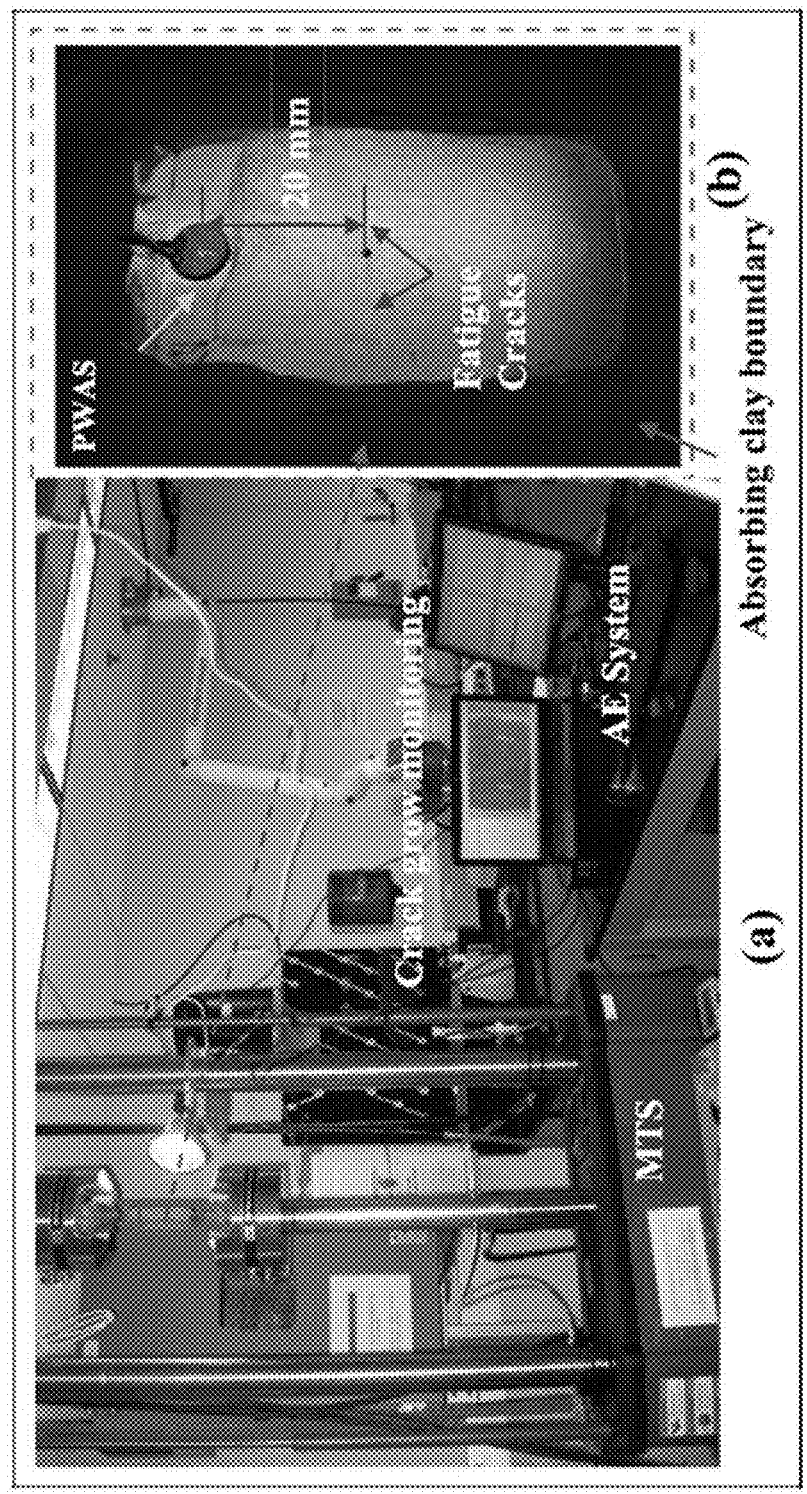
FIG. 47 shows at (a) one embodiment of a fatigue experimental setup and at (b) PWAS transducer (7 mm diameter) mounted on the specimen.

The AE sensor (PWAS) was installed 20 mm away from the initially drilled hole as shown in FIG. 47 at (b). FIG. 47 shows at (a) one embodiment of a fatigue experimental setup and at (b) PWAS transducer (7 mm diameter) mounted on the specimen. Since the AE signals were low in amplitude, the preamplifiers were used in between the sensor and the AE instruments. The preamplifier also filtered the very low frequency vibration signals. Those vibration signals were not related to the AE signals and were persistently present there originated from the machine and other sources. The digital AE system from the physical acoustics was used to detect the AE signals.

Experimental AE Waveform Measurements

Figure 48:
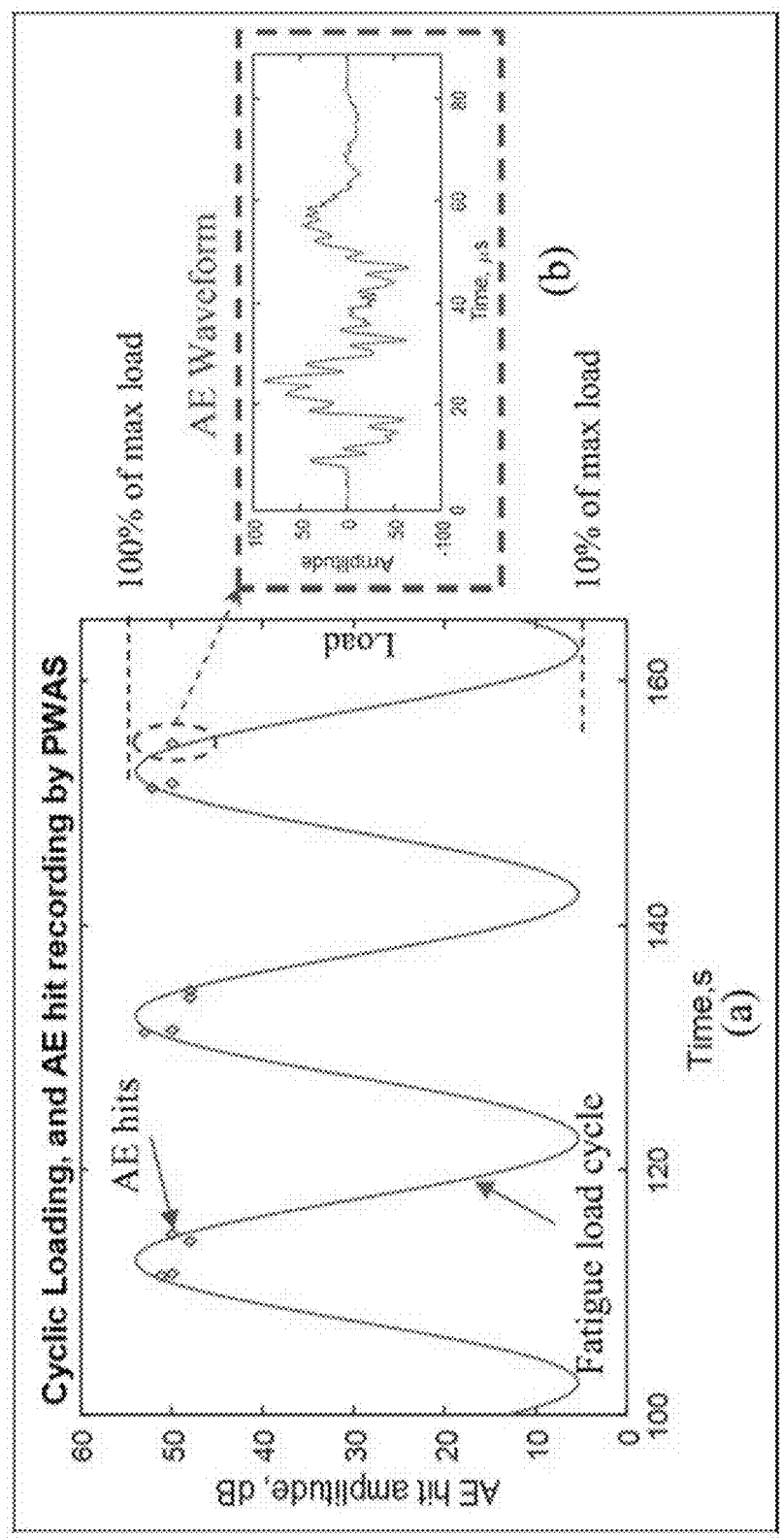
FIG. 48 shows at (a) AE hits near the peak load of the fatigue cyclic loading (slow fatigue cycle, Tc=20 s) and at (b) AE waveform corresponding to an AE hit.

The fatigue loading was monitored by the MTS control module. At slow fatigue loading rate, the AE hits were captured and the corresponding fatigue loading cycle was recorded. The most of the AE hits were observed at near the peak load of the fatigue load cycle as shown in FIG. 48 at (a). FIG. 48 shows at (a) AE hits near the peak load of the fatigue cyclic loading (slow fatigue cycle, Tc=20 s) and at (b) AE waveform corresponding to an AE hit. The AE hits happened during both loading and unloading. Each of the AE hits corresponds to an AE waveform. The AE waveforms had very short period of time (in the range of microsecond), while the cyclic fatigue loading rate was in the range of second.

An AE waveform corresponding to an AE hit is shown in FIG. 48 at (b). The fatigue experiment was continued at fast loading rate (0.25 Hz) and the corresponding crack growth was visually monitored by a video camera. Simultaneously, the PWAS captured the AE signals by the AE instrumentation. We noticed that the number of recorded AE hits increased significantly as the crack grew faster (approximately 6 μm per cycle, on average). Since a large number of molecular bonding had to break as the crack grew at such a higher rate (approximately 6 μm per cycle, on average); thus releasing the stored energy at a higher rate. The release of stored energy at higher rate preserved the marking as the higher rate (approximately 8-10 hits per cycle) of AE signals recorded in the experiments.

Figure 49:
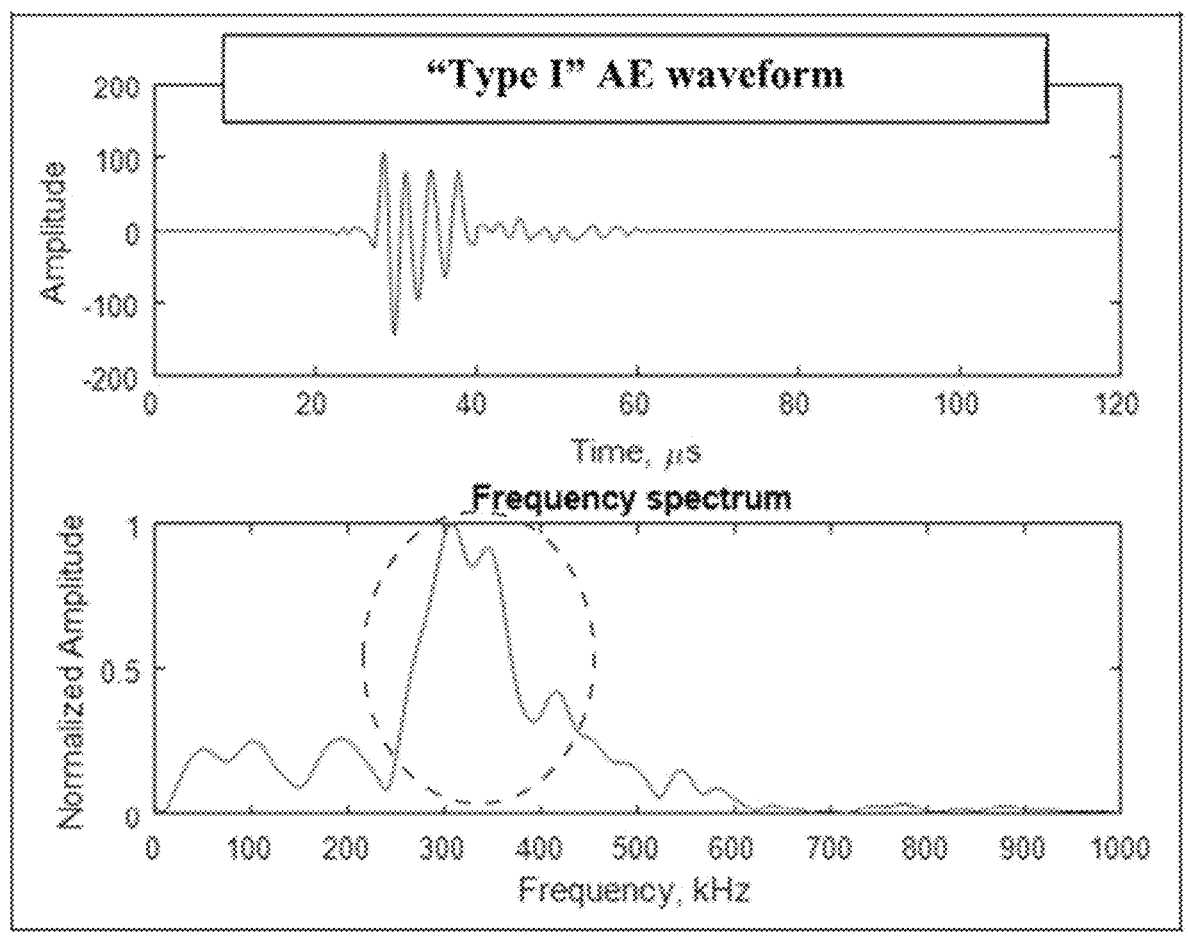
FIG. 49 shows "Type I" AE signal results.
Figure 50:
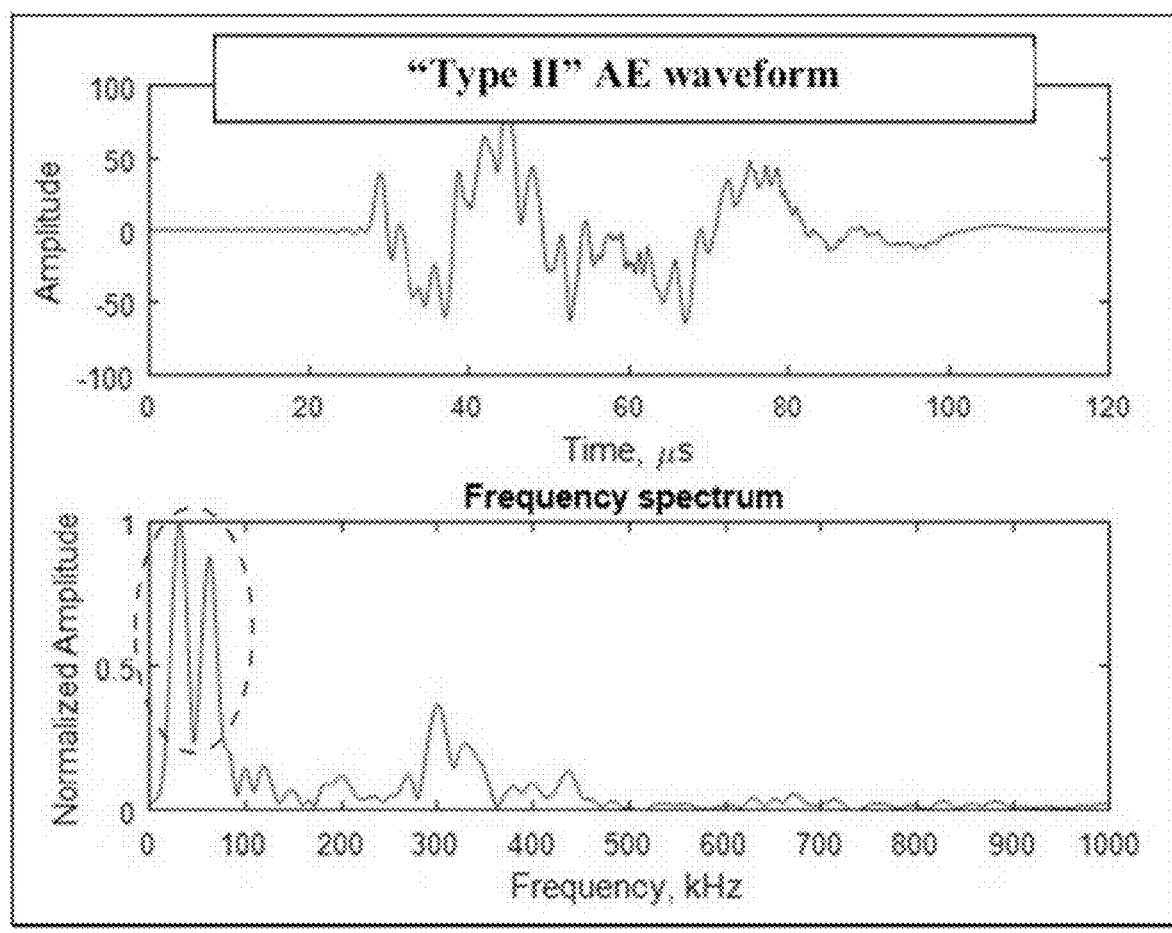
FIG. 50 shows "Type II" AE signals.
Figure 51:
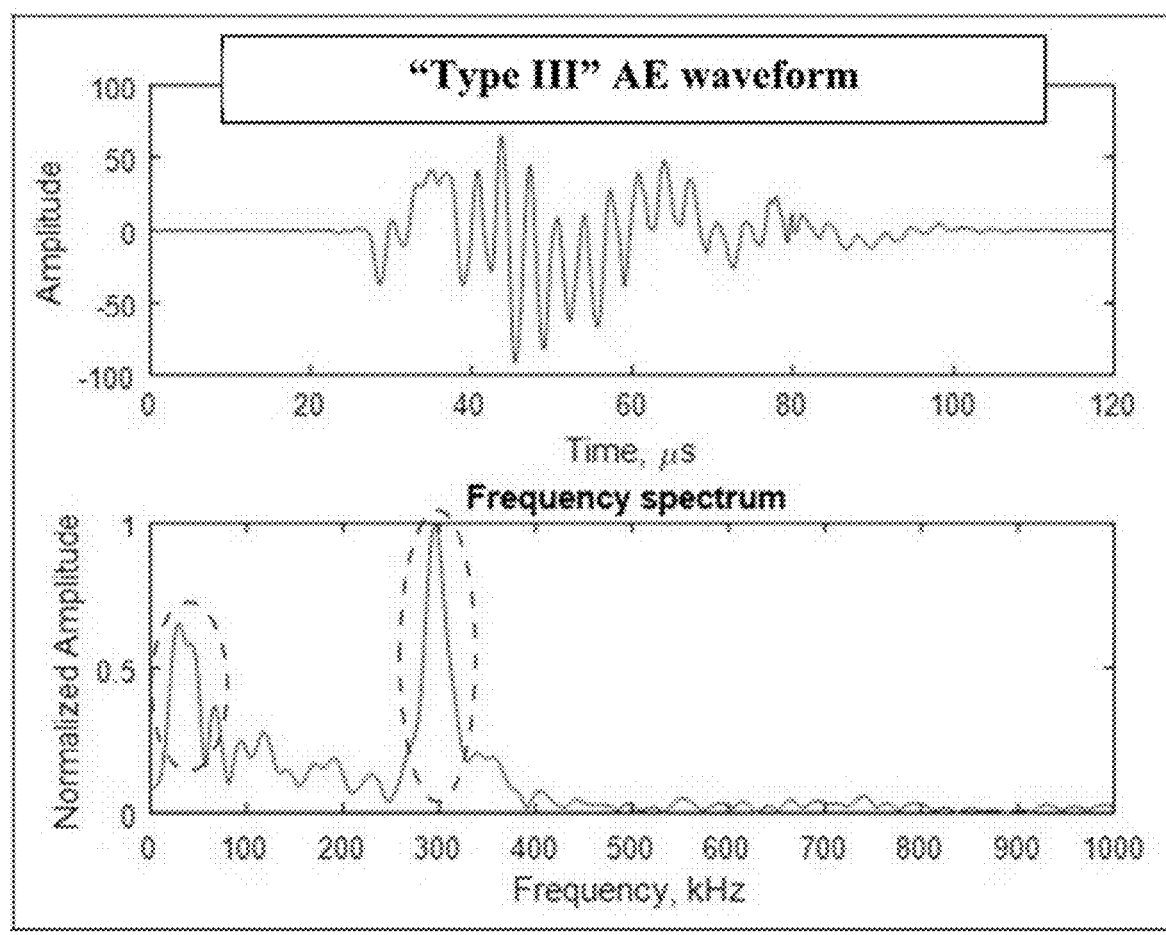
FIG. 51 shows "Type III" AE signals from the experiment.

The AE signals corresponding to the crack growth from 20 to 35 mm (tip to tip length) were recorded. Several test coupons of the same geometry and same experimental setup were used to generate the repeatability of the AE signals. The test coupons were manufactured from a single, large aluminum plate to maintain the same material properties in all the test coupons. It was observed that the measured AE waveforms could be predominantly grouped into three types of waveforms. The waveforms were distinguished based on the similar nature in the both time and frequency domains. "Type I" AE waveforms are the short length in the time domain as shown in FIG. 49. FIG. 49 shows "Type I" AE signal results from the experiment. The frequency spectrum of the Type I signal shows that they have higher amplitude in the 250-400 kHz frequency band. The "Type II" AE signals have relatively longer time period as shown in FIG. 50. FIG. 50 shows "Type II" AE signals from the experiment. They have relatively lower frequency components (30-100 kHz) as depicted in their frequency spectrum. "Type III" AE waveforms that were identified as mixed-type waveforms are shown in FIG. 51. FIG. 51 shows "Type III" AE signals from the experiment. They have both components of "Type I" and "Type II" signals and their frequency spectrum also support the mixed nature of the waveforms. However, more than 90% of the AE signals can be classified into "Type I" and "Type II" waveforms. Both types of waveforms appeared in almost equal proportions.

All three types of signals had the low-amplitude noises in the raw experimental time domain signals. These noises are persistently present in the entire length of all three types of waveforms. We have identified that the source of noise is the surrounding environment of the experiment that includes MTS machine, electromagnetic control module, and servo motor. However, the signal processing easily removed those noises from the raw AE signals.

To explain the types of AE waveforms, we could observe the physical phenomena. As the load level reaches to the maximum of the fatigue load cycle, the stresses at the crack tip rise at a significant amount that causes the failure of the material at the crack tip. This releases the stored energy from the crack tip and generates AE event. This happens instantaneously while the crack tips are open. This physical situation may represent one type of the AE waveforms. The generated AE waves travel along the crack tips as surface waves. At lower load level, the crack tips tend to close and especially at the crack-tip region, the rubbing and clapping happen between the faying surfaces. These rubbing and clapping motions of the faying surfaces generate another type of AE waveform. The third type of AE waveform may correspond to the mixed situation of the two previous physical phenomena and only 10% of the total AE waveforms was observed. Since we focused on the AE waveforms captured from the experiment, we may note the interaction of the AE waveform with the crack boundaries. While the fatigue crack grows, the generated AE waveform from one of the crack tips may propagate along the crack tip as surface waves and reflected back from the other tip of the crack. This local interaction of the AE waveform from the crack faces may cause the crack resonance that heavily depends on the geometry of the crack.

In order to observe the crack resonances, FEM simulation of AE waveform is performed. It can be noted from the experimental result analyses of the AE waveforms that all three types of AE waveform contain the frequency content up to 600 kHz. This information guides us performing the harmonic and transient FEM analysis in the interested frequency domain. The wavelength, thereby, frequency dictates the element size of FEM. While we know the maximum AE experimental frequency content (600 kHz), it guides us setting up the meshing parameters and others as detailed in section "FEM simulation of AE waveform generation and crack resonance." To maintain proper accuracy in FEM simulation, the design model parameters should be good for a frequency that exceeds the maximum frequency of any type of AE experimental waveform.

The frequency spectrum of the experimental AE waveform also provides the guidance for the LDV experiment of crack resonance observation as detailed in section "Experimental verification of crack resonances." In LDV experiment, PWAS transducer was used to excite the manufactured crack to simulate an AE waveform at the crack tip. The frequency spectrum of the experimental AE waveform dictated the frequency spectrum of the PWAS exciter in LDV experiment.

Hence, the knowledge of experimental AE waveform analysis facilitated performing FEM simulation and LDV experiment for simulated AE waveform. FEM simulation of AE waveform generation and crack resonance Based on the physical phenomena discussed in section "Experimental AE waveform measurements," the AE waveforms travel along the crack tips. Since the boundary condition changes as the waveforms approach to the other end of the crack, reflection and transmission may happen at the other tip of the cracks. That also means that the other crack tip would act as a secondary source of scattered AE waveforms. This local interaction depends on the geometry of the crack. Hence, there may be some resonance frequencies for different modes of local vibration. This phenomenon may be termed as the crack resonance.

Crack on each side of the small hole is modeled using the discontinuity at the adjacent pair of nodes along the cracks. There are actually two sets of nodes along the crack faces and each set represents the nodes on each face and the nodes are discontinuous along the crack faces. Two sets of nodes are adjacent to each other and the solid elements are disbanded along the crack faces. The modeling of the cracks in finite element using the above approach is fair enough to model the actual cracks in a small hole in the plate-like structure.

Figure 52:
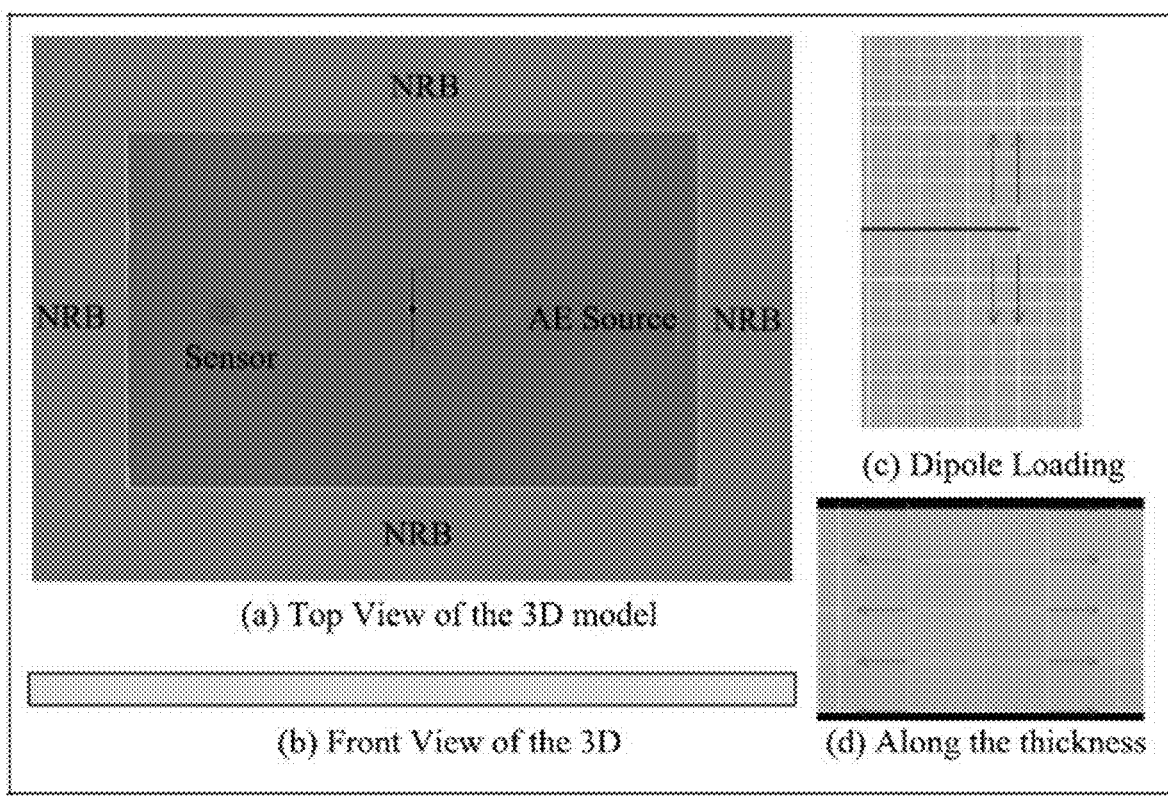
FIG. 52 shows 3D FEM for harmonic analysis: (a) top view, (b) front view, (c) dipole loading at the crack tip, and (d) line load along the thickness.

In order to prove the concept of crack resonance, 3D FEM simulation was performed. The AE source was modeled using dipole concept suggested by Hamstad et al. To model the fatigue crack growth, the concept was extended and two dipoles were modeled along the thickness that represents a line dipole source. The illustration of the 3D FEM modeling is shown in FIG. 52. FIG. 52 shows 3D FEM for harmonic analysis: (a) top view, (b) front view, (c) dipole loading at the crack tip, and (d) line load along the thickness. The non-reflective boundary (NRB) was used in the FEM to avoid the reflections from the plate edges. The NRB was modeled using the criteria mentioned in Shen and Giurgiutiu.

The criteria that followed for better FEM results were $\lambda_m/cs \geq 15$, $D/s \geq 7$, and $\lambda_m/s \geq 5$ following Hamstad et al., where 1 m is the minimum wavelength, cs is the cell size in the FEM, D is the distance between the source and the sensing location, and s is the source size. The minimum wavelength $\lambda_m$ is defined as $\lambda_m = c_s/f$, with $c_s$ being the shear wave speed and f being the maximum frequency. The cell sizes (cs) varied from 0.9 to 0.25 mm with D=20 mm and s=0.2 mm. The AE source dipoles were chosen as half cycle cosine step function with 15-μs rise time. The amplitude of the function is chosen to be unity (1). The aluminum 2024-T3 material properties of the plate were chosen to be E=73:1 GPa, v=0:33, and p=2780 kg/m$^3$ with $c_s$=3140 m/s. With these parameters being set, the FEM simulation can accurately predict the results for the frequency range of up to 840 kHz with D/s=100 following Hamstad et al.

Figure 53:
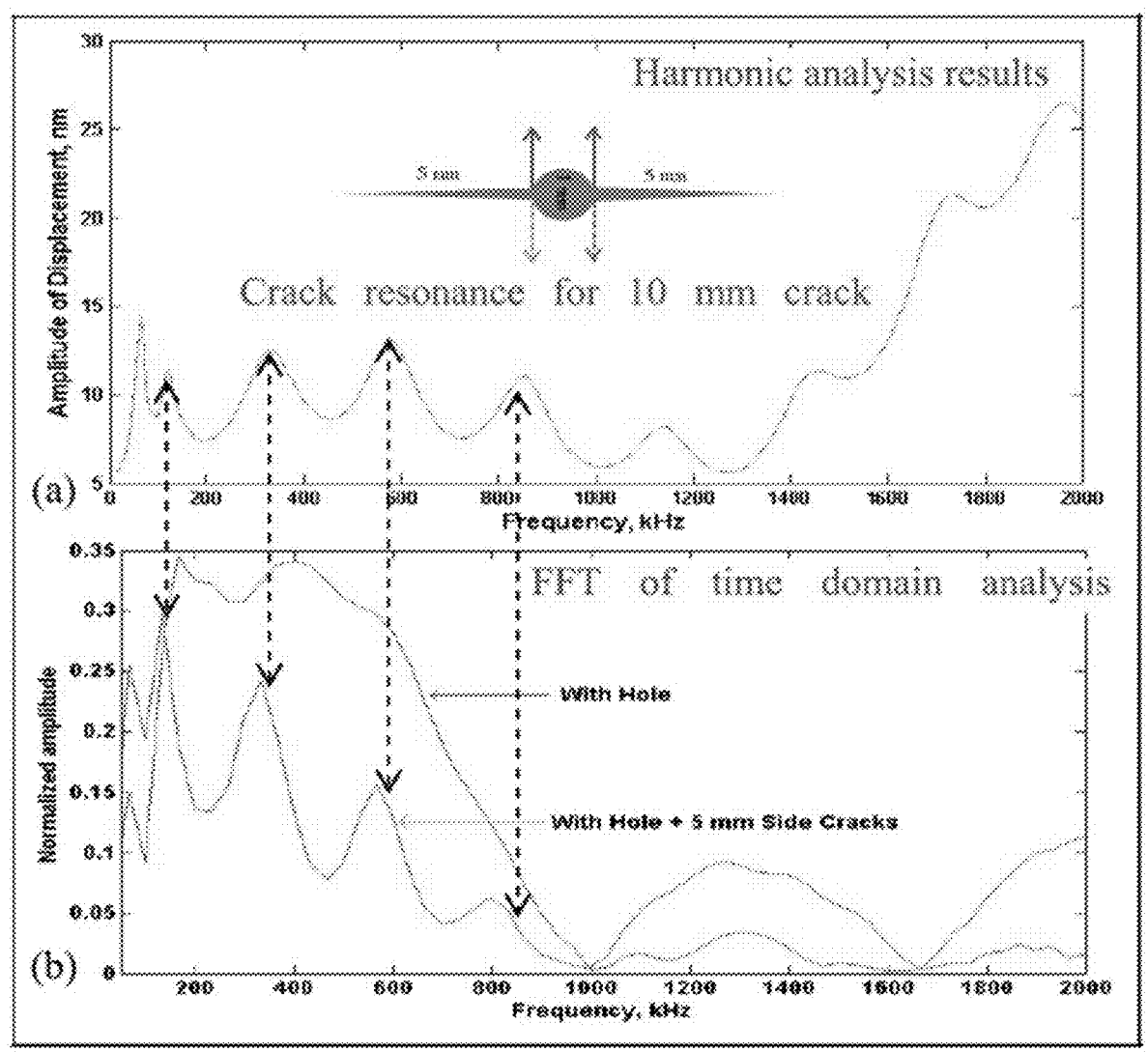
FIG. 53 shows FEM simulation results for (a) the crack resonance captured at mouth of the crack in harmonic analysis and (b) comparison between FFT of AE waveform of the hole and hole+10 mm crack (sensing at 20 mm away from the hole) in transient analysis.

Harmonic FEM analysis of the 3D model was performed for the plate with hole+10 mm cracks. The two models were designed to show the differences in the frequency spectrum of the response signals. The FEM results were illustrated in FIG. 53. FIG. 53 shows FEM simulation results for (a) the crack resonance captured at mouth of the crack in harmonic analysis and (b) comparison between FFT of AE waveform of the hole and hole+10 mm crack (sensing at 20 mm away from the hole) in transient analysis. The crack opening displacement at the mouth of the crack was recorded over the wide frequency band as shown in FIG. 53 at (a).

This showed that the crack-opening resonances occurred at regular frequency intervals. Although the results were shown for wide range of frequencies, we were interested in the results up to 1000 kHz where most of AE signal frequency contents were available. Transient analysis of the same model was performed for the plate with hole and hole+10 mm cracks. The frequency spectrum of the displacement responses of the two situations was illustrated in FIG. 53. This showed that the AE signals are modified by the presence of the crack. This gave us an indication that the geometry of the crack may also be estimated from the recorded AE signals. The length of the crack is directly related to the resonance frequencies of the crack. It is also interesting to note that the resonance phenomena captured at the mouth of the crack (from harmonic analysis) were similar to that captured at 20 mm away from the crack (transient analysis). The comparison between the frequency peaks is illustrated by the dotted lines.

Figure 54:
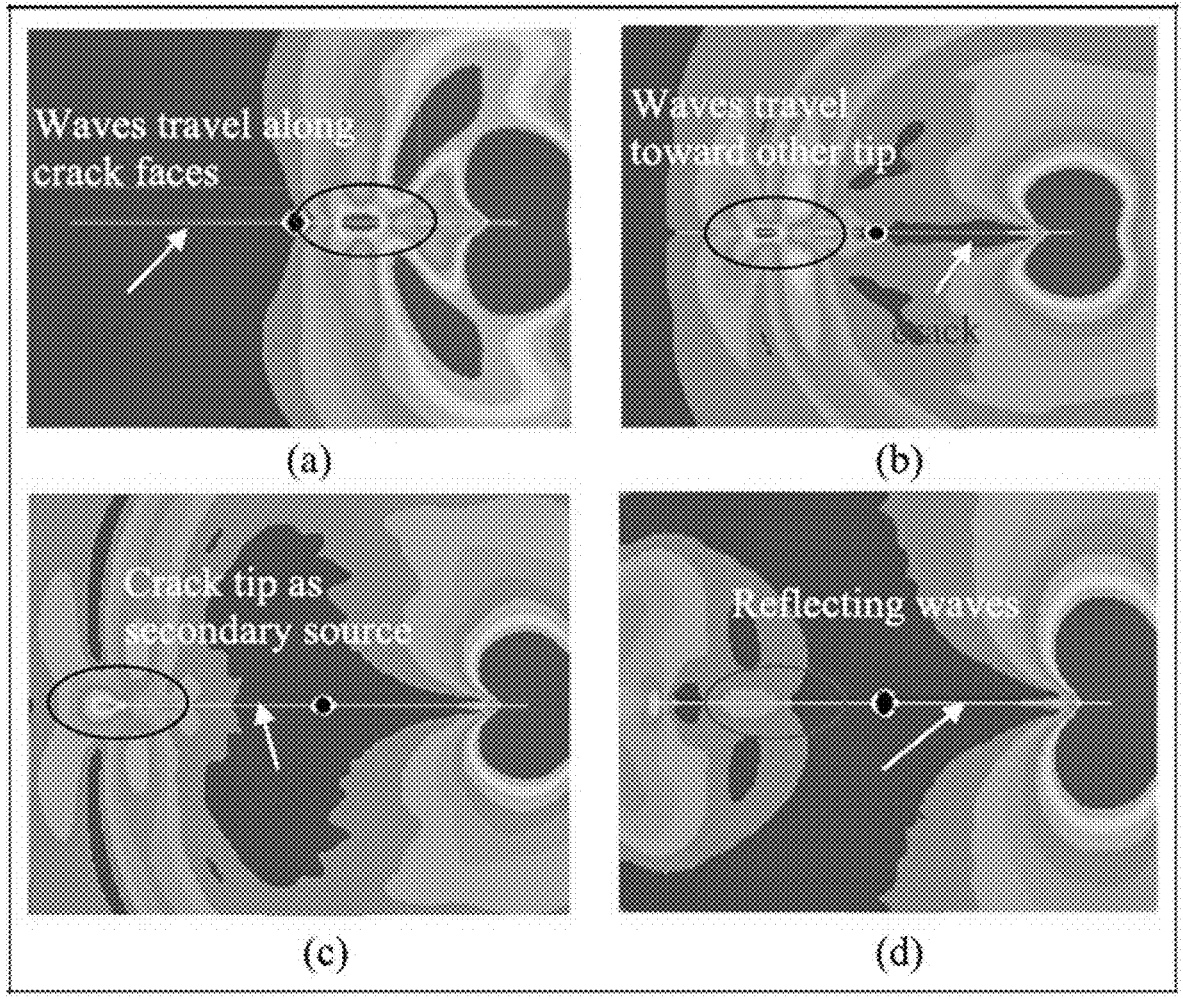
FIG. 54 shows Animation snapshots of transient FEM simulation as the time progress: (a) t=1:5 μs, (b) t=3 μs, (c) t=3:9 μs, and (d) t=4:8 μs.

The animation snapshot of the transient FEM simulation is demonstrated in FIG. 54. FIG. 54 shows Animation snapshots of transient FEM simulation as the time progress: (a) t=1:5 μs, (b) t=3 μs, (c) t=3:9 μs, and (d) t=4:8 μs. The acoustic wave emitted from one crack tip travels along the crack faces. When the waves hit the other tip of the crack, it generates secondary waves. The reflected waves travel back along the crack faces. This may cause the crack resonances.

Experimental Verification of Crack Resonances

Figure 55:
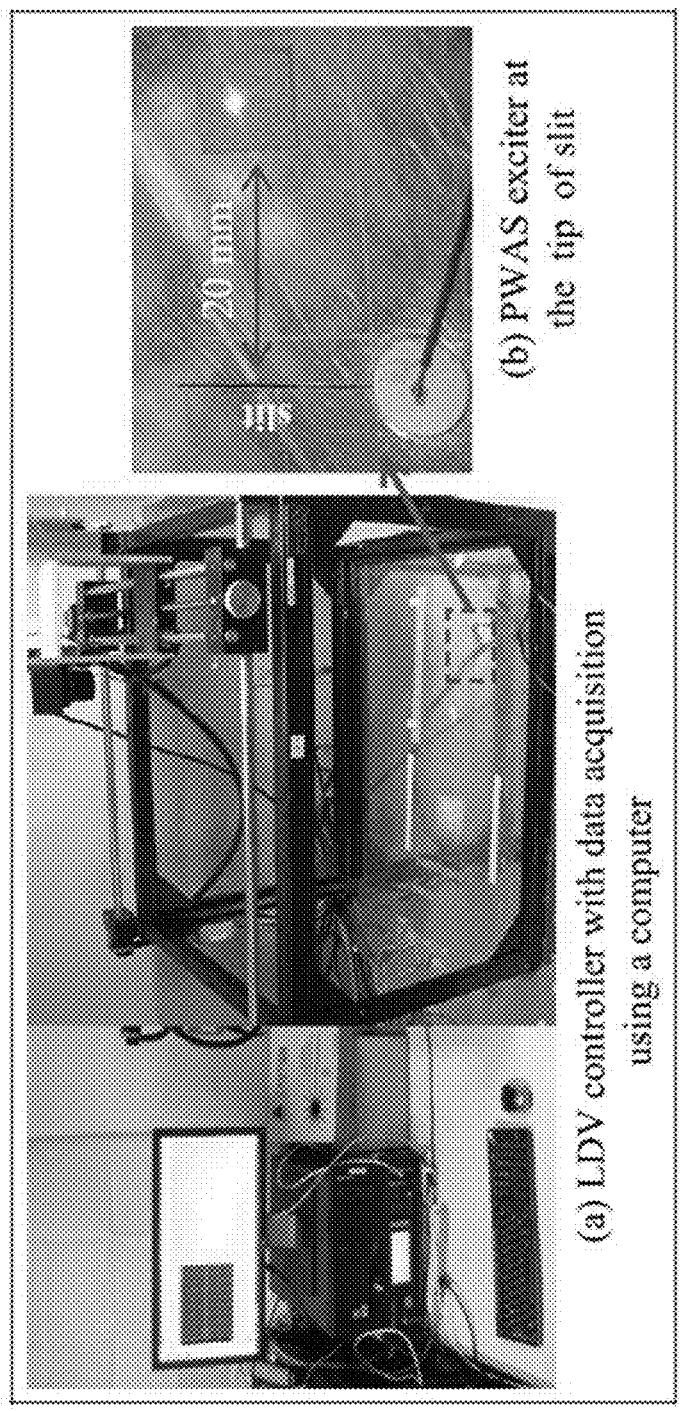
FIG. 55 shows one embodiment of a Laser Doppler vibrometry (LDV) experimental setup.
Figure 56:
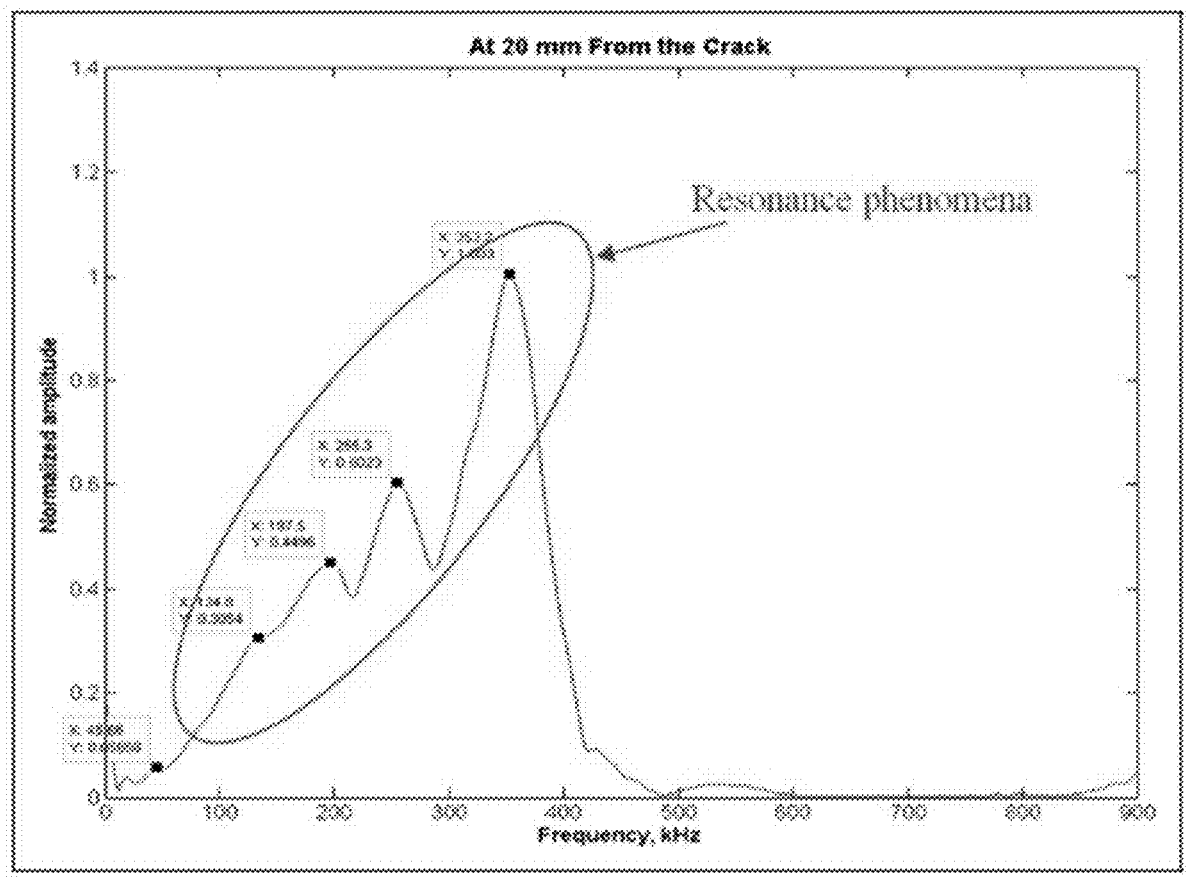
FIG. 56 shows LDV experimental results (out-of-plane velocity) measured at 20 mm away from the slit.

Finite element simulation results proposed that fatigue crack resonates during AE events. An LDV experiment was done to verify the results. The experimental setup is shown in FIG. 55. FIG. 55 shows one embodiment of a Laser Doppler vibrometry (LDV) experimental setup. A 1-mm-thick 2024-T3 aluminum plate with 1.2 m×1.2 m dimension was used. The large size of the specimen was used to avoid the plate edge reflections. A 16-mm-long through-thickness slit was made to simulate a fatigue crack. A pair of 7-mm diameter circular piezoelectric active wafer sensors (PWAS) was mounted on the opposite surfaces of the plate at the tip of the slit as the excitation source. A single-count tone-burst signal of center frequency of 350 kHz was used to excite the sensors placed at the crack tip. The reason for choosing the single-count tone-burst signal was to achieve a wider band in the frequency (up to 800 kHz). The results of the actual AE waveform presented in section "Experimental AE waveform measurements" provided the guidance of selecting the frequency band. To correctly simulate an AE signal at the crack tip, the frequency content of the PWAS excitation at the crack tip should cover the entire frequency range of the actual AE waveform. LDV measured the out-of-plane vibration velocity of the plate surface at 20 mm away from the crack. The out-of-plane velocity of a point at 20 mm away from the center of the crack was measured by LDV. Fourier transform of the time domain signal was used to obtain the frequency spectrum of the signal, and it is shown in FIG. 56. FIG. 56 shows LDV experimental results (out-of-plane velocity) measured at 20 mm away from the slit. The resonance frequencies are labeled in the frequency spectrum. Several peaks are clearly identified and labeled in the frequency spectrum. Evidently, these peaks represent the frequencies for which the out-of plane velocity reaches a maximum, and the crack resonances happen at anti-nodes.

Comparing the experimental data with the FEM simulation results, we can see that both the results were able to capture several resonance modes of the crack and higher harmonics. However, the amplitude trend increases with frequency in the experiment while it is opposite in the simulation. The reason is that the excitation signal in the experiment was tone burst which has higher amplitude near the center frequency, while in the FEM simulation, the excitation is a cosine bell step function which has higher amplitudes in the lower frequencies. That is why the trend in the amplitude of the frequency response curve from the two results is not directly comparable. Nonetheless, in both experiment and FEM simulation, some frequency peaks have been observed within the AE frequency band caused by the crack resonance which is the objective of the article.

In this research, in-situ fatigue and AE experiment was conducted to capture the AEs due to fatigue crack growth using PWAS transducers. Two stages of fatigue experiments were conducted: slow fatigue and fast fatigue. The slow fatigue experiments provided more control on capturing AE events with the fatigue load cycle. It had been shown that most of the AE hits happened near the peak load of the cyclic fatigue loading. The fast fatigue experiment was conducted to allow about 15 mm crack growth from the initial crack length with simultaneous measurement of AE. It was observed that the number of AE hits increases significantly as the crack grows faster. By analyzing the pool of AE waveforms, three types of AE waveforms were identified based on the similarity in both time and frequency spectra.

The AE waveform generated from the crack tip may interact with the crack itself and cause crack resonance. Transient and harmonic analyses were carried out to the 3D FEM to simulate the AE wave generation, propagation, and its interaction with fatigue crack. Both analyses confirm the local crack resonance phenomena due to the interaction between AE waveform and fatigue crack and showed that they are related to the crack length. The LDV experiments were conducted to verify the computational results.

In a further embodiment, the current disclosure is directed to using original fingerprints of fatigue crack generated acoustic emission waveforms. These fingerprints may be used as a standard to distinguish crack-generated and non-crack generated AE signals. Each fingerprint had a particular time domain signal pattern and unique frequency spectrum. The current disclosure has discovered that the huge amount of fatigue crack generated AE hits can be sorted into groups based on these fingerprints. These fingerprints explained the complex fatigue crack growth mechanisms which would enable proper fatigue damage monitoring solutions for the safety of public infrastructures.

One of the primary novelties of the current disclosure is identification of the original fingerprints of the fatigue crack generated acoustic emission waveforms. The use of the original fingerprints to separate the rogue AE hits is novel, as well as explains the complex phenomena of progressive fatigue damage. Other possible areas of novelty include fatigue damage diagnosis, quantification, and prognosis using the AE fingerprints.

In one example, original fingerprints of fatigue crack generated acoustic emission waveforms were identified. Crack advancement on the order of tenths of micron and the micro-crack formation were captured through the acoustic emission waveforms. Any artefacts/outliers of the experimental measurement for example, non-crack related acoustic emission signals may be distinguished by comparing with the original crack-generated fingerprints. This explains the complex nature of the progressive fatigue damage such as: crack closure; brittle growth of the crack; blunting growth of the crack; and near-critical fast growth of the crack. Further, the amplitude and frequency contents of the fingerprints may be used for the fatigue damage diagnosis, quantification, and prognosis. The exact load level corresponding to the AE waveform occurrence in the thin metallic plate was obtained during the fatigue load evolution. The geometric features and local interaction between the crack and acoustic waves may be espied from the fingerprints. Multiphysics simulation tools may be validated and verified with these experimentally measured fingerprints. Further, AE analysis software algorithms may be developed based on the fingerprints.

The potential industrial applications of the current disclosure include but are not limited to those which use nondestructive evaluation (NDE) and structural health monitoring (SHM) techniques for monitoring structural integrity using acoustic emissions. These may include: mechanical engineering (progressive damage and fracture analysis of the mechanical components); aerospace industry applications (Unmanned aerial vehicle (UAV), aircraft structural monitoring); civil engineering (bridges, buildings, transportation systems, etc.); energy infrastructures (wind turbines, nuclear applications, pipelines, offshore, etc.); national security (surveillance drone for anti-warfare, anti-terrorism, etc.); and manufacturing quality control (acoustic emission monitoring during manufacturing).

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A method for identifying features of a fatigue crack, comprising:
   analyzing emission waves from a fatigue crack;
   applying external excitation to the fatigue crack;
   capturing at least one echo emanating from the fatigue crack caused by the external excitation;
   generating at least one secondary emission wave that emanates from the fatigue crack; and
   analyzing amplitude and frequency of the at least one secondary emission wave.

2. The method of claim 1, further comprising identifying at least one geometric feature of the fatigue crack from analysis of the at least one secondary emission wave.

3. The method of 2, further comprising identifying fatigue crack length and crack tip locations as part of the at least one geometric feature.

4. The method of 2, wherein frequency dependent patterns in polar plots identify the at least one geometric feature of the fatigue crack.

5. The method of claim 1, further comprising establishing a library of signal signatures paired with fatigue crack geometries.

6. The method of claim 5, wherein modeling and scanning laser vibrometry are used in association with time signal analysis are used to establish the library of signal signatures.

7. Creating a library of acoustic emission waveforms linked to crack geometric features comprising:
   generating structural vibrations in a test material;
   generating excitation signals and applying same to the test material;
   collecting first acoustic emission signals generated by the test material;
   measuring surface vibration and displacement in the test material;
   obtaining a frequency response of the test material to the excitation signals;
   extracting surface relative displacement to determine multiple candidate frequencies for acoustic wave detection;
   exciting the test material with at least one candidate frequency and collecting at least one second acoustic emission signals from the test material;
   analyzing the at least one second acoustic emission signal to extract at least one signal signature associated with fatigue crack geometric features; and
   forming a library of features wherein the at least one signal signature is associated with fatigue crack geometric features.

8. The method of claim 7, wherein the structural vibrations are generated by internal and external excitation sources.

9. The method of claim 8, wherein the internal excitation is provided by piezoelectric wafer active sensors.

10. The method of claim 8, wherein the external excitation is created by a mechanical shaker.

11. The method of claim 7, further comprising identifying at least one geometric feature of a fatigue crack from analysis of the at least one second acoustic emission.

12. The method of claim 11, further comprising identifying fatigue crack length and fatigue crack tip locations as part of the at least one geometric feature of the fatigue crack.

13. The method of claim 12, wherein frequency dependent patterns in polar plots identify geometric features of the fatigue crack.

* * * * *